(12) United States Patent
Roseen

(10) Patent No.: US 10,704,246 B2
(45) Date of Patent: Jul. 7, 2020

(54) IN-GROUND STORMWATER COLLECTION AND PRETREATMENT FILTRATION SYSTEMS

(71) Applicant: Robert M. Roseen, Stratham, NH (US)

(72) Inventor: Robert M. Roseen, Stratham, NH (US)

(*) Notice: Subject to any disclaimer, the term of this patent is extended or adjusted under 35 U.S.C. 154(b) by 0 days.

(21) Appl. No.: 16/156,937

(22) Filed: Oct. 10, 2018

(65) Prior Publication Data

US 2020/0115890 A1     Apr. 16, 2020

(51) Int. Cl.
*E03F 5/04*     (2006.01)
*E03F 5/14*     (2006.01)
(Continued)

(52) U.S. Cl.
CPC .......... *E03F 1/005* (2013.01); *B01D 21/0012* (2013.01); *B01D 21/0042* (2013.01);
(Continued)

(58) Field of Classification Search
CPC ......... E03F 1/002; E03F 1/005; E03F 5/0403; E03F 5/0404; E03F 5/14; B01D 21/0012; B01D 21/0042
(Continued)

(56) References Cited

U.S. PATENT DOCUMENTS 4,689,145 A * 8/1987 Mathews ................. E03F 5/14
210/170.03
6,042,721 A    3/2000 Peters, Jr.
(Continued)

FOREIGN PATENT DOCUMENTS

EP     2147186 B1    1/2010
WO    05019113      3/2005
(Continued)

OTHER PUBLICATIONS

Ecosense International, "EcoVault: Simple Solutions to Water Pollution", Jan. 2017, (pp. 1-2).
(Continued)

*Primary Examiner* — Christopher Upton
(74) *Attorney, Agent, or Firm* — Thomas J. Perkowski, Esq., PC

(57) ABSTRACT

A stormwater management inlet prefilter for system use in green infrastructure which typically includes either biofiltration (e.g. bioretention, tree planters, gravel wetlands) or infiltration (e.g. leech fields, dry wells, infiltration trenches and basins) that both provide recharge of stormwater runoff to groundwater aquifers and treated discharge to surface waters. The system can be used as an edge of curb system, a drop inlet, or inline. The system can be used both in retrofit or new installations and extends the operating life and reduces the maintenance burden of stormwater management systems by filtering out trash and debris at the inlet. The system enables the simplified maintenance of stormwater management systems at the inlet in an accessible location with no special equipment required. Installation is simple and comparable to common catch basins and grates. Preferably, the system is made of pre-cast concrete, HDPE, and stainless steel and is resistant to rust and rot from corrosive winter runoff. No special equipment necessary and maintenance is simple and utilizes standard vacuum trucks for catch basin cleaning by use of a pressure washer and vacuum equipment.

6 Claims, 64 Drawing Sheets

STAGE 3 - THE PRIMARY SUMP REGION IS FILLED WITH STORMWATER, WITH NO DEBRIS BLOCKING THE BAFFLE FLOW REGION, AND STORMWATER FLOWING FREELY THROUGH THE BAFFLE FLOW REGION, OVER THE WEIR WALL, AND THROUGH THE SCREENED FILTER AND OUT THE STORMWATER OUTLET

(51) Int. Cl.
  *E03F 1/00* (2006.01)
  *E01C 11/22* (2006.01)
  *B01D 21/00* (2006.01)
  *B01D 21/02* (2006.01)
  *C02F 1/00* (2006.01)
  *C02F 103/00* (2006.01)

(52) U.S. Cl.
  CPC .............. *B01D 21/02* (2013.01); *C02F 1/004* (2013.01); *E01C 11/227* (2013.01); *E03F 5/0403* (2013.01); *E03F 5/0404* (2013.01); *E03F 5/14* (2013.01); *C02F 2001/007* (2013.01); *C02F 2103/001* (2013.01)

(58) Field of Classification Search
  USPC .... 210/747.2, 747.3, 801, 170.03, 305, 521, 210/532.1, 538
  See application file for complete search history.

(56) References Cited

U.S. PATENT DOCUMENTS

| | | | |
|---|---|---|---|
| 6,569,321 | B2 | 5/2003 | Coffman |
| 6,797,161 | B2 * | 9/2004 | Use .................... B01D 21/0012 210/305 |
| 6,913,155 | B2 | 7/2005 | Bryant |
| 6,951,619 | B2 | 10/2005 | Bryant |
| 7,001,527 | B2 | 2/2006 | Stever |
| 7,022,243 | B2 | 4/2006 | Bryant |
| 7,033,496 | B2 * | 4/2006 | Thacker ............. B01D 17/0214 210/532.1 |
| 7,425,261 | B2 | 9/2008 | Siviter |
| 7,584,577 | B2 | 9/2009 | Esmond |
| 7,758,747 | B2 | 7/2010 | Bryant |
| 7,837,869 | B2 | 11/2010 | Peters, Jr. |
| 7,846,327 | B2 | 12/2010 | Happel |
| 8,012,346 | B2 | 9/2011 | Peters, Jr. |
| 8,083,937 | B2 | 12/2011 | Happel |
| 8,113,740 | B2 | 2/2012 | Boulton |
| 8,123,935 | B2 | 2/2012 | Murray |
| 8,142,666 | B1 | 3/2012 | Happel |
| 8,147,688 | B2 | 4/2012 | Adams |
| 8,168,064 | B2 | 5/2012 | Peters, Jr. |
| 8,318,015 | B2 | 11/2012 | Allen, II |
| 8,438,731 | B2 | 5/2013 | Peters, Jr. |
| 8,491,224 | B2 | 7/2013 | Cobb |
| 8,512,555 | B1 | 8/2013 | Allen, II |
| 8,623,203 | B2 | 1/2014 | Peters, Jr. |
| 8,658,044 | B2 | 2/2014 | Cobb |
| 8,715,507 | B2 | 5/2014 | Gulliver |
| 8,746,463 | B2 | 6/2014 | Cobb |
| 8,888,481 | B2 | 11/2014 | O'Neill |
| 8,889,000 | B2 | 11/2014 | Hannemann |
| 8,974,664 | B2 | 3/2015 | Beatt |
| 9,045,891 | B2 | 6/2015 | Peters, Jr. |
| 9,222,248 | B2 | 12/2015 | Anderson |
| 9,273,457 | B2 | 3/2016 | Kent |
| 9,506,233 | B2 | 11/2016 | Allard |
| 9,644,334 | B2 | 5/2017 | O'Neill |
| 9,809,969 | B2 | 11/2017 | Kent |
| 9,827,510 | B2 | 11/2017 | Garbon |
| 9,908,800 | B2 | 3/2018 | Weiss |
| 2002/0139736 | A1 | 10/2002 | Stever |
| 2004/0045907 | A1 * | 3/2004 | Collings ................... E03F 5/14 210/170.03 |
| 2004/0055950 | A1 | 3/2004 | Bryant |
| 2004/0222159 | A1 * | 11/2004 | Peters, Jr. ................. C02F 1/42 210/170.03 |
| 2005/0040118 | A1 | 2/2005 | Bryant |
| 2005/0109707 | A1 | 5/2005 | Bryant |
| 2006/0157428 | A1 * | 7/2006 | Brody ...................... E03F 5/14 210/801 |
| 2008/0217257 | A1 * | 9/2008 | Pank .......................... E03F 5/14 210/747.3 |
| 2009/0014370 | A1 | 1/2009 | Peters, Jr. |
| 2009/0090664 | A1 | 4/2009 | Eberly |
| 2009/0101555 | A1 | 4/2009 | Scarpine |
| 2009/0166278 | A1 | 7/2009 | Bryant |
| 2009/0166279 | A1 | 7/2009 | Happel |
| 2009/0200216 | A1 | 8/2009 | Robinson |
| 2009/0236273 | A1 | 9/2009 | Esmond |
| 2010/0078370 | A1 | 4/2010 | Happel |
| 2011/0198273 | A1 | 8/2011 | Snyder |
| 2012/0031851 | A1 | 2/2012 | Gulliver |
| 2012/0031854 | A1 | 2/2012 | Allard |
| 2012/0132581 | A1 | 5/2012 | Williams |
| 2012/0187031 | A1 | 7/2012 | Beatt |
| 2012/0312736 | A1 | 12/2012 | Peters, Jr. |
| 2013/0043171 | A1 | 2/2013 | Khalil |
| 2013/0068679 | A1 | 3/2013 | Hannemann |
| 2013/0180903 | A1 | 7/2013 | Kowalsky |
| 2013/0180929 | A1 | 7/2013 | Kowalsky |
| 2013/0206661 | A1 | 8/2013 | Stein |
| 2013/0264257 | A1 | 10/2013 | Anderson |
| 2013/0264258 | A1 | 10/2013 | Anderson |
| 2014/0116958 | A1 | 5/2014 | Peters, Jr. |
| 2014/0367328 | A1 | 12/2014 | Allard |
| 2015/0114893 | A1 * | 4/2015 | Moll .................... E03F 5/0404 210/170.03 |
| 2015/0182881 | A1 | 7/2015 | Wright |
| 2015/0183659 | A1 | 7/2015 | Kent |
| 2015/0183660 | A1 | 7/2015 | Wright |
| 2016/0001201 | A1 | 1/2016 | Hannemann |
| 2017/0197157 | A1 | 7/2017 | Kent |
| 2017/0284077 | A1 | 10/2017 | Deurloo |
| 2017/0321412 | A1 | 11/2017 | Peters |
| 2018/0073209 | A1 | 3/2018 | Pierce, Jr. |
| 2018/0087262 | A1 | 3/2018 | Kent |
| 2019/0210894 | A1 | 7/2019 | Bryant |
| 2019/0226192 | A1 | 7/2019 | Bryant |

FOREIGN PATENT DOCUMENTS

| | | |
|---|---|---|
| WO | 05051848 | 9/2005 |
| WO | 2006012648 A2 | 2/2006 |
| WO | 2006012648 A3 | 2/2006 |
| WO | 19139929 | 7/2019 |
| WO | 19147526 | 8/2019 |

OTHER PUBLICATIONS

Ecosense International, "Storm Debris Systems, Storm Water Filters", Jan. 2017, (pp. 1-2).
National Precast Concrete Association, "Precast Concrete Stormwater Mnagement Structures", Jan. 2011, (pp. 1-12).
Contech Engineered Solutions, "Hydrodynamic Separation: Solutions Guide", 2017, (pp. 1-8).
Rotondo Environmental Solutions, "HydroLock: Water-Tight Box Culvert System", (pp. 1-2).
United Laboratories, "Pit Bull: Catch Basin Filter", Jan. 2018, (pp. 1-3).
Detailed Engineering Diagram of Prototype PRETEX™ Inline Stormwater Pretreatment System, dated Aug. 28, 2017, by Robert Roseen of Waterstone Engineering, PLLC, Stratham, NH, USA, (1 Page).
Brochure for the HydroStorm Hydrodynamic Separator, Hydroworks LLC, Oct. 2016, (1 page).
Con Cast Pipe Brochure for the Hydroguard Stormwater Hydrodynamic Separator, licensed to Con Cast Pipe of Puslinch ON, Canada by Hydroworks LLC, Oct. 2016, (1 page).
Hydroworks Brochure for the Hydroguard Stormwater Hydrodynamic Separator, by Hydroworks LLC, Oct. 2018, (2 pages).
Hydroworks Technical Manual Version 2.6 for the Hydroworks Hydroguard Stormwater Hydrodynamic Separator, by Hydroworks LLC, Oct. 2018, (61 pages).
PRECON Brochure for the PRECON Hydroguard Stormwater Hydrodynamic Separator, licensed to PreCon Canada by Hydroworks LLC, Oct. 2016, (2 pages).

(56) References Cited

OTHER PUBLICATIONS

Product Line Brochure for the Hyroworks Product Line including the HydroGuard, HydroStorm, HydroFilter, and HydroBox Stormwater Hydrodynamic Separators, by Hydroworks LLC, Oct. 2018, (1 page).

* cited by examiner

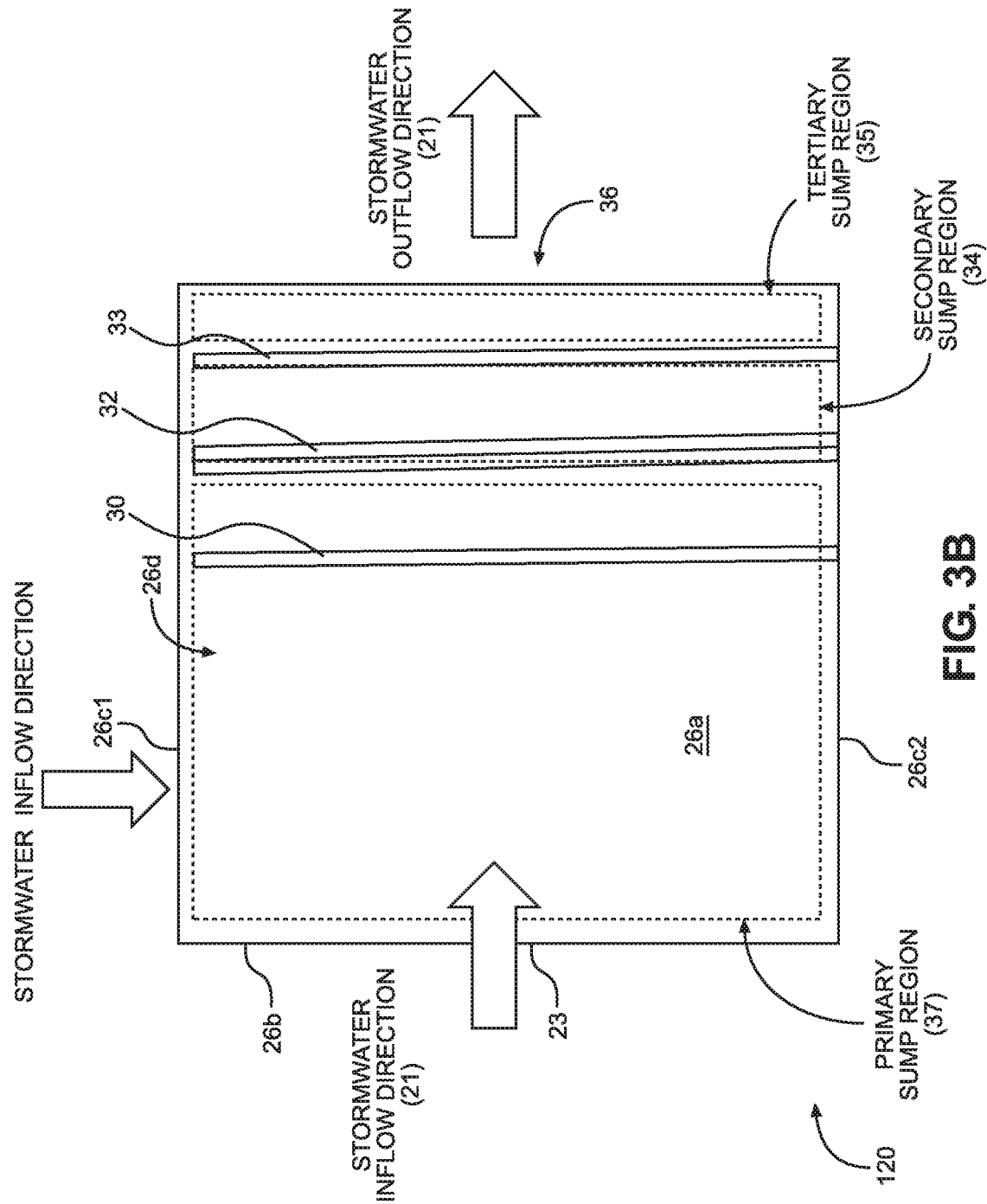

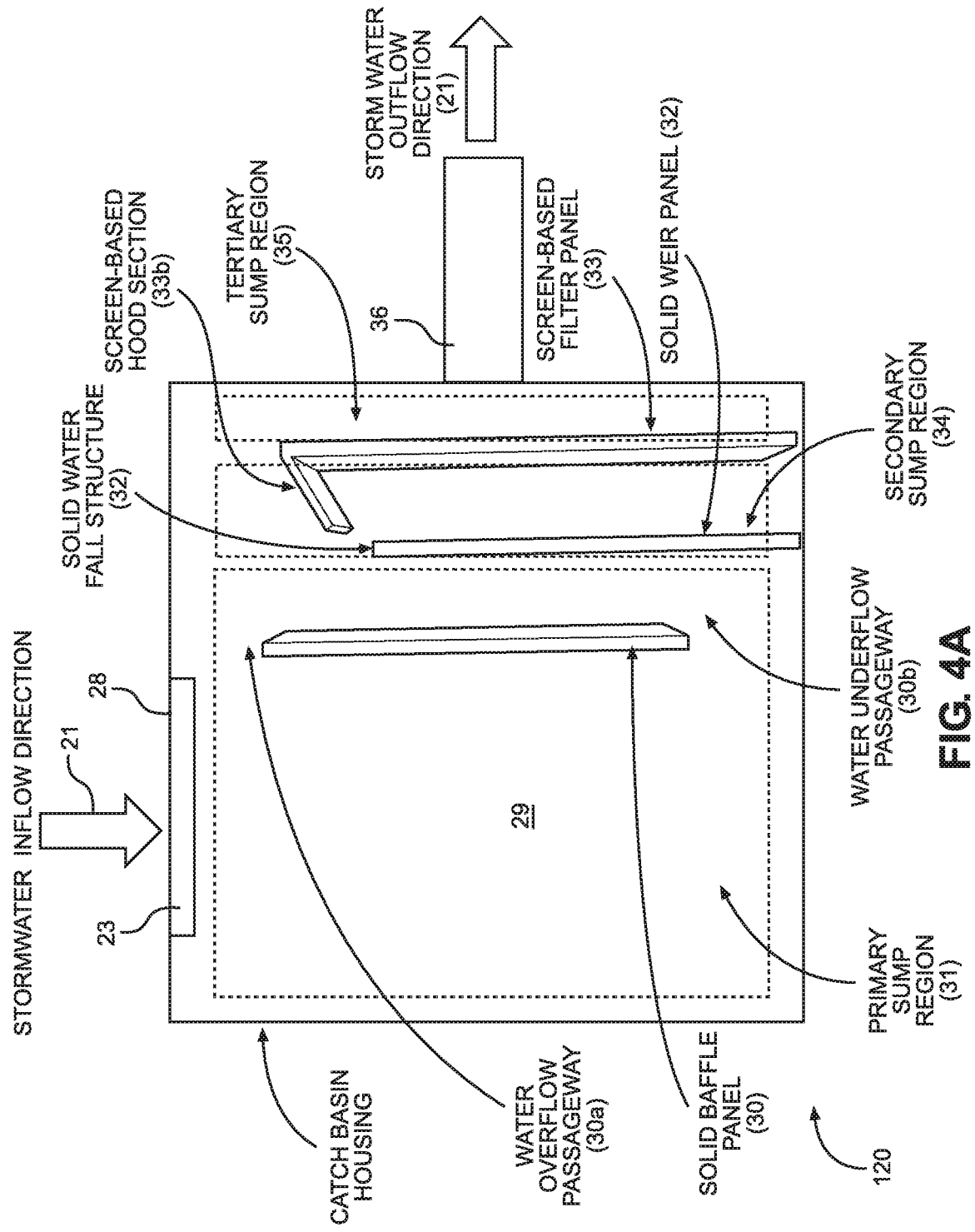

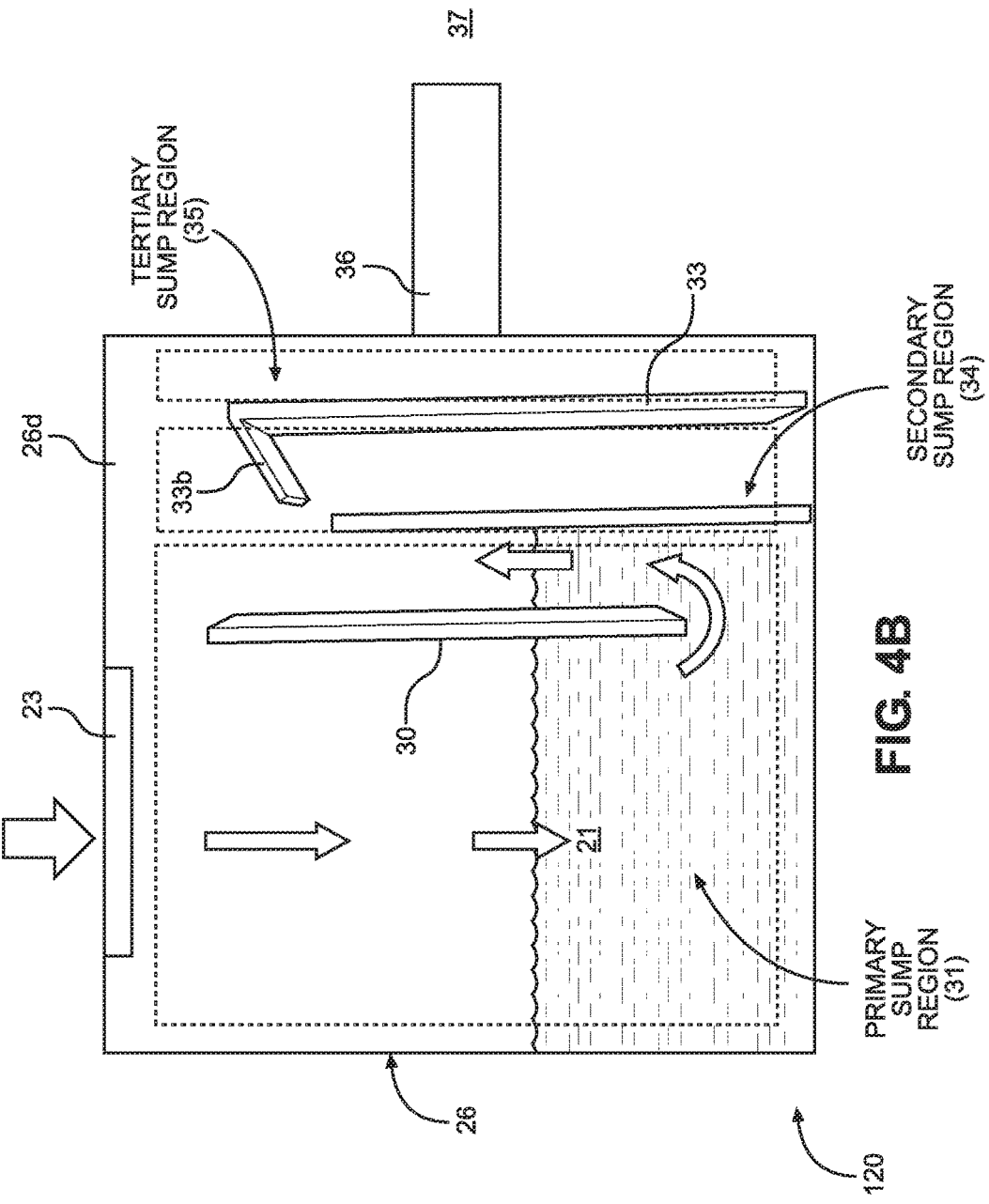

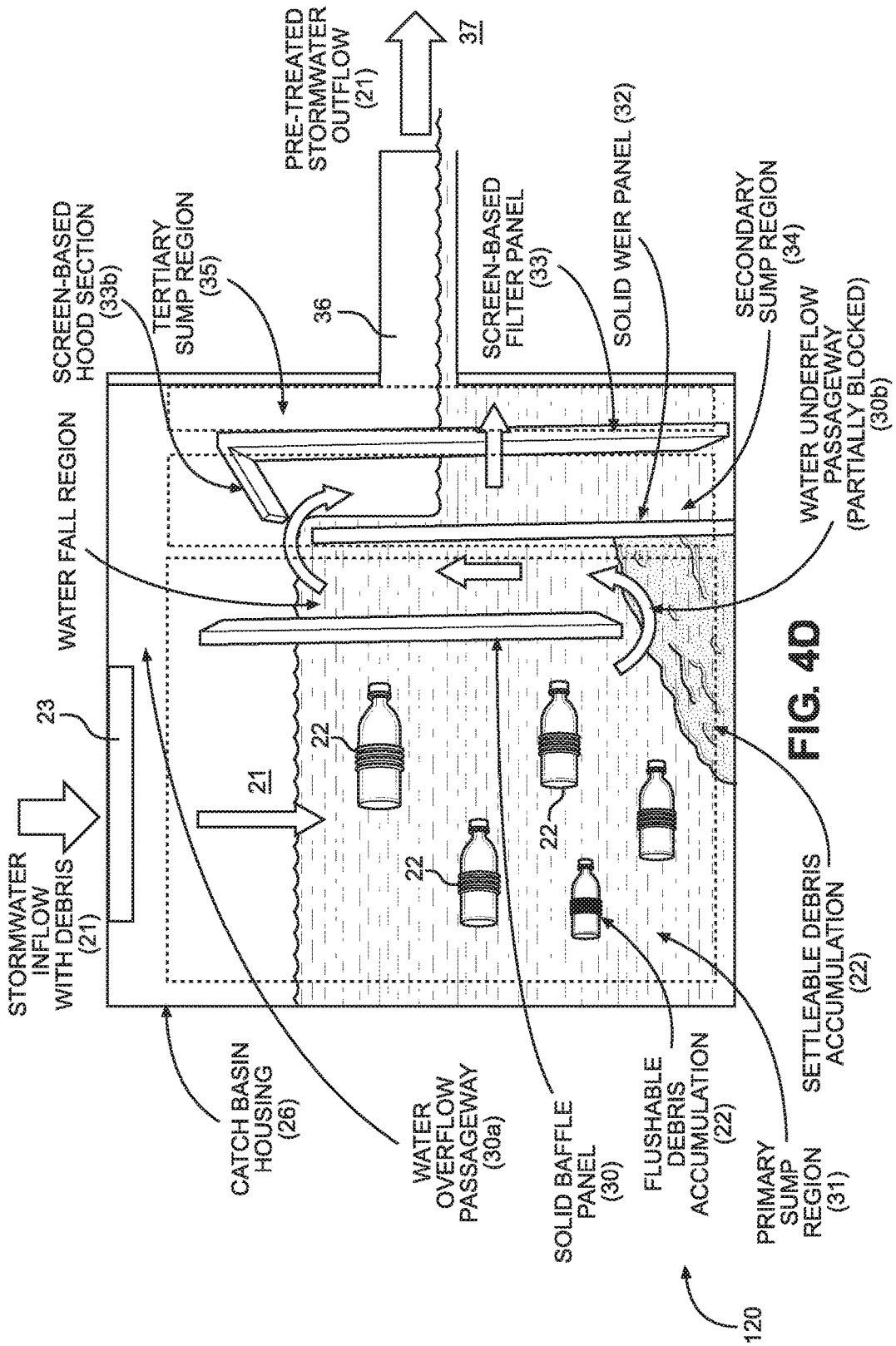

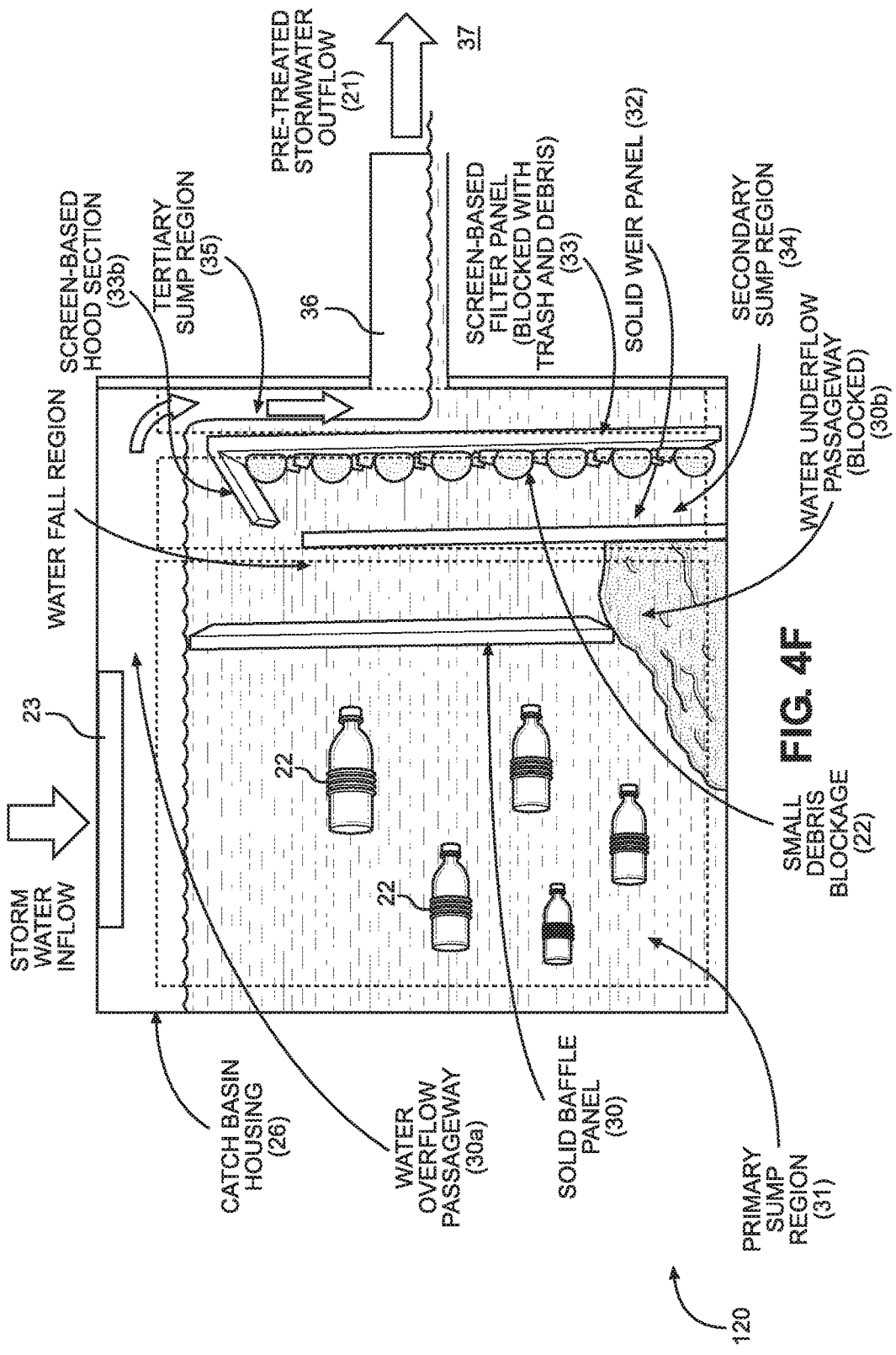

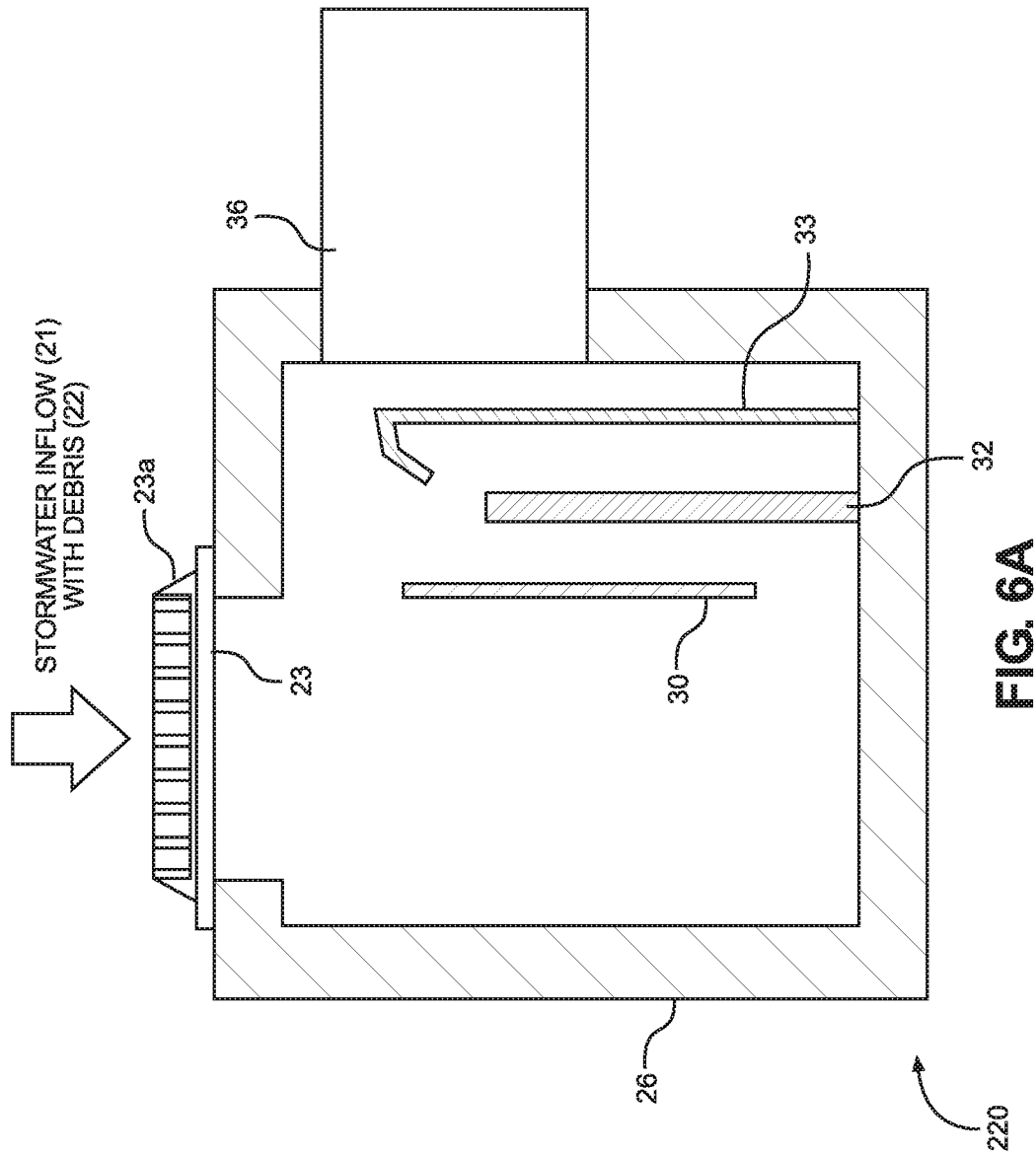

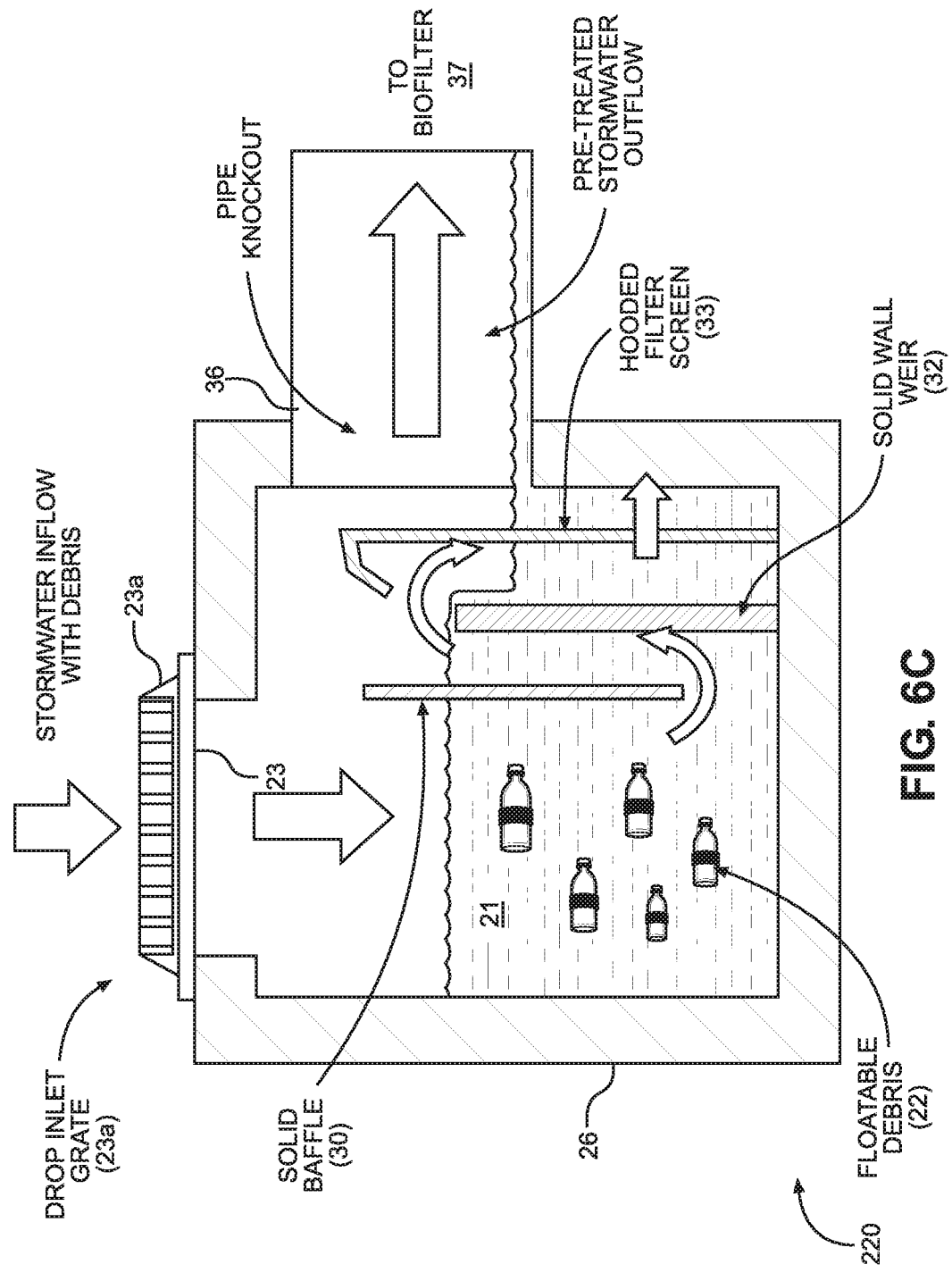

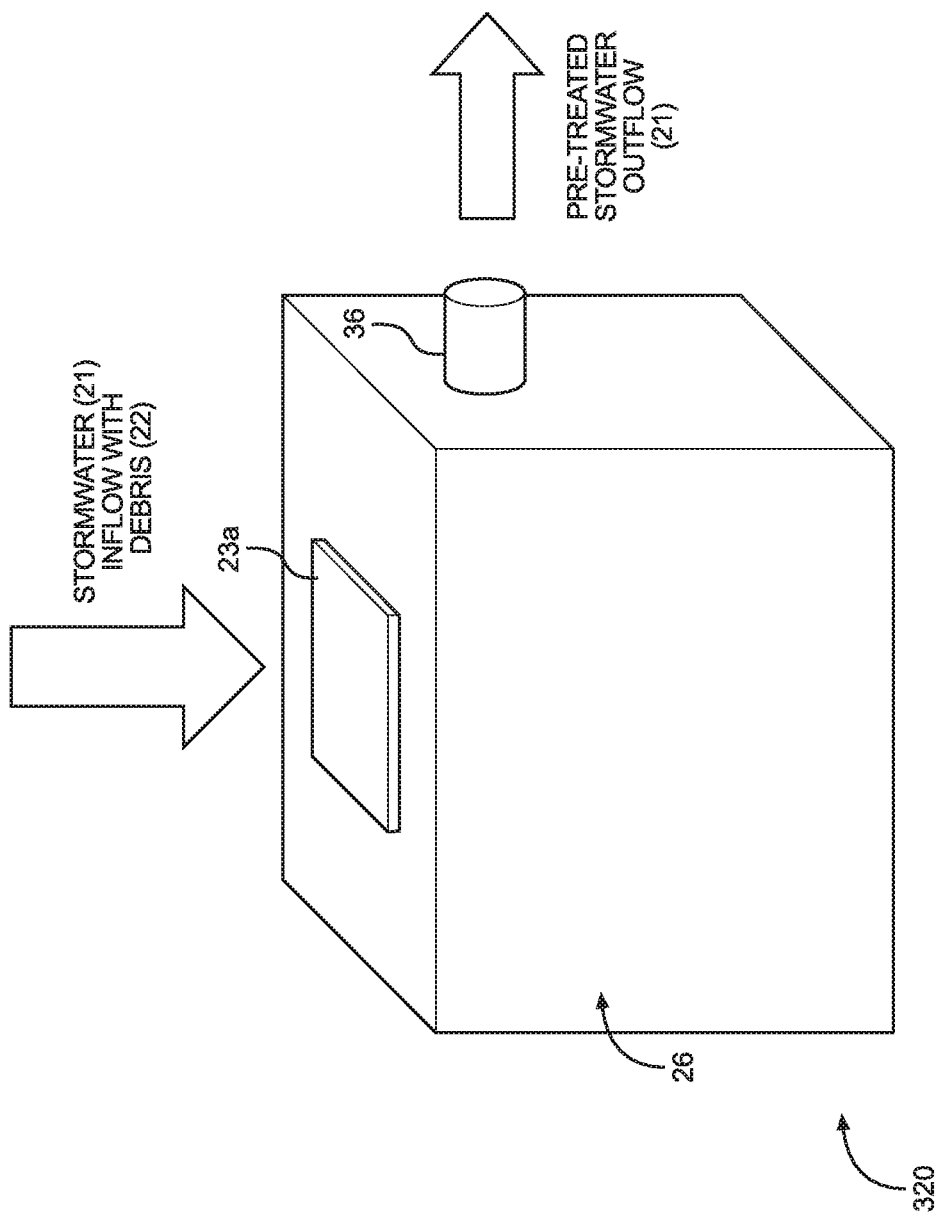

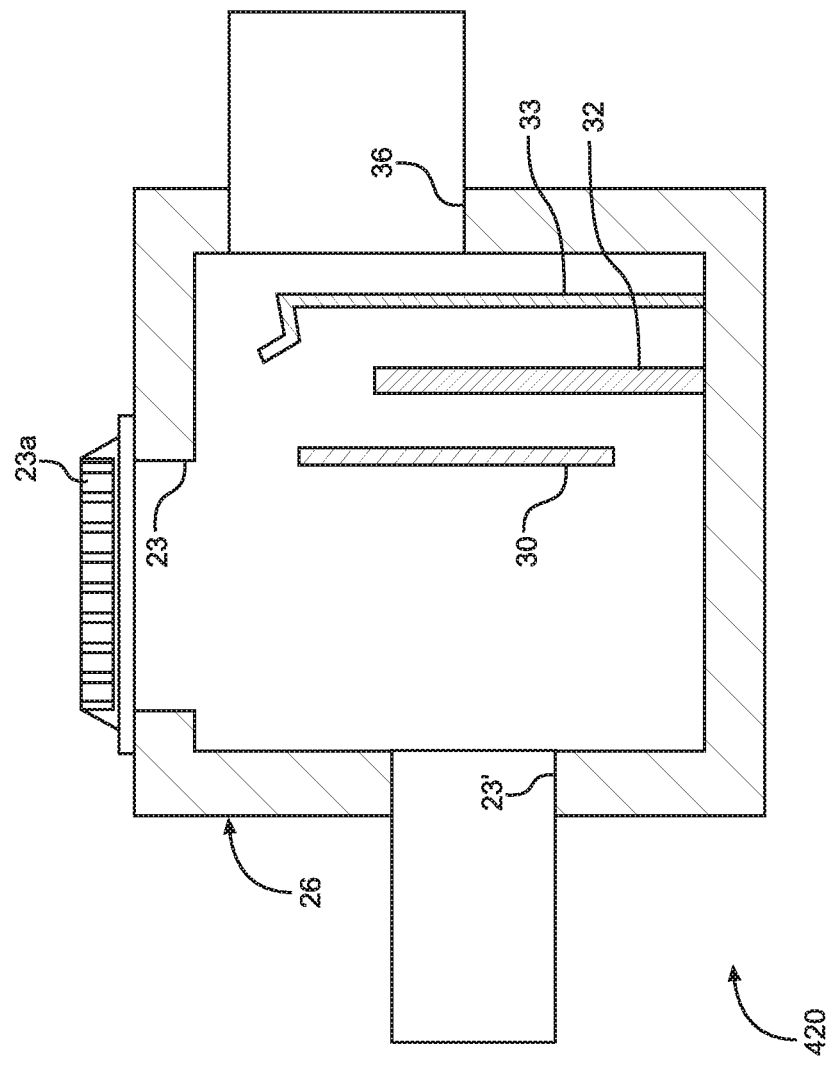

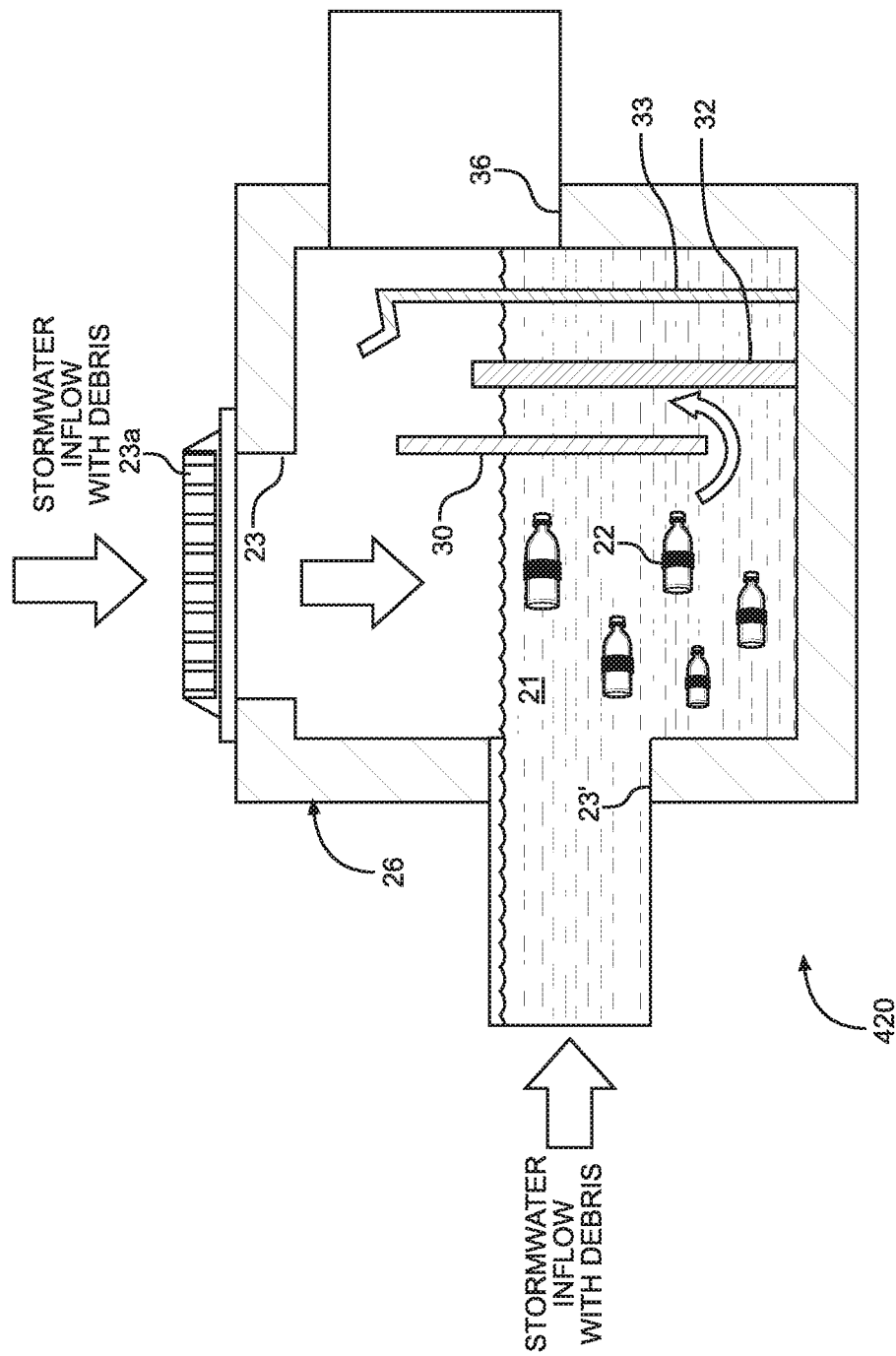

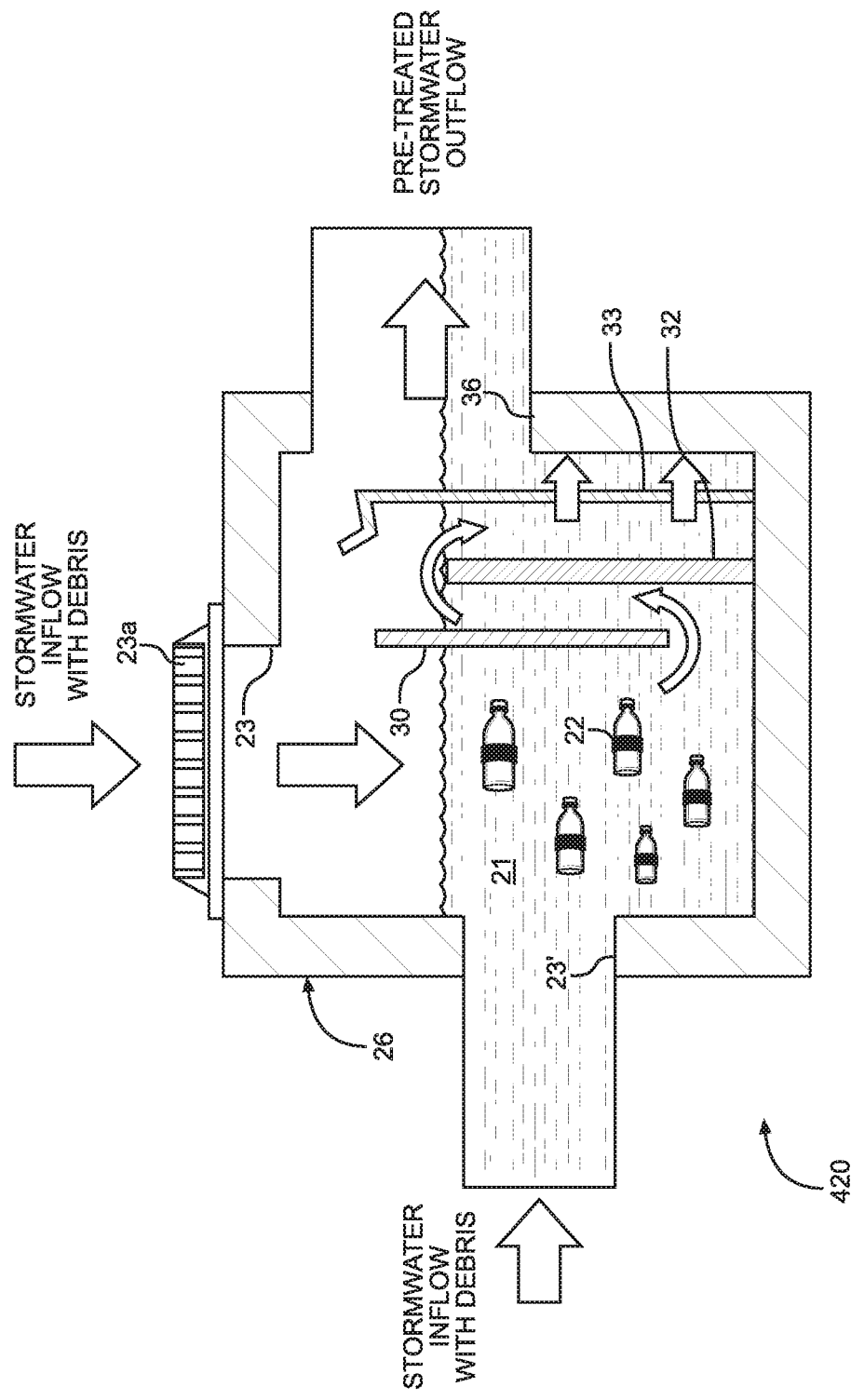

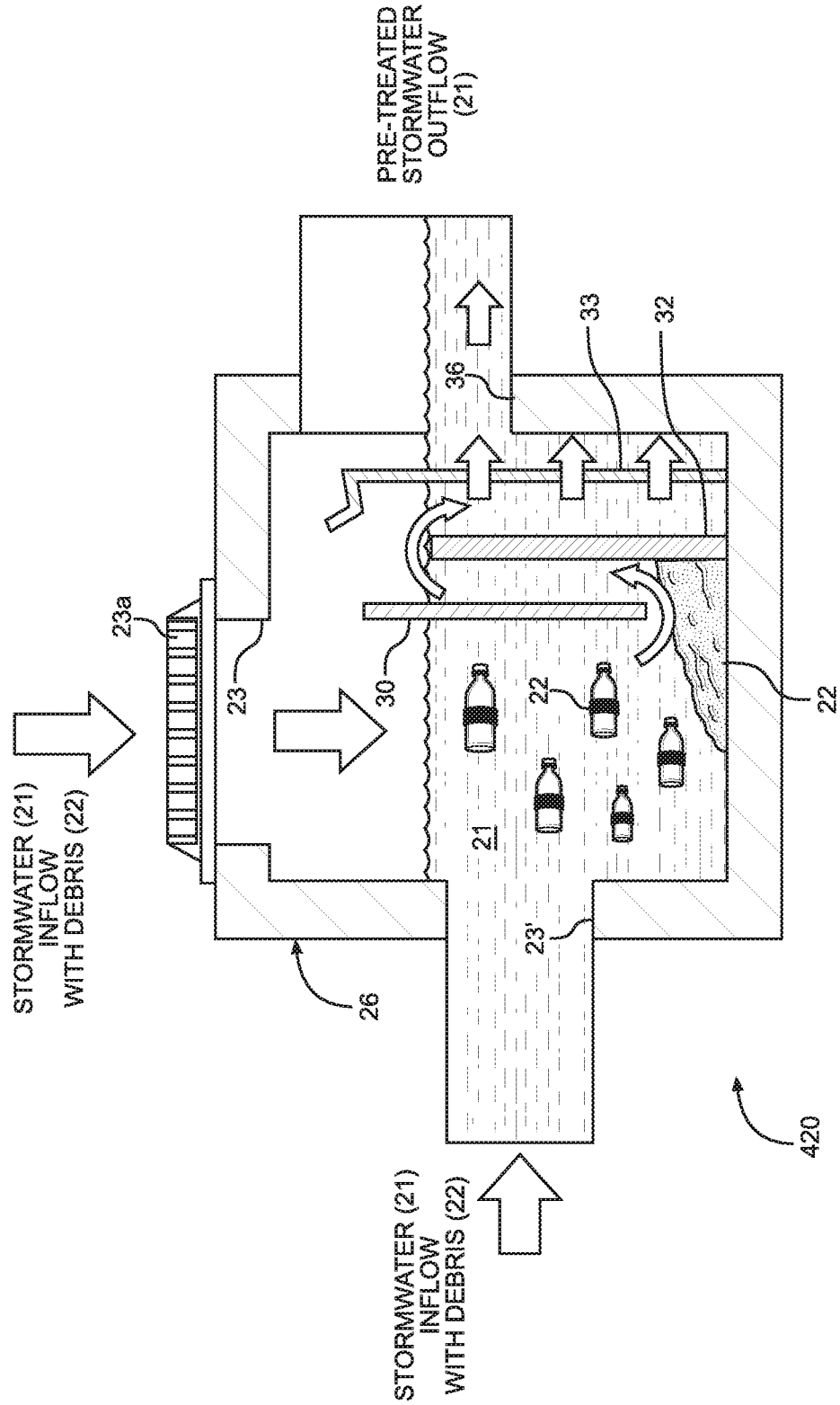

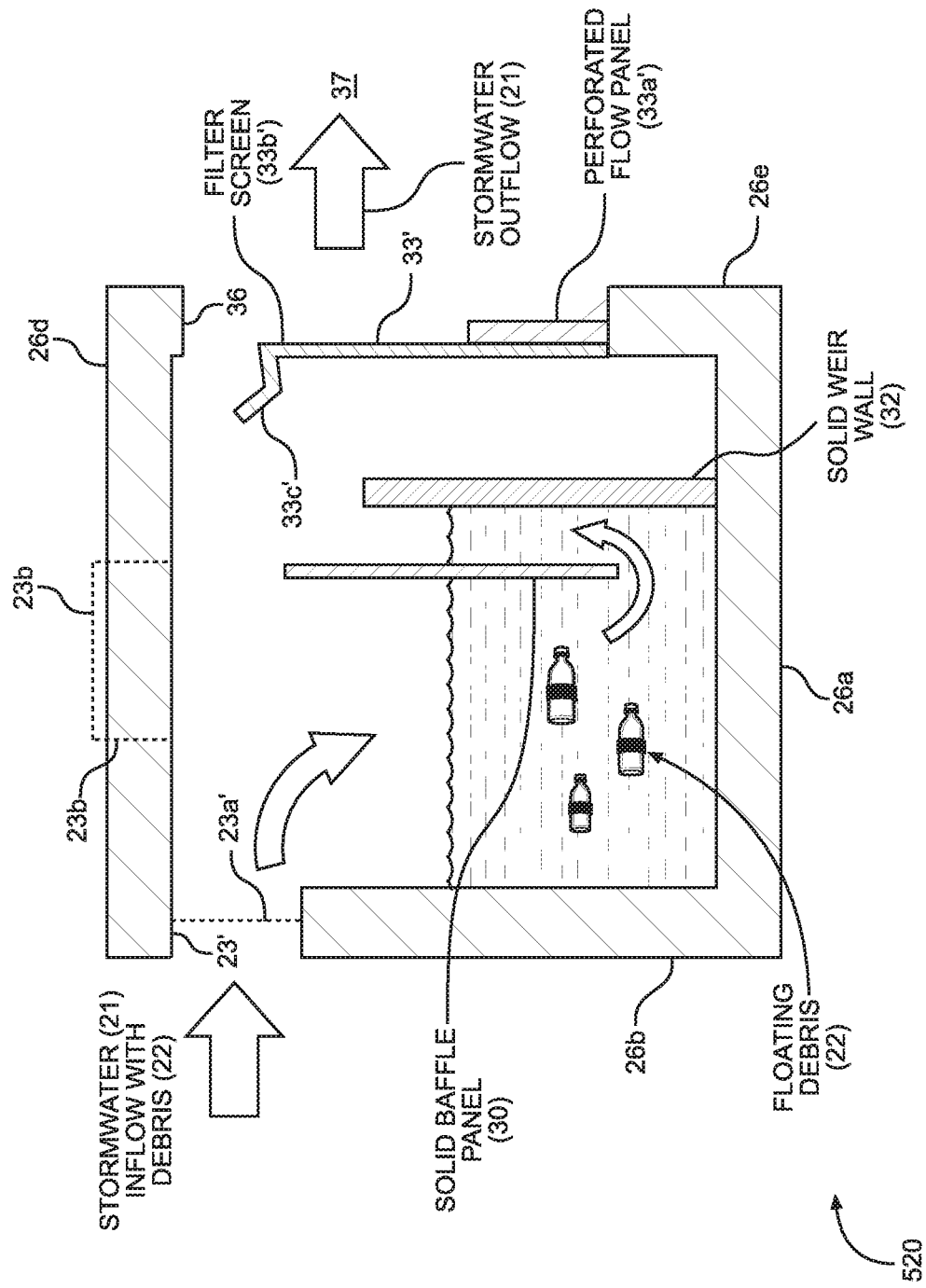

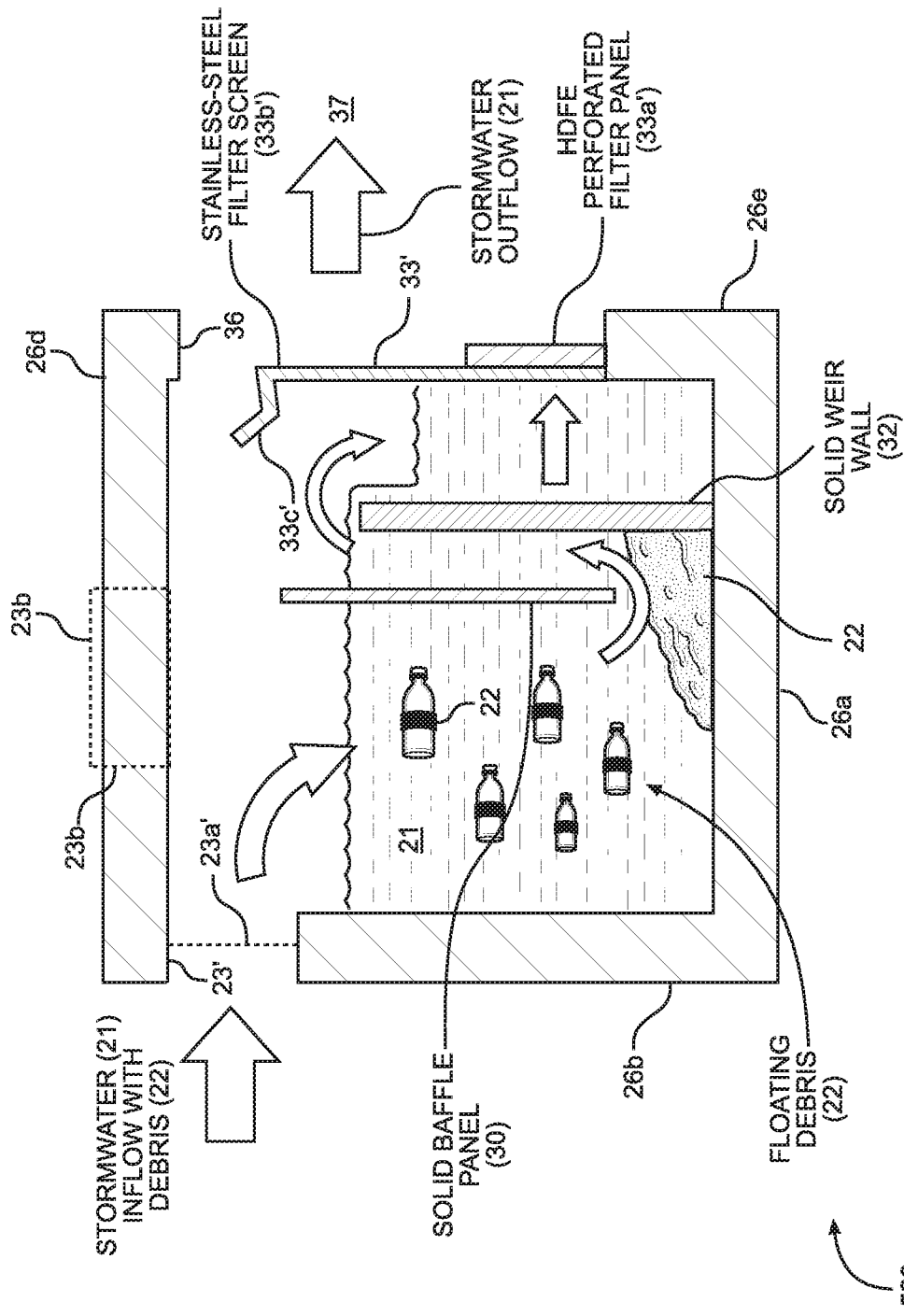

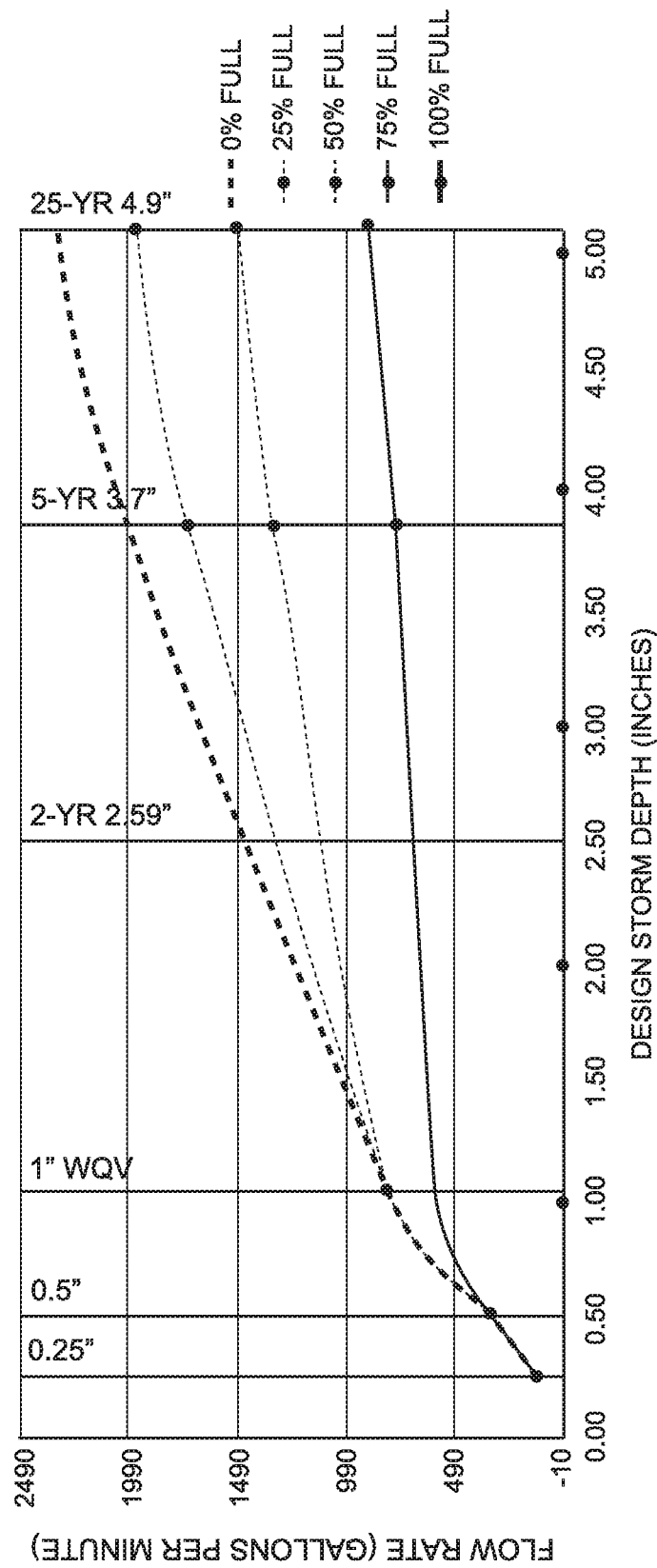

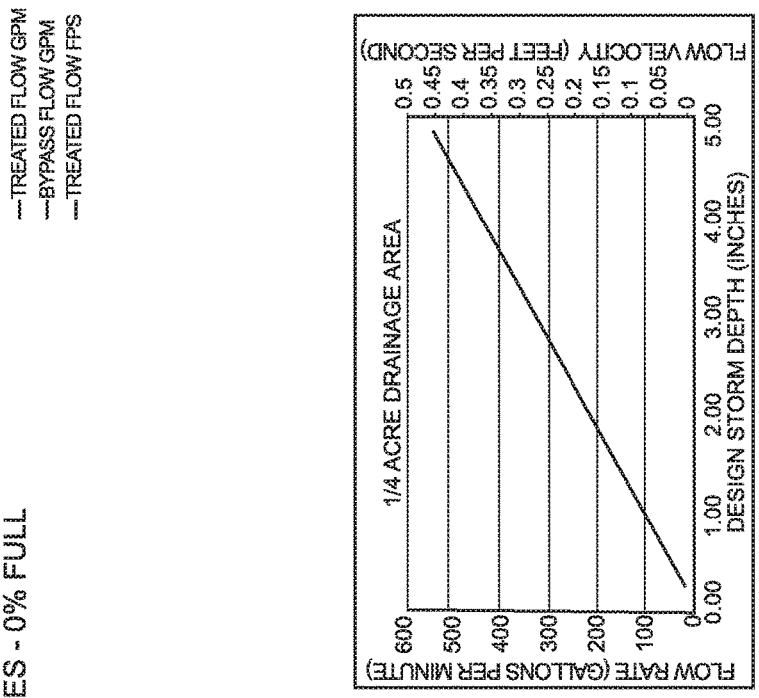
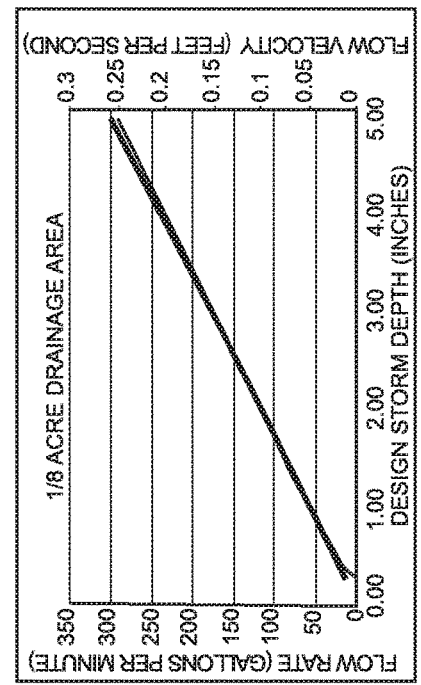
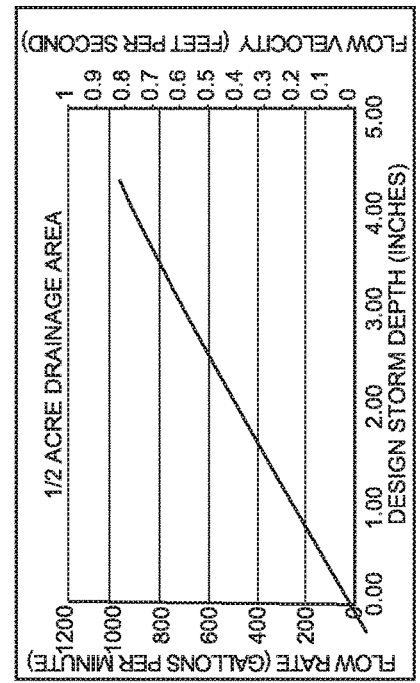
FIG. 15A
FIG. 15B
FIG. 15C

PERFORMACE CURVES - 25% FULL

PERFORMACE CURVES - 50% FULL

PERFORMACE CURVES - 75% FULL

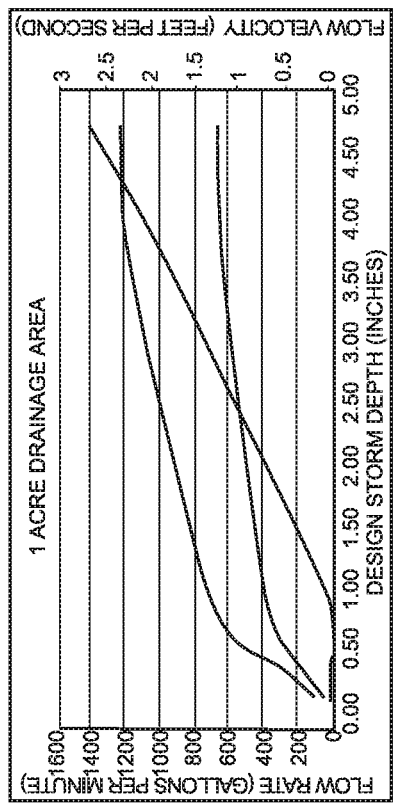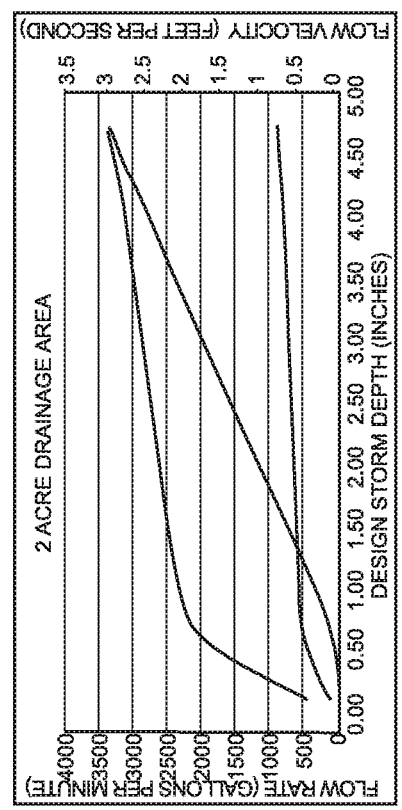

PERFORMACE CURVES - 100% FULL

IN-GROUND STORMWATER COLLECTION AND PRETREATMENT FILTRATION SYSTEMS

BACKGROUND OF INVENTION

Field of Invention

The present invention relates to improvements in stormwater management inlet prefiltering systems for use in biofiltration, infiltration, and drainage infrastructure for partial removal of sediment, sediment associated pollutants, trash, and debris.

BRIEF DESCRIPTION OF THE STATE OF THE KNOWLEDGE IN THE ART

It is well known that storms produce rain which creates stormwater. In turn, when not quickly collected and diverted, stormwater causes floods and great damage to property and risk to human life. To avoid problems caused by stormwater produced during rain storms, civil and environmental engineers develop stormwater collection and management systems for installation in parking lots, along roadways, along sidewalks, about buildings, and anywhere where there is a need to collect and manage stormwater to prevent flooding.

Historically, these systems include the installation of drainage infrastructure comprised of precast-concrete drain basins, interconnected with piping to convey collected stormwater to direct discharge at outfalls or to engineered treatment ponds (retention, detention) prior to discharge into rivers, streams and oceans. More recently there is a shift in focus towards green infrastructure which typically includes either biofiltration (e.g. bioretention, tree planters, gravel wetlands) or infiltration (e.g. leech fields, dry wells, infiltration trenches and basins) which both provide recharge of stormwater runoff to groundwater aquifers and treated discharge to surface waters. Green infrastructure, typically infiltration fields and biofiltration systems, is a form of advanced stormwater management which is more susceptible to clogging. This is because the unit treatment processes involved in filtration/infiltration are substantially different than conventional conveyance through large pipe networks. Commonly, such conventional stormwater collection basins have some type of inlet structure such as drain grates before their inflow ports or inlets to the drainage infrastructure network. Green infrastructure systems benefit from prefiltering at the system inlets in a manner to simplify maintenance and extend long-term functionality. A simple analogy is that in a similar manner as a home septic system involves a septic chamber for removal of debris and solids prior to infiltration in a leech field, green infrastructure similarly requires the removal debris and solids prior to infiltration or biofiltration. In either system, the absence of the pretreatment step will result in premature system failure. The current state of the practice for green infrastructure largely lacks effective pretreatment for urban and high use environments. The absence of which creates an unnecessary maintenance burden.

Prior art measures to provide precast-concrete stormwater collection basins with integrated filtering mechanisms are disclosed in U.S. Pat. No. 7,001,527. In FIG. 1, a prior art stormwater collection and pretreatment system is shown installed underground and comprising first and second storm water collection units 1 and 2 connected to a stormwater collection and pretreatment system 3 by a set of underground pipes coupling the collection basins of these three systems.

As shown in FIG. 1 of U.S. Pat. No. 7,001,527, the stormwater collection and pretreatment system 1 comprises: top-surface inflow ports 4A, 4B and 4C; pair of baffle panels 5A and 5B; a pair of weir walls 6A and 6B supported inside the collection basin or sump region of the system; and a filter screen 7 installed before the outflow port 5. The function of the baffle panels 5A and 5B and filter screen 7 is to pre-filter trash and debris. In this prior art system, accumulation of trash and debris requires frequent maintenance, and if not performed in a timely manner, this system is likely to cause backflow and flooding through the drain grates over the inflow ports 4A, 4B and 4C, resulting in flooding and associated damage of property.

As shown in FIGS. 2A and 2B of U.S. Pat. No. 7,001,527, the stormwater collection and pretreatment system 10 comprises: inflow port 11 and outflow port 12 formed in the block structure of the system; pair of weir panels 13A and 13B separating sump regions 12A, 12B and 12C as shown; and inclined baffles 14A and 14B mounted from the top of weir walls 13A and 13B, to trap and pre-filter trash and debris. In this prior art system, accumulation of trash and debris requires frequent maintenance, and if not performed in a timely manner, this system is likely to cause backflow and flooding often resulting in damage to property.

Clearly, there is a great and growing need for better, higher performance precast-concrete stormwater collection and pre-treatment products for use in diverse stormwater management applications, that support improved stormwater collection, filtering and pretreatment operations, with reduced failure due to backflows caused by clogging by debris, and consequential water damage caused by overflows and stormwater flooding.

Therefore, there is a great need for new and improved methods of and apparatus for collecting, filtering and pretreating stormwater prior to release into surface waters to prevent flooding and stormwater erosion and damage, while overcoming the shortcomings and drawbacks of prior art methods and apparatus.

OBJECTS AND SUMMARY OF SUMMARY OF INVENTION

Accordingly, a primary object of the present is to provide new and improved method of and system for pre-filtering trash and debris from stormwater collected from stormwater runoff flowing through in-line underground pipes, from top-surface storm drains, and from the edge of a curb system, while overcoming the shortcomings and drawbacks of prior art methods and apparatus.

Another object of the present is to provide such a new and improved stormwater collection and pretreatment system for use in biofiltration, infiltration, and drainage infrastructure for removal of trash and debris from runoff of collected stormwater.

Another object of the present invention is to provide such a new and improved system for use in both in retrofit or new installations that extends the operating life and reduces the maintenance burden of stormwater management systems, by filtering out trash and debris at the inlet.

Another object of the present invention is to provide such a new and improved stormwater collection and pretreatment system that enables the simplified maintenance of stormwater management systems at the inlet in an accessible location with no special equipment required and in a manner commonplace for municipal drainage infrastructure maintenance. Installation is simple and comparable to common precast drainage catch basins and grates.

Another object of the present invention is to provide such a new and improved stormwater collection and pretreatment system made of pre-cast concrete, HDPE, and stainless steel screen and which is resistant to rust and rot from corrosive winter runoff.

Another object of the present invention is to provide such a new and improved stormwater collection and pretreatment system which can be maintained using standard vacuum trucks for catch basin cleaning by simply removing the inspection cover and removing the debris using a pressure washer and vacuum equipment.

Another object of the present invention is to provide a new and improved stormwater collection and pretreatment system which solves multiple critical issues in the current state of the practice, namely: provides low maintenance and low maintenance cost; handles trash and debris below ground surface and does not create aesthetic concerns; provides low cost to purchase and install; requires small space constraints and fits within existing footprint of traditional applications; does not require special equipment, training, or personnel beyond traditional catch basin cleaning; and enables the maintenance on a 1-2 year intervals.

Another object of the present invention is to provide an improved stormwater collection and prefiltering management system for use in biofiltration, infiltration, and drainage infrastructure projects designed for collection and management of stormwater while removing trash and debris, to optimize maximum flow treatment rates (MFTR) through the pretreatment systems.

Another object of the present invention is to provide an improved stormwater collection and prefiltering management system that can be used both in retrofit or new installations and extends the operating life and reduces the maintenance burden of stormwater management systems by filtering out trash and debris at the inlet.

Another object of the present invention is to provide an improved stormwater collection and prefiltering management system that uses a combination of an inverted baffle to separate floatables, followed by a weir wall to remove settleables, followed by a unique hooded screen filter that filters items not removed by the previous processes.

Another object of the present invention is to provide an improved stormwater collection and prefiltering management system constructed in the form of a concrete block-like unit comprising: (i) a bottom wall portion, (ii) a first end wall portion extending from the bottom wall portion, (iii) a pair of first and second side wall portions ending from the bottom wall portion and disposed parallel to each other, and (iv) a top wall portion connected to the first end wall portion the first and second side wall portions, (v) a primary sump region with a 3D stormwater storage volume formed between the first end portion, the bottom wall portion, and the first and second side wall portions, (vi) at least one top inflow port formed in the top wall portion of the system and allowing stormwater with debris to flow through a grate structure and into the 3D stormwater storage volume, (vii) at least one side inflow port formed in the side wall portion of the system and allowing stormwater with debris to flow through a grate structure and into the 3D stormwater storage volume, (viii) a baffle wall portion suspended substantially perpendicularly to the bottom wall and water level surface and between the first and second side wall portions, at second end of the primary sump region and providing a underflow passageway, (ix) a weir wall portion mounted on the bottom wall surface and water level of the system and parallel to the baffle wall along the boundary of the primary sump region, (x) a filter-screen wall portion provided with a filter screen supported perpendicularly from the bottom wall surface and beyond the weir wall portion and forming (xi) a secondary sump region between the weir wall and the filter-screen wall, and (xii) a tertiary sump region provided beyond the filter-screen wall and supporting at least one outflow port allowing pretreated stormwater to flow through the tertiary sump region into the earth ground into which the system has been installed.

Another object of the present invention is to provide a process of stormwater pretreatment in a stormwater collection and pretreatment filtering system installed in a ground surface, comprising multiple phases of operation during a rain storm, namely: during a first phase of operation, where no stormwater is flowing through the top surface storm grate or front end wall portion into the primary sump region of the 3D stormwater storage volume of the system; during a second phase of operation, where stormwater is starting to flow through the top surface storm grate of front end wall portion and into the primary sump region of the system, flowing under the baffle wall, but not sufficiently filling the primary sump region for collected stormwater to flow over the weir wall portion; during a third phase of operation, wherein stormwater flowing through the storm grate over the too-surface inflow port has sufficiently filled the primary sump region, flowing under the baffle wall, and is flowing over the weir wall, and into the secondary sump region, and then flowing through the filter-screen wall portion from the secondary sump region into the tertiary sump region and out the outflow port for dispersion through the earth ground; during a fourth phase of operation, wherein stormwater flowing through the storm grate over the top-surface inflow port has sufficiently filled the primary sump region, flowing under the baffle wall, floatable debris is being captured behind the baffle wall, and settleable debris through hydrodynamic settling is being captured beneath the baffle wall along the underflow passageway prior to flowing up and over the weir wall and into the secondary sump region, and then flowing from the secondary sump region through the filter-screen wall portion into the tertiary sump region and out the outflow port for dispersion through the earth ground; during a fifth phase of operation, wherein stormwater flowing through the storm grate over the top-surface inflow port has sufficiently filled the primary sump region, debris beneath the baffle wall is completely blocking the underflow passageway, and stormwater in the primary sump region has risen to the top of the baffle wall portion and is flowing bypass over the baffle wall portion and then flowing over the weir wall portion, and through the filter-screen wall portion into the tertiary sump region and out the outflow port for dispersion through the earth ground; and during a sixth phase of operation, wherein stormwater flowing through the storm grate over the top-surface inflow port has sufficiently filled the primary sump region, debris beneath the baffle wall is completely blocking the underflow passageway, and debris buildup on the filter-screen wall portion is completely blocking stormwater flow therethrough, causing the stormwater to rise up and bypass flow over the baffle wall, weir wall, and over the filter-screen wall portion and into the tertiary sump region, and then out the outflow port for dispersion through the earth ground.

Another object of the present invention is to provide a stormwater collection and pretreatment filtering system constructed in the form of a concrete block-like unit comprising: (i) a bottom wall portion, (ii) a first end wall portion extending from the bottom wall portion, (iii) a pair of first and second side wall portions ending from the bottom wall portion and disposed parallel to each other, and (iv) a top wall portion connected to the first end wall portion the first and second side wall portions, (v) a primary sump region with a 3D stormwater storage volume formed between the first end portion, the bottom wall portion, and the first and second side wall portions, (vi) at least one top inflow port formed in the top wall portion of the system and allowing stormwater with debris to flow through a grate structure and into the 3D stormwater storage volume, (vii) at least one side inflow port formed in the side wall portion of the system and allowing stormwater with debris to flow through a grate structure and into the 3D stormwater storage volume, (viii) a baffle wall portion suspended substantially level if full of water and perpendicularly to the bottom wall surface and between the first and second side wall portions, at second end of the primary sump region, (ix) a level weir wall portion mounted on the bottom wall surface of the system and parallel to the level baffle wall along the boundary of the primary sump region and providing an underflow passageway for stormwater, (x) a filter-screen wall portion provided with a filter screen supported perpendicularly from the bottom wall surface and beyond the weir wall and forming (xi) a secondary sump region between the weir wall portion and the filter-screen wall portion, and (xii) a tertiary sump region provided beyond the filter-screen wall portion and supporting at least one outflow port allowing pretreated stormwater to flow through the tertiary sump region into the earth ground, into which the system has been installed.

Another object of the present invention is to provide a process of stormwater pretreatment in a stormwater collection and pretreatment filtering system installed in a ground surface, comprising multiple phases of operation during a rain storm, namely: during a first phase of operation, where no stormwater is flowing through the top surface storm grate into the primary sump region with the 3D stormwater storage volume of the system; during a second phase of operation, where stormwater is starting to flow through the top surface storm grate and into the primary sump region of the system, but not sufficiently filling the primary sump region to flow over the weir wall; during a third phase of operation, wherein stormwater flowing through the storm grate has sufficiently filled the primary sump region and is flowing over the weir wall, and into the secondary sump region, and then flowing through the filter-screen wall portion from the secondary sump region into the tertiary sump region and out the outflow port for dispersion through the earth ground; during a fourth phase of operation, wherein stormwater flowing through the storm grate has sufficiently filled the primary sump region, debris is building up beneath the baffle wall portion through hydrodynamic settling along the underflow passageway, and is flowing over the weir wall portion and into the secondary sump region, and then flowing from the secondary sump region through the filter-screen wall portion into the tertiary sump region and out the outflow port for dispersion through the earth ground; during a fifth phase of operation, wherein stormwater flowing through the storm grate has sufficiently filled the primary sump region, debris beneath the baffle wall is completely blocking the underflow passageway, and stormwater in the primary sump region has risen to the top of the level baffle wall and is flowing over the baffle wall portion and then flowing over the level weir wall portion, and through the filter-screen wall portion into the tertiary sump region and out the outflow port for dispersion through the earth ground; and during a sixth phase of operation, wherein stormwater flowing through the storm grate has sufficiently filled the primary sump region, debris beneath the baffle wall is completely blocking the underflow passageway, and debris buildup on the filter-screen wall portion is completely blocking stormwater flow therethrough, causing the stormwater to rise up and flow over the filter-screen wall portion and into the tertiary sump region, and then out the outflow port for dispersion through the earth ground.

Another object of the present invention is to provide a stormwater collection and pretreatment filtering system constructed in the form of a concrete block-like unit comprising: (i) a bottom wall portion, (ii) a first end wall portion extending from the bottom wall portion, (iii) a pair of first and second side wall portions ending from the bottom wall portion and disposed parallel to each other, and (iv) a top wall portion connected to the first end wall portion the first and second side wall portions, (v) a primary sump region with a 3D stormwater storage volume formed between the first end portion, the bottom wall portion, and the first and second side wall portions, (vi) at least one top inflow port formed in the top wall portion of the system and allowing stormwater with debris to flow through a grate structure and into the 3D stormwater storage volume, (vii) at least one side inflow port formed in the side wall portion of the system and allowing stormwater with debris to flow through a grate structure and into the 3D stormwater storage volume, (viii) a baffle wall portion suspended substantially level if full of water and perpendicularly to the bottom wall surface and between the first and second side wall portions, at second end of the primary sump region providing an underflow passageway, (ix) a level weir wall portion mounted on the bottom wall surface of the system and parallel to the level baffle wall along the boundary of the primary sump region, (x) a filter-screen wall portion provided with a filter screen supported perpendicularly from the bottom wall surface and beyond the weir wall portion and forming (xi) a secondary sump region between the weir wall portion and the filter-screen wall, and (xii) a tertiary sump region provided beyond the filter-screen wall and supporting at least one outflow port allowing pretreated stormwater to flow through the tertiary sump region into the earth ground into which the system has been installed.

Another object of the present invention is to provide a process of stormwater pretreatment in a stormwater collection and pretreatment filtering system installed in a ground surface, comprising multiple phases of operation during a rain storm, namely: during a first phase of operation, where no stormwater is flowing through the top surface storm grate into the primary sump region with the 3D stormwater storage volume of the system; during a second phase of operation, where stormwater is starting to flow through the top surface storm grate and into the primary sump region of the system, but not sufficiently filling the primary sump region to flow over the weir wall; during a third phase of operation, wherein stormwater flowing through the storm grate has sufficiently filled the primary sump region and is flowing over the weir wall, and then flowing through the filter-screen wall portion from the secondary sump region into the tertiary sump region and out the outflow port for dispersion through the earth ground; during a fourth phase of operation, wherein stormwater flowing through the storm grate has sufficiently filled the primary sump region, debris is building up beneath the baffle wall along the underflow passageway, and is flowing over the weir wall and into the secondary sump region, and then flowing from the secondary sump region through the filter-screen wall portion into the tertiary sump region and out the outflow port for dispersion through the earth ground; during a fifth phase of operation, wherein stormwater flowing through the storm grate has sufficiently filled the primary sump region, debris beneath the baffle wall is completely blocking the underflow passageway, and stormwater in the primary sump region has risen to the top of the baffle wall and is flowing over the baffle wall and then flowing over the weir wall, and through the filter-screen wall portion into the tertiary sump region and out the outflow port for dispersion through the earth ground; and during a sixth phase of operation, wherein stormwater flowing through the storm grate has sufficiently filled the primary sump region, debris beneath the baffle wall is completely blocking the underflow passageway, and debris buildup on the filter-screen wall portion is completely blocking stormwater flow therethrough, causing the stormwater to rise up and flow over the filter-screen wall portion and into the tertiary sump region, and then out the outflow port for dispersion through the earth ground.

Another object of the present invention is to provide a stormwater collection and pretreatment filtering system constructed in the form of a concrete block-like unit comprising: (i) a bottom wall portion, (ii) a first end wall portion extending from the bottom wall portion, (iii) a pair of first and second side wall portions ending from the bottom wall portion and disposed parallel to each other, and (iv) a top wall portion connected to the first end wall portion the first and second side wall portions, (v) a primary sump region with a 3D stormwater storage volume formed between the first end portion, the bottom wall portion, and the first and second side wall portions, (vi) at least one top inflow port formed in the top wall portion of the system and allowing stormwater with debris to flow through a grate structure and into the 3D stormwater storage volume, (vii) at least one side inflow port formed in the side wall portion of the system and allowing stormwater with debris to flow through a grate structure and into the 3D stormwater storage volume, (viii) a baffle wall portion suspended substantially level if full of water and perpendicularly to the bottom wall surface and between the first and second side wall portions, at second end of the primary sump region and providing on underflow passageway, (ix) a level weir wall portion mounted on the bottom wall surface of the system and parallel to the level baffle wall along the boundary of the primary sump region, (x) a filter-screen wall provided with a filter screen supported perpendicularly from the bottom wall surface and beyond the weir wall and forming (xi) a secondary sump region between the weir wall and the filter-screen wall, and (xii) a tertiary sump region provided beyond the filter-screen wall and supporting at least one outflow port allowing pretreated stormwater to flow through the tertiary sump region into the earth ground into which the system has been installed.

Another object of the present invention is to provide a process of stormwater pretreatment in a stormwater collection and pretreatment filtering system installed in a ground surface, comprising multiple phases of operation during a rain storm, namely: during a first phase of operation, where no stormwater is flowing through the top surface storm grate into the primary sump region with the 3D stormwater storage volume of the system; during a second phase of operation, where stormwater is starting to flow through the top surface storm grate and into the primary sump region of the system, but not sufficiently filling the primary sump region to flow over the weir wall; during a third phase of operation, wherein stormwater flowing through the storm grate has sufficiently filled the primary sump region and is flowing over the weir wall, and into the secondary sump region, and then flowing through the filter-screen wall portion from the secondary sump region into the tertiary sump region and out the outflow port for dispersion through the earth ground; during a fourth phase of operation, wherein stormwater flowing through the storm grate has sufficiently filled the primary sump region, debris is building up beneath the baffle wall along the underflow passageway, and is flowing over the level weir wall and into the secondary sump region, and then flowing from the secondary sump region through the filter-screen wall portion into the tertiary sump region and out the outflow port for dispersion through the earth ground; during a fifth phase of operation, wherein stormwater flowing through the storm grate has sufficiently filled the primary sump region, debris beneath the baffle wall is completely blocking the underflow passageway, and stormwater in the primary sump region has risen to the top of the baffle wall and is flowing over the level baffle wall and then flowing over the level weir wall, and through the filter-screen wall portion into the tertiary sump region and out the outflow port for dispersion through the earth ground; and during a sixth phase of operation, wherein stormwater flowing through the storm grate has sufficiently filled the primary sump region, debris beneath the baffle wall is completely blocking the underflow passageway, and debris buildup on the filter-screen wall portion is completely blocking stormwater flow therethrough, causing the stormwater to rise up and flow over the filter-screen wall portion and into the tertiary sump region, and then out the outflow port for dispersion through the earth ground.

Another object of the present invention is to provide a stormwater collection and pretreatment filtering system constructed in the form of a concrete block-like unit comprising: (i) a bottom wall portion, (ii) a first end wall portion extending from the bottom wall portion, (iii) a pair of first and second side wall portions ending from the bottom wall portion and disposed parallel to each other, and (iv) a top wall portion connected to the first end wall portion the first and second side wall portions, (v) a primary sump region with a 3D stormwater storage volume formed between the first end portion, the bottom wall portion, and the first and second side wall portions, (vi) a curbside inflow port formed in the top wall portion of the system and covered with a grate structure (e.g. screen or cast-metal grating) and allowing stormwater with debris to flow through the inflow port and into the 3D stormwater storage volume, (vii) a baffle wall portion suspended substantially level if full of water and perpendicularly to the bottom wall surface and between the first and second side wall portions, at second end of the primary sump region, (viii) a level weir wall portion mounted on the bottom wall surface of the system and parallel to the level baffle wall along the boundary of the primary sump region, (iv) a filter-screen wall portion provided with a hooded stainless-steel filter screen and HDPE perforated panel supported perpendicularly between the side wall portions, above the bottom wall surface and beyond the weir wall portion, and forming (x) a secondary sump region between the weir wall portion and the filter-screen wall portion, and (xi) a tertiary sump region provided beyond the filter-screen wall portion and supporting at least one outflow port allowing pretreated stormwater to flow through the filter-screen wall portion into the tertiary sump region for dispersion into the earth ground or biofiltration field adjacent the system.

Another object of the present invention is to provide a process of stormwater pretreatment in a curbside stormwater collection ad pretreatment filtering system installed in a ground surface, comprising multiple phases of operation during a rain storm, namely: during a first phase of operation, where no stormwater is flowing through the top surface storm grate into the primary sump region with the 3D stormwater storage volume of the system; during a second phase of operation, where stormwater is starting to flow through the top surface storm grate and into the primary sump region of the system, but not sufficiently filling the primary sump region to flow over the weir wall; during a third phase of operation, wherein stormwater flowing through the storm grate has sufficiently filled the primary sump region and is flowing over the level weir wall, and into the secondary sump region, and then flowing through the filter-screen wall portion from the secondary sump region into the tertiary sump region and through the outflow port for dispersion through the earth ground; during a fourth phase of operation, wherein stormwater flowing through the storm grate has sufficiently filled the primary sump region, debris is building up beneath the level baffle wall along the underflow passageway, and is flowing over the weir wall and into the secondary sump region, and then flowing from the secondary sump region through the filter-screen wall portion into the tertiary sump region and through the outflow port for dispersion through the earth ground; during a fifth phase of operation, wherein stormwater flowing through the storm grate has sufficiently filled the primary sump region, debris beneath the baffle wall is completely blocking the underflow passageway, and stormwater in the primary sump region has risen to the top of the baffle wall and is flowing over the baffle wall and then flowing over the weir wall, and through the filter-screen wall portion into the tertiary sump region and through the outflow port for dispersion through the earth ground; during a sixth phase of operation, wherein stormwater flowing through the storm grate has sufficiently filled the primary sump region, debris beneath the baffle wall is completely blocking the underflow passageway, and debris buildup on the filter-screen wall portion is completely blocking stormwater flow therethrough, causing the stormwater to rise up and flow over the filter-screen wall portion and into the tertiary sump region, and then through the outflow port for dispersion through the earth ground.

Another object of the present invention is to provide a method of designing a stormwater collection and pretreatment system employing any one of the stormwater pretreatment systems of the present invention, involving (a) determining the drainage area and design storm requirements based on your project needs and local jurisdiction, (b) calculating the maximum treatment flow rate (MTFR) for the given conditions of drainage area and design storm, (c) using design curves to identify the MTFR for the system for the desired drainage area and design storm at 0% full, (d) verifying the MTFR at 50% full can pass the required design storm, and if not, then proceeding to the next smaller drainage area, and (e) using the performance curves to verify the sum of treated flow and bypass flow can pass the 25-year design storm at 0% and 50% full, and if not, then proceeding to the next smaller drainage area.

Another object of the present invention is to provide an improved stormwater collection and prefiltering management system is sized hydraulically for high flow bypass to occur by overtopping the baffle panel, weir wall and screen non-design storms and redundancy in the event of lack of maintenance or clogging.

Another object of the present invention is to provide an improved stormwater collection and prefiltering management system has an outflow filter screen placed below the surface of a biofilter media which allows the system to drain between storm events if desired.

These and other benefits and advantages to be gained using the features of the present invention will become more apparent hereinafter and in the appended Claims to Invention.

BRIEF DESCRIPTION OF THE DRAWINGS

The following Objects of the Present Invention will become more fully understood when read in conjunction of the Detailed Description of the Illustrative Embodiments, and the appended Drawings, wherein:

FIG. 3B is a plan view of the first illustrative embodiment of the stormwater collection and pretreatment filtering system of the present invention illustrated in FIG. 3A, constructed in the form of a concrete block-like unit comprising (i) a bottom wall portion, (ii) a first end wall portion extending from the bottom wall portion, (iii) a pair of first and second side wall portions ending from the bottom wall portion and disposed parallel to each other, and (iv) a top wall portion connected to the first end wall portion the first and second side wall portions, (v) a primary sump region with a 3D stormwater storage volume formed between the first end portion, the bottom wall portion, and the first and second side wall portions, (vi) at least one top inflow port formed in the top wall portion of the system and allowing stormwater with debris to flow through a grate structure and into the 3D stormwater storage volume, (vii) at least one side inflow port formed in the side wall portion of the system and allowing stormwater with debris to flow through a grate structure and into the 3D stormwater storage volume, (viii) a baffle wall portion suspended substantially perpendicularly to the bottom wall surface and between the first and second side wall portions, at second end of the primary sump region and providing a underflow passageway, (ix) a weir wall portion mounted on the bottom wall surface of the system and parallel to the baffle wall along the boundary of the primary sump region, (x) a filter-screen wall portion provided with a filter screen supported perpendicularly from the bottom wall surface and beyond the weir wall portion and forming (xi) a secondary sump region between the weir wall and the filter-screen wall, and (xii) a tertiary sump region provided beyond the filter-screen wall and supporting at least one outflow port allowing pretreated stormwater to flow through the tertiary sump region into the earth ground into which the system has been installed;

FIG. 4A is an elevated side cross-sectional view of the first illustrative embodiment of the stormwater collection and pretreatment filtering system of the present invention illustrated in FIGS. 3A, 3B and 3C, shown during a first phase of operation, where no stormwater is flowing through the top surface storm grate or front end wall portion into the primary sump region of the 3D stormwater storage volume of the system;

FIG. 4B is an elevated side cross-sectional view of the first illustrative embodiment of the stormwater collection and pretreatment filtering system of the present invention illustrated in FIGS. 3A, 3B and 3C, shown during a second phase of operation, where stormwater is starting to flow through the top surface storm grate of front end wall portion and into the primary sump region of the system, but not sufficiently filling the primary sump region for collected stormwater to flow over the weir wall portion, as shown;

FIG. 4D is an elevated side cross-sectional view of the first illustrative embodiment of the stormwater collection and pretreatment filtering system of the present invention illustrated in FIGS. 3A, 3B and 3C, shown during a fourth phase of operation, wherein stormwater flowing through the storm grate over the top-surface inflow port has sufficiently filled the primary sump region, debris is building up beneath the baffle wall along the underflow passageway, and is flowing over the weir wall and into the secondary sump region, and then flowing from the secondary sump region through the filter-screen wall portion into the tertiary sump region and out the outflow port for dispersion through the earth ground;

FIG. 4F is an elevated side cross-sectional view of the first illustrative embodiment of the stormwater collection and pretreatment filtering system of the present invention illustrated in FIGS. 3A, 3B and 3C, shown during a sixth phase of operation, designated as a second by-pass mode of operation, wherein stormwater flowing through the storm grate over the top-surface inflow port has sufficiently filled the primary sump region, debris beneath the baffle wall is completely blocking the underflow passageway, and debris buildup on the filter-screen wall portion is completely blocking stormwater flow therethrough, causing the stormwater to rise up and flow over the filter-screen wall portion and into the tertiary sump region, and then out the outflow port for dispersion through the earth ground;

FIG. 6A is an elevated side cross-sectional view of the first illustrative embodiment of the stormwater collection and pretreatment filtering system of the present invention illustrated in FIGS. 5A, 5B and 5C, shown during a first phase of operation, where no stormwater is flowing through the top surface storm grate into the primary sump region with the 3D stormwater storage volume of the system;

FIG. 6C is an elevated side cross-sectional view of the second illustrative embodiment of the stormwater collection and pretreatment filtering system of the present invention illustrated in FIGS. 6A, 6B and 6C, shown during a third phase of operation, wherein stormwater flowing through the storm grate has sufficiently filled the primary sump region and is flowing over the weir wall, and into the secondary sump region, and then flowing through the filter-screen wall portion from the secondary sump region into the tertiary sump region and out the outflow port for dispersion through the earth ground;

FIG. 7A is a schematic representation of a third illustrative embodiment of the stormwater collection and pretreatment filtering system of the present invention, wherein stormwater with debris flows through a top opening inflow port and a side inflow port into the interior volume of the system;

FIG. 7C is an elevated side cross-sectional view of the third illustrative embodiment of the stormwater collection and pretreatment filtering system of the present invention illustrated in FIGS. 7A and 7B, showing the concrete block-like unit comprising (i) the bottom wall portion, (ii) the first end wall portion extending from the bottom wall portion, (iii) the pair of first and second side wall portions ending from the bottom wall portion and disposed parallel to each other, and (iv) the top wall portion connected to the first end wall portion the first and second side wall portions, (v) the primary sump region with the 3D stormwater storage volume formed between the first end portion, the bottom wall portion, and the first and second side wall portions, (vi) at least one top inflow port formed in the top wall portion of the system and allowing stormwater with debris to flow through a grate structure covering the inflow port and into the 3D stormwater storage volume, (vii) at least one side inflow port formed in the side wall portion of the system and allowing stormwater with debris to flow through a grate structure and into the 3D stormwater storage volume, (viii) the baffle wall suspended substantially perpendicularly to the bottom wall surface and between the first and second side wall portions, at second end of the primary sump region, (ix) the weir wall mounted on the bottom wall surface of the system and parallel to the baffle wall along the boundary of the primary sump region, (x) the filter-screen wall provided with a filter screen supported perpendicularly from the bottom wall surface and beyond the weir wall and forming (xi) the secondary sump region between the weir wall and the filter-screen wall, and (xii) the tertiary sump region provided beyond the filter-screen wall and supporting at least one outflow port allowing pretreated stormwater to flow through the tertiary sump region into the earth ground into which the system has been installed;

Figure 9A:
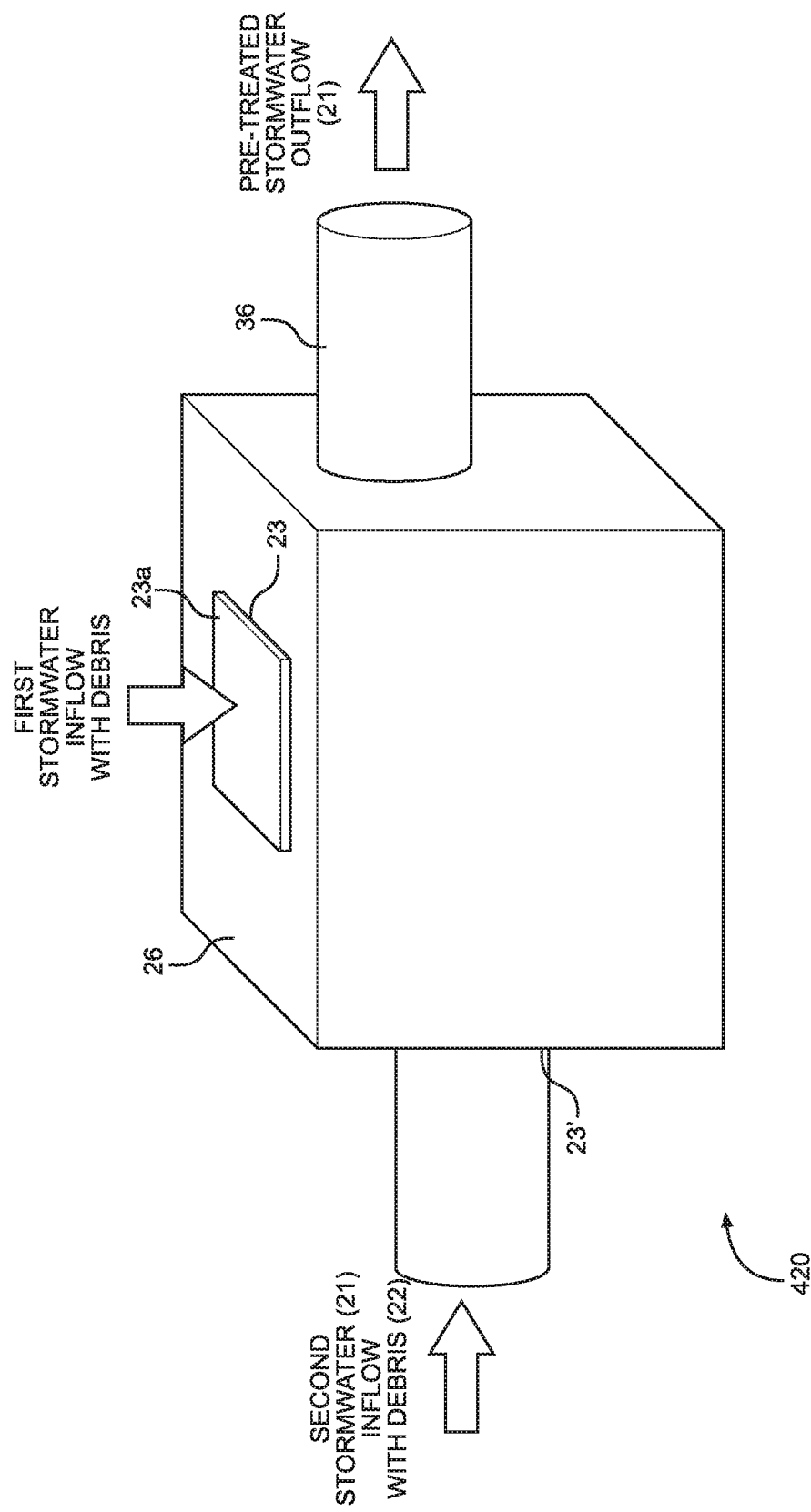
FIG. 9A is a schematic representation of a third illustrative embodiment of the stormwater collection and pretreatment filtering system of the present invention, wherein stormwater with debris flows through a top opening inflow port and a side inflow port into the interior volume of the system.
Figure 9B:
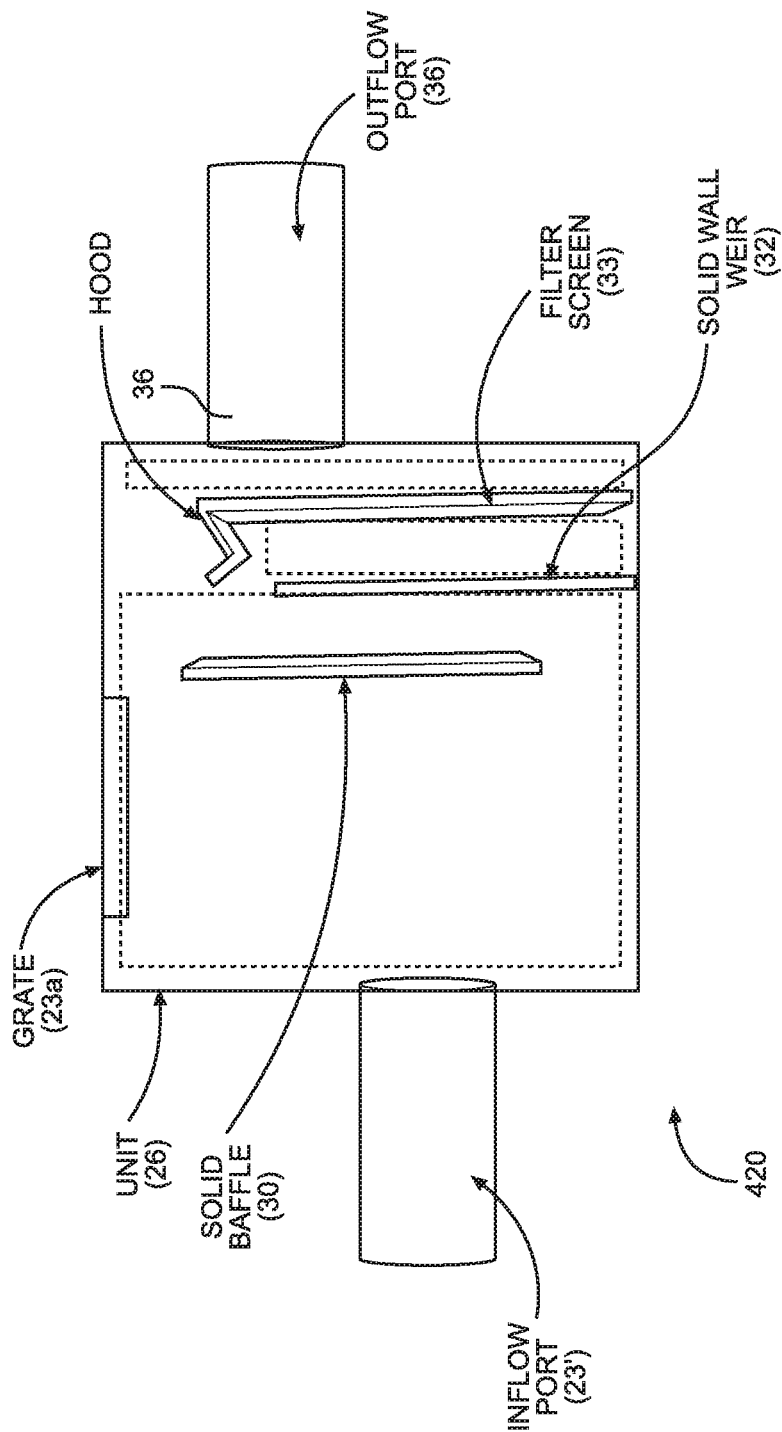
FIG. 9B is a cross-sectional view of the fourth illustrative embodiment of the stormwater collection and pretreatment filtering system of the present invention illustrated in FIG. 9A, constructed in the form of a concrete block-like unit comprising (i) a bottom wall portion, (ii) a first end wall portion extending from the bottom wall portion, (iii) a pair of first and second side wall portions ending from the bottom wall portion and disposed parallel to each other, and (iv) a top wall portion connected to the first end wall portion the first and second side wall portions, (v) a primary sump region with a 3D stormwater storage volume formed between the first end portion, the bottom wall portion, and the first and second side wall portions, (vi) at least one top inflow port formed in the top wall portion of the system and allowing stormwater with debris to flow through a grate structure and into the 3D stormwater storage volume, (vii) at least one side inflow port formed in the side wall portion of the system and allowing stormwater with debris to flow through a grate structure and into the 3D stormwater storage volume, (viii) a baffle wall portion suspended substantially perpendicularly to the bottom wall surface and between the first and second side wall portions, at second end of the primary sump region and providing on underflow passageway, (ix) a weir wall portion mounted on the bottom wall surface of the system and parallel to the baffle wall along the boundary of the primary sump region, (x) a filter-screen wall provided with a filter screen supported perpendicularly from the bottom wall surface and beyond the weir wall and forming (xi) a secondary sump region between the weir wall and the filter-screen wall, and (xii) a tertiary sump region provided beyond the filter-screen wall and supporting at least one outflow port allowing pretreated stormwater to flow through the tertiary sump region into the earth ground into which the system has been installed.
Figure 9C:
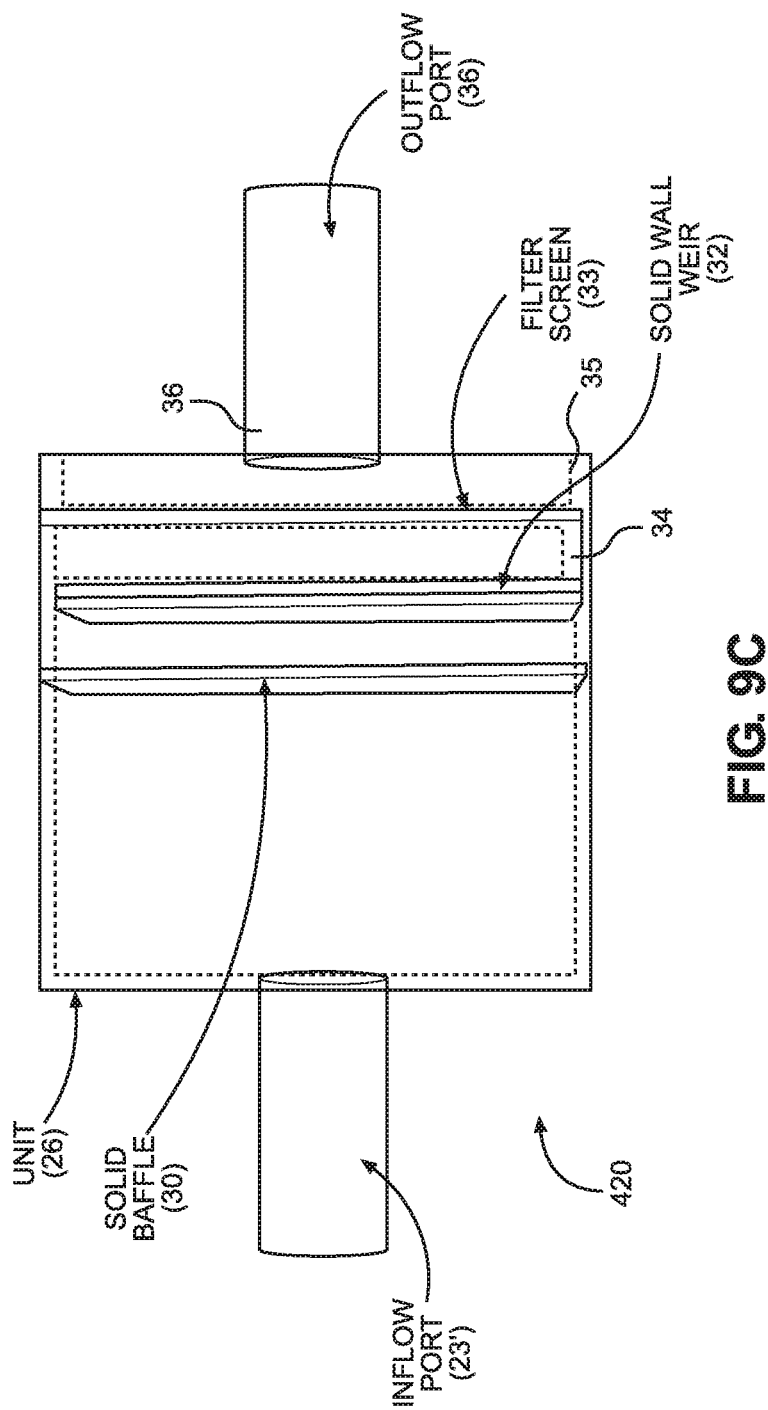
FIG. 9C is an elevated side cross-sectional view of the fourth illustrative embodiment of the stormwater collection and pretreatment filtering system of the present invention illustrated in FIGS. 9A and 9B, showing the concrete block-like unit comprising (i) the bottom wall portion, (ii) the first end wall portion extending from the bottom wall portion, (iii) the pair of first and second side wall portions ending from the bottom wall portion and disposed parallel to each other, and (iv) the top wall portion connected to the first end wall portion the first and second side wall portions, (v)
Figure 9D:
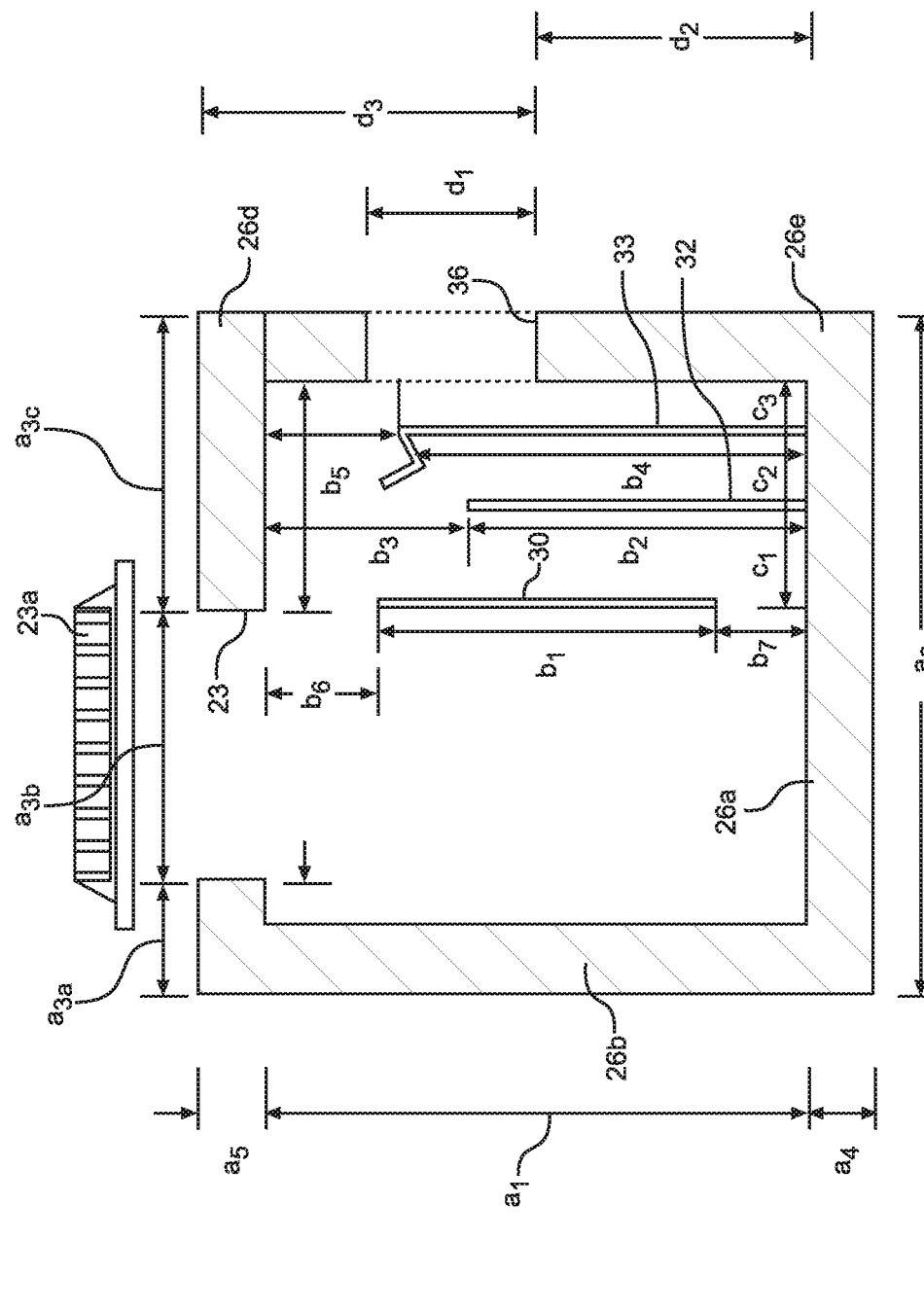
Figure 10E:
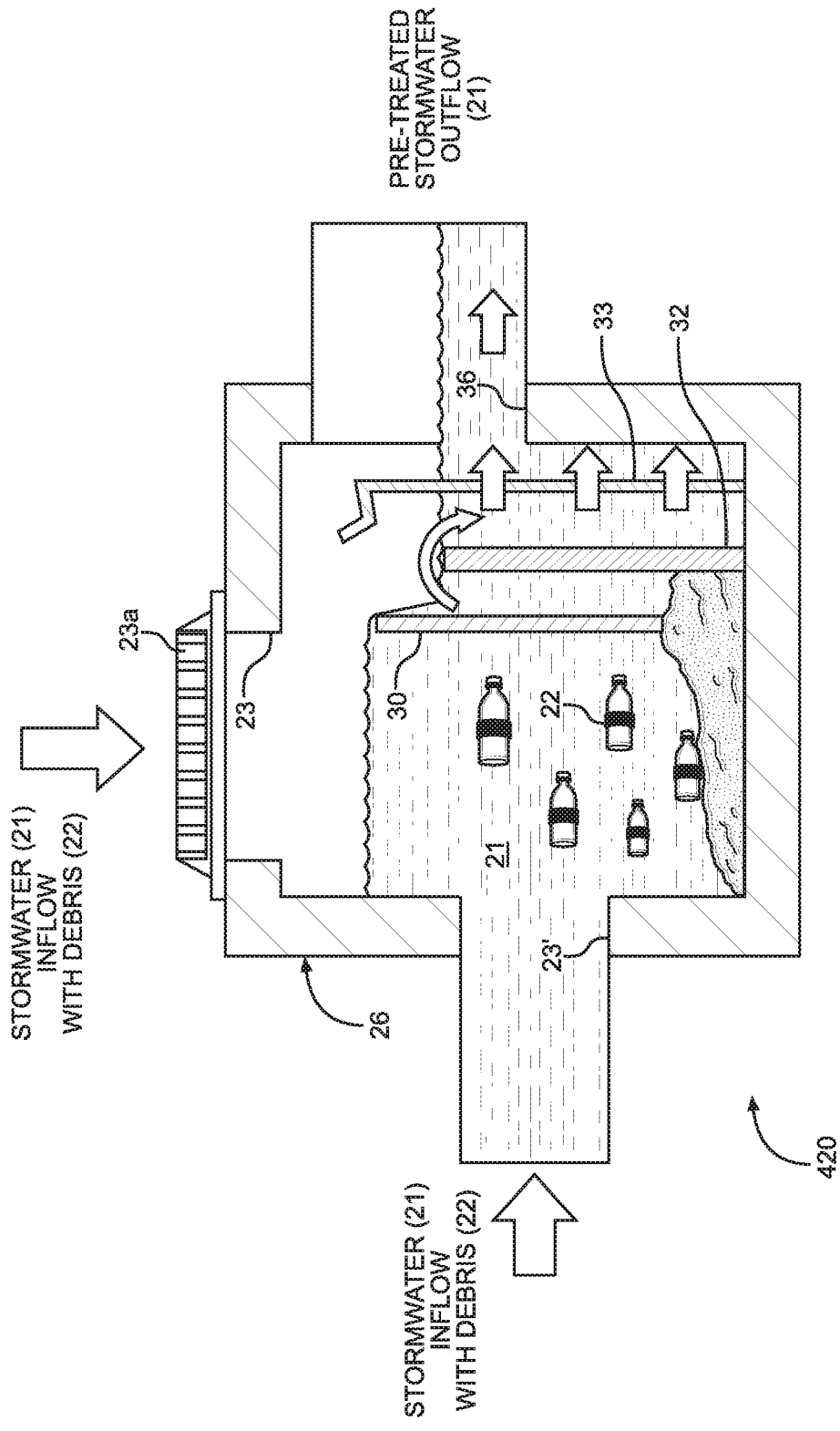
Figure 10F:
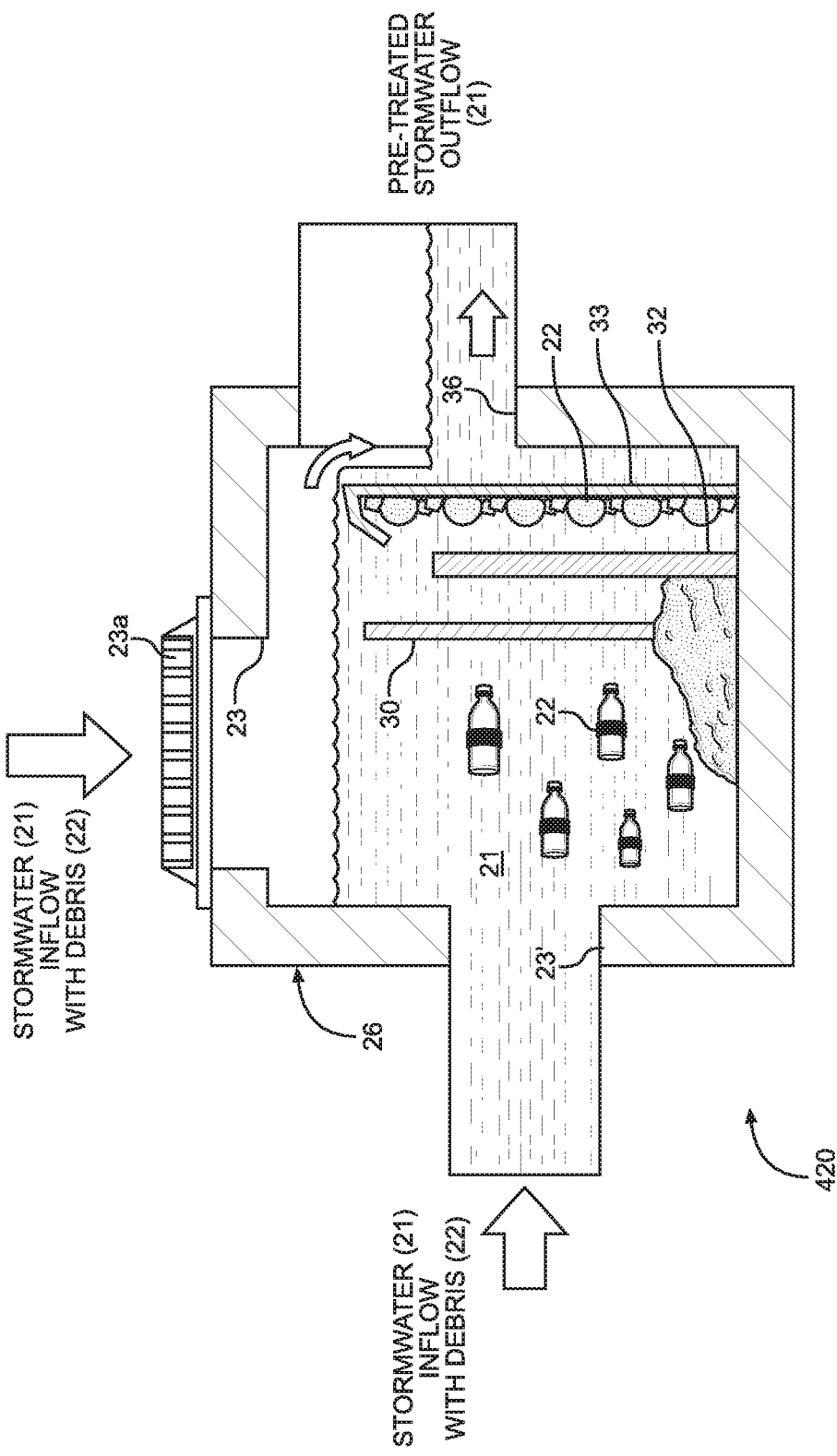
Figure 11A:
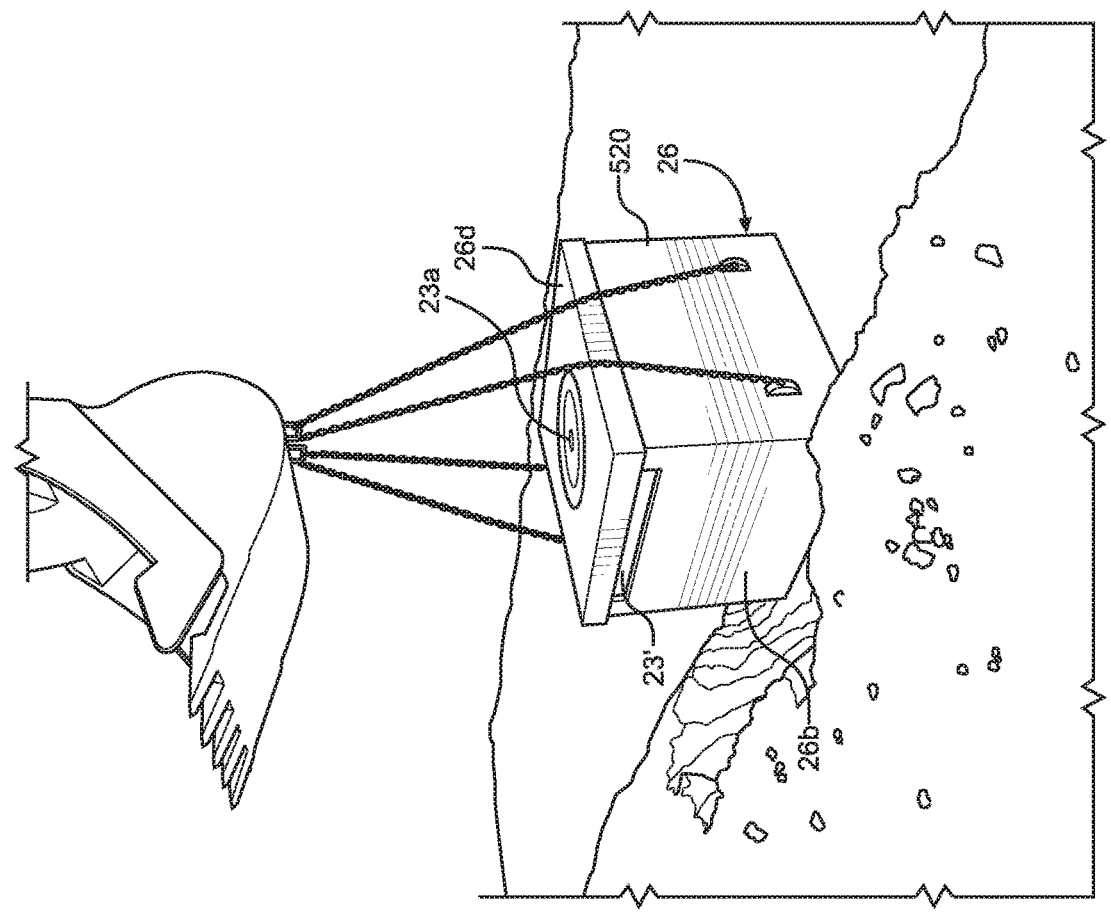
Figure 11B:
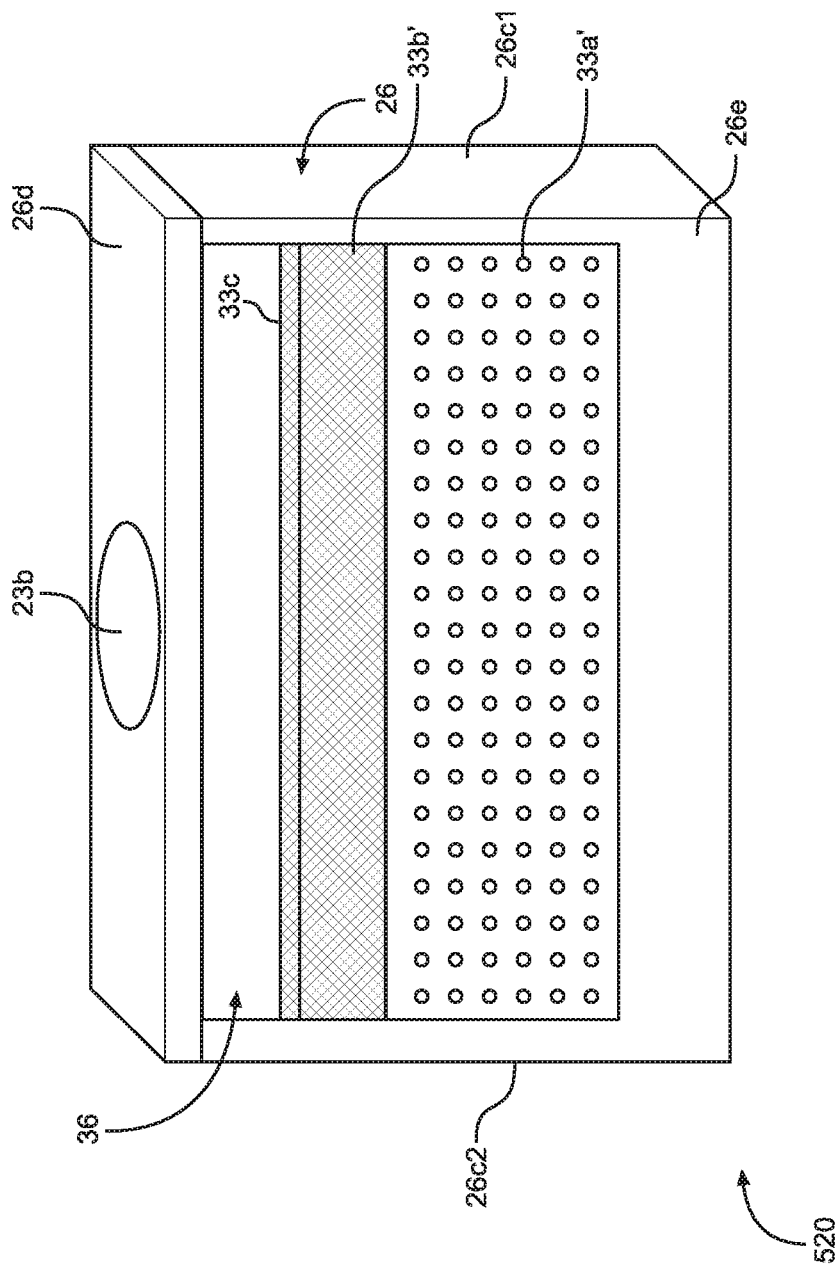
Figure 11C:
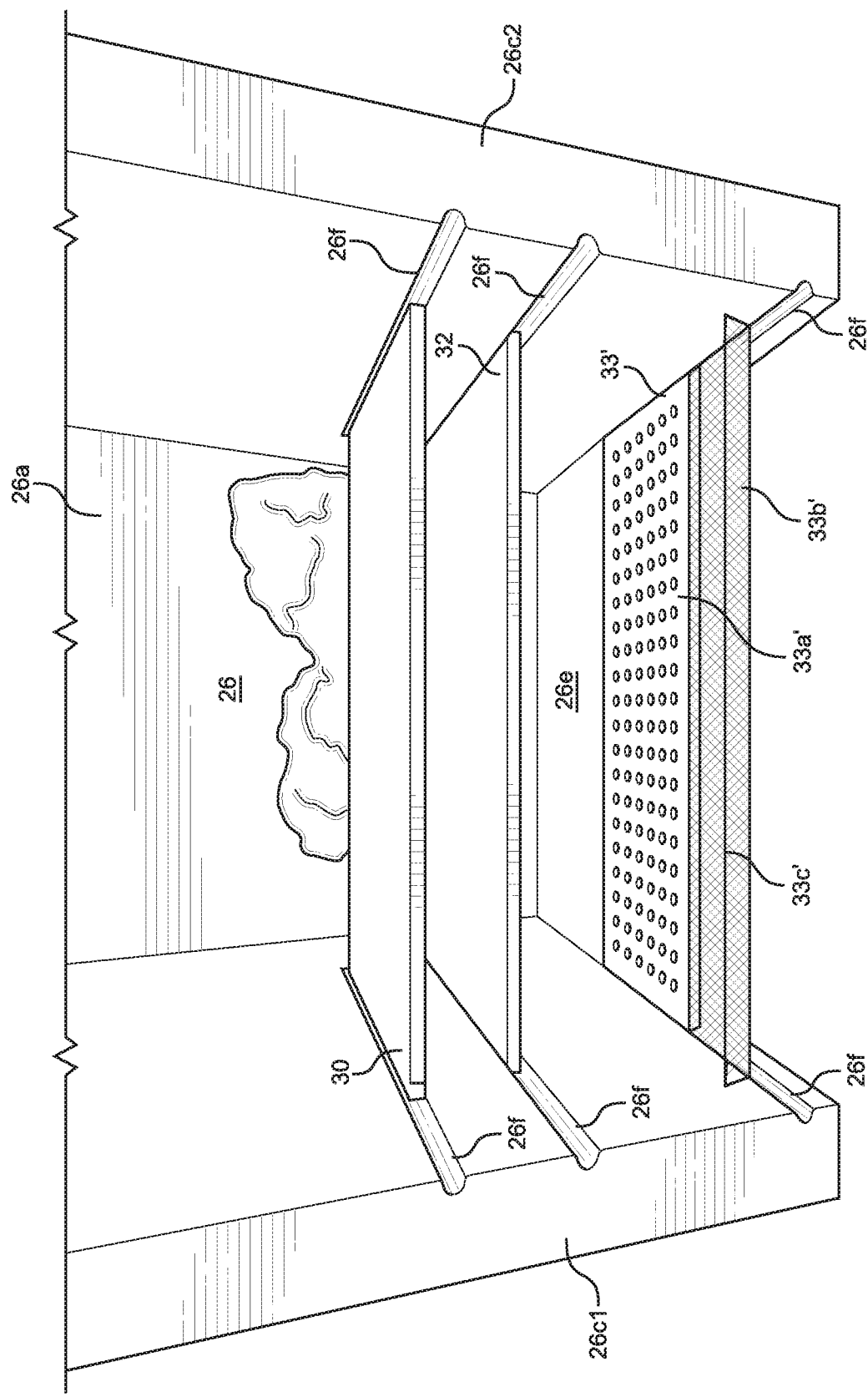
Figure 11D:
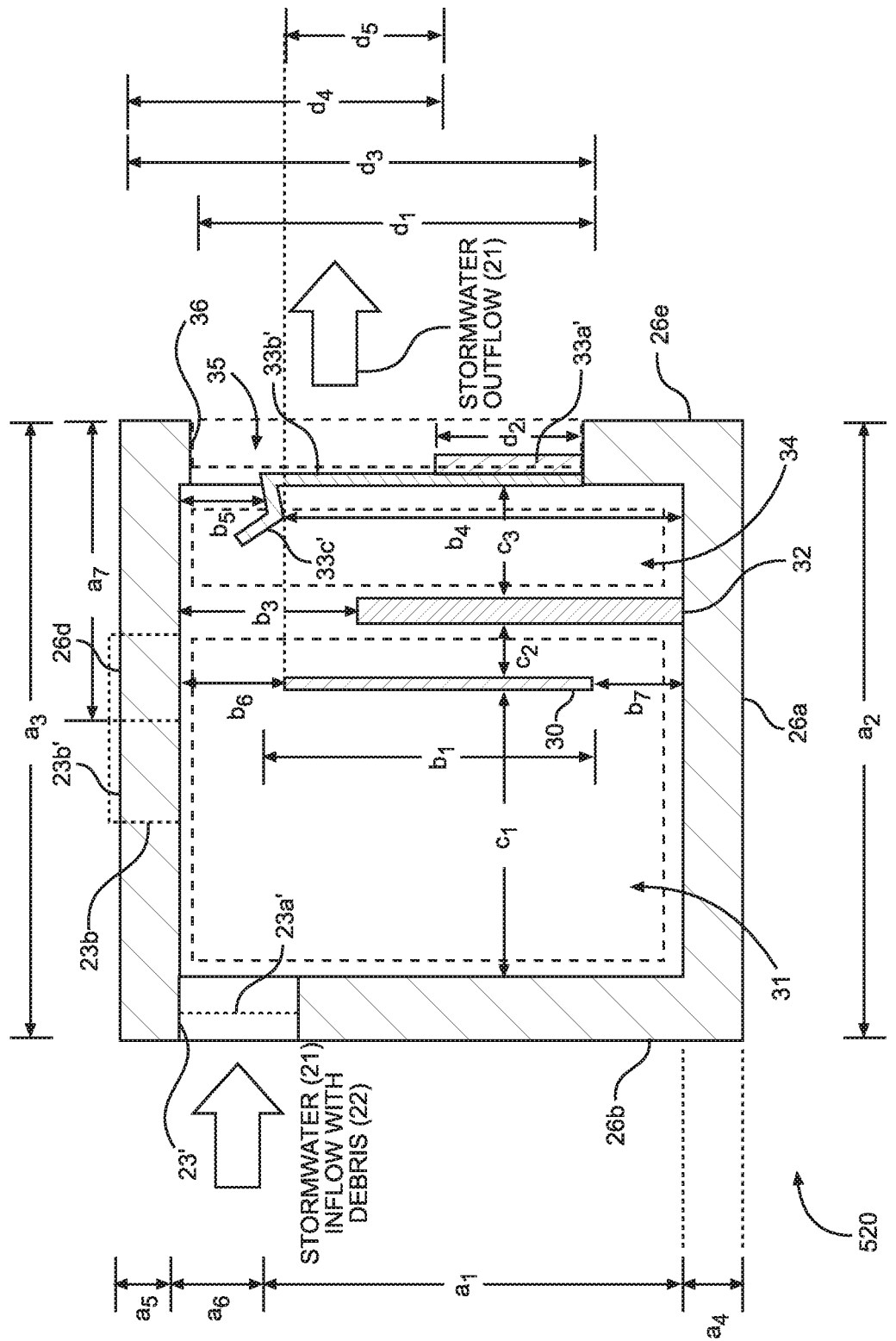
Figure 12A:
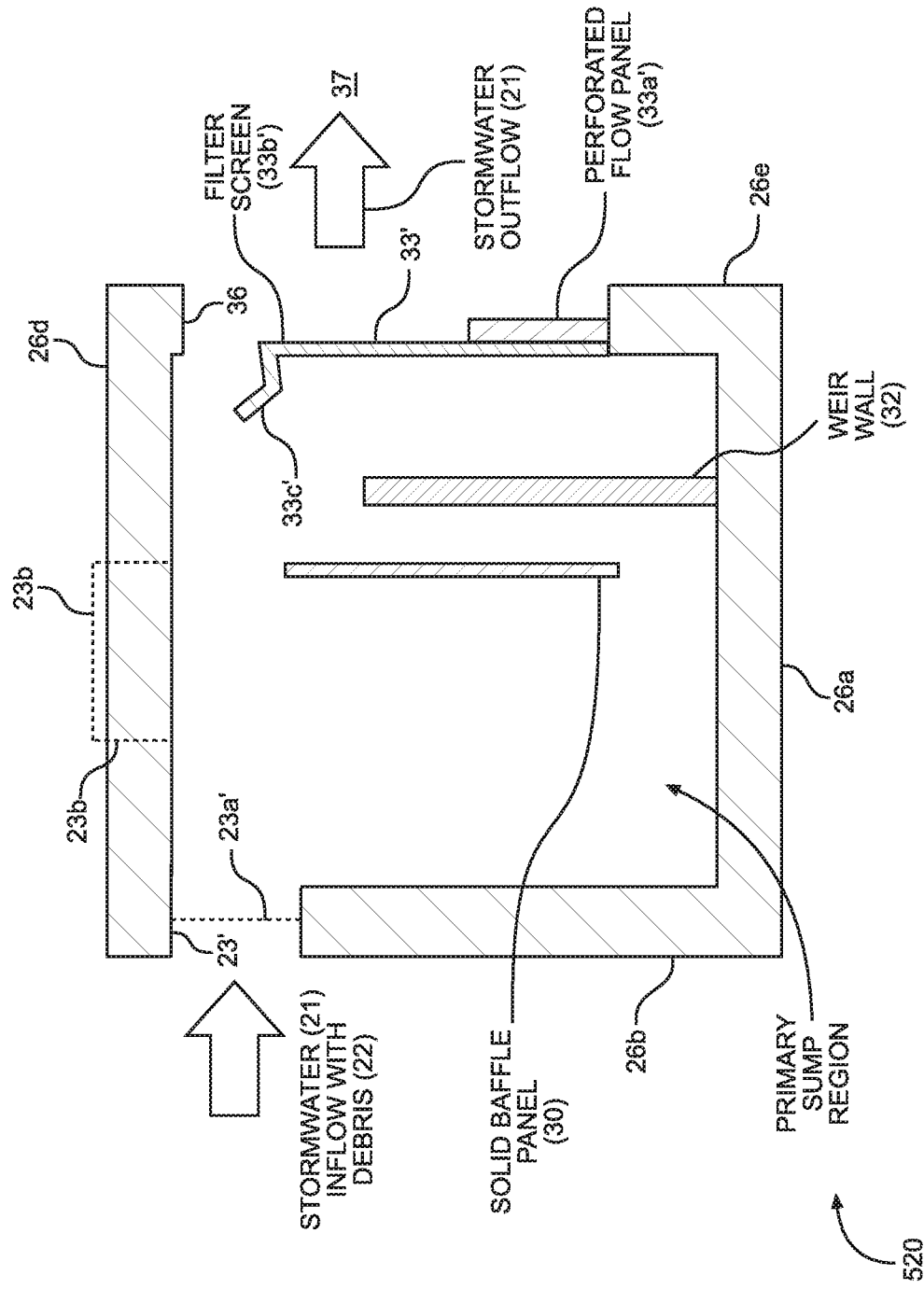
Figure 12C:
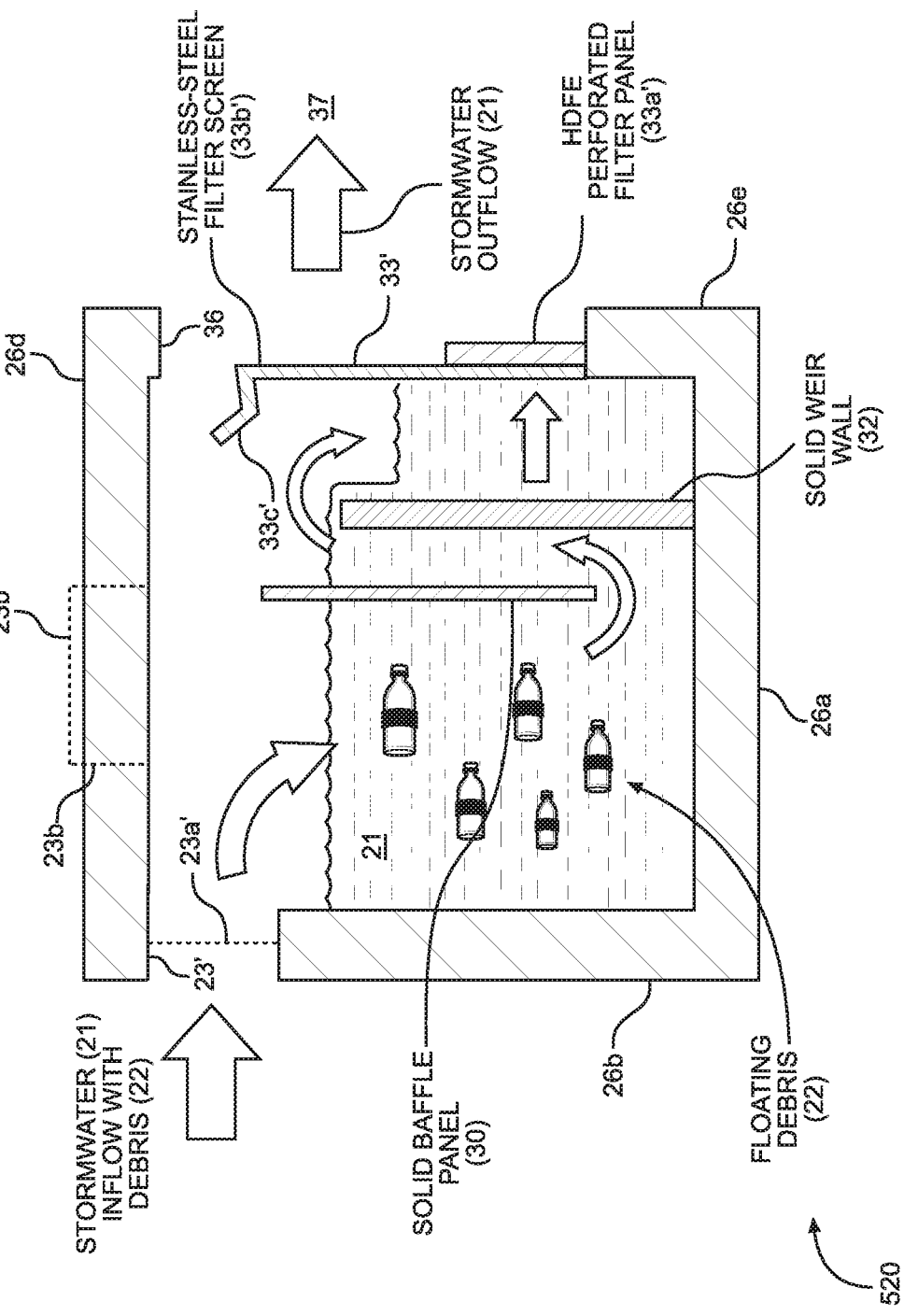
Figure 12E:
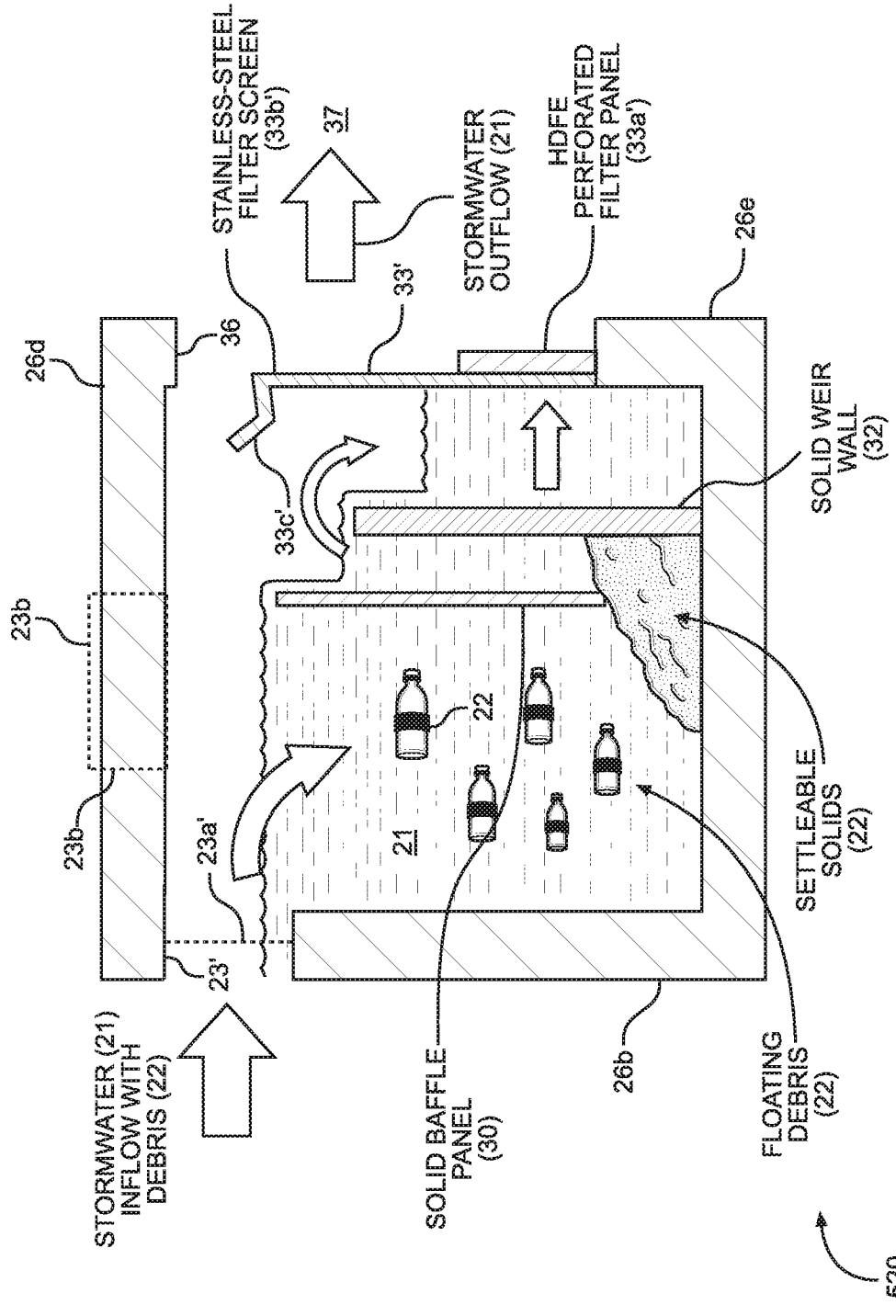
Figure 12F:
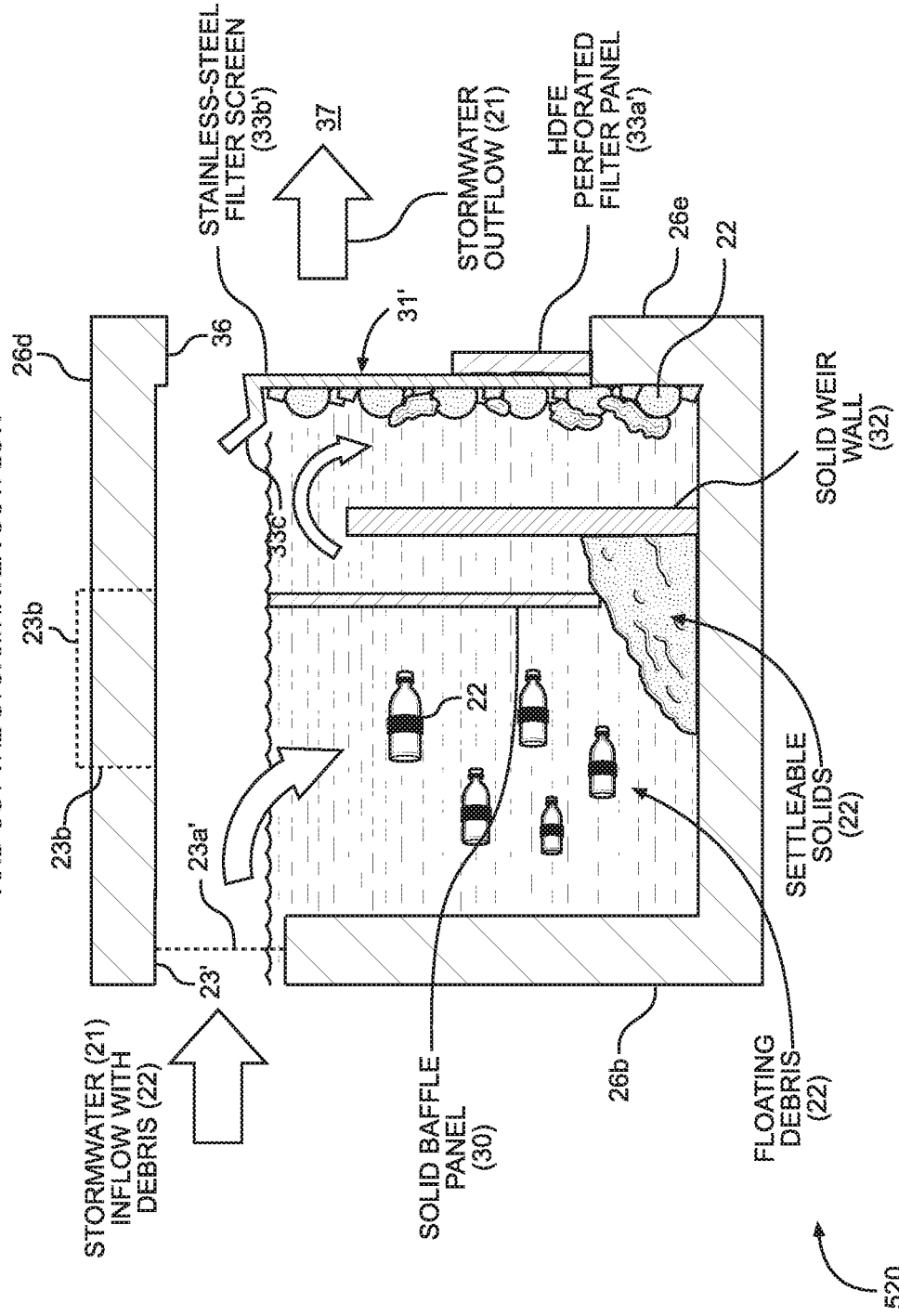
Figure 13:
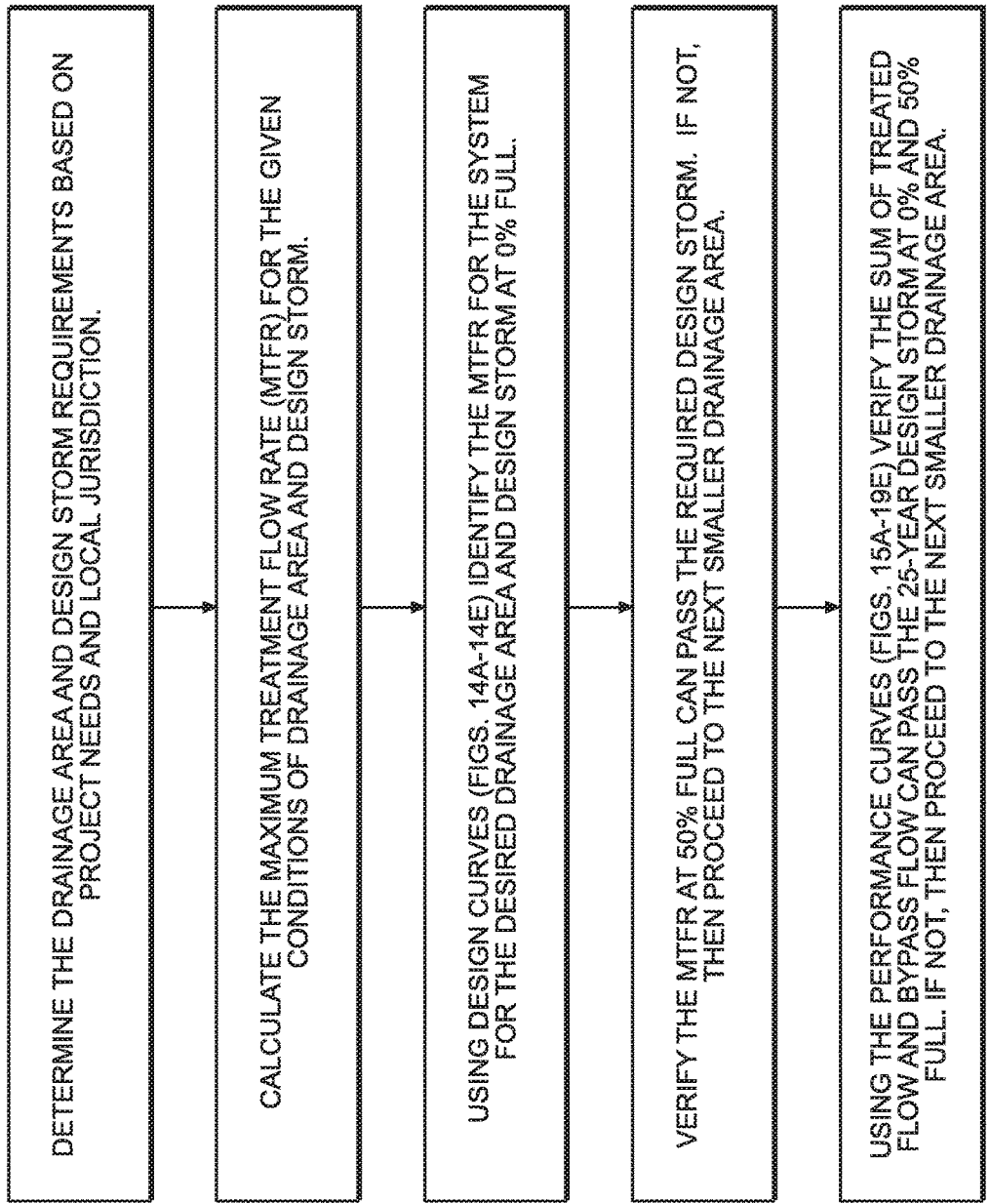
Figure 14A:
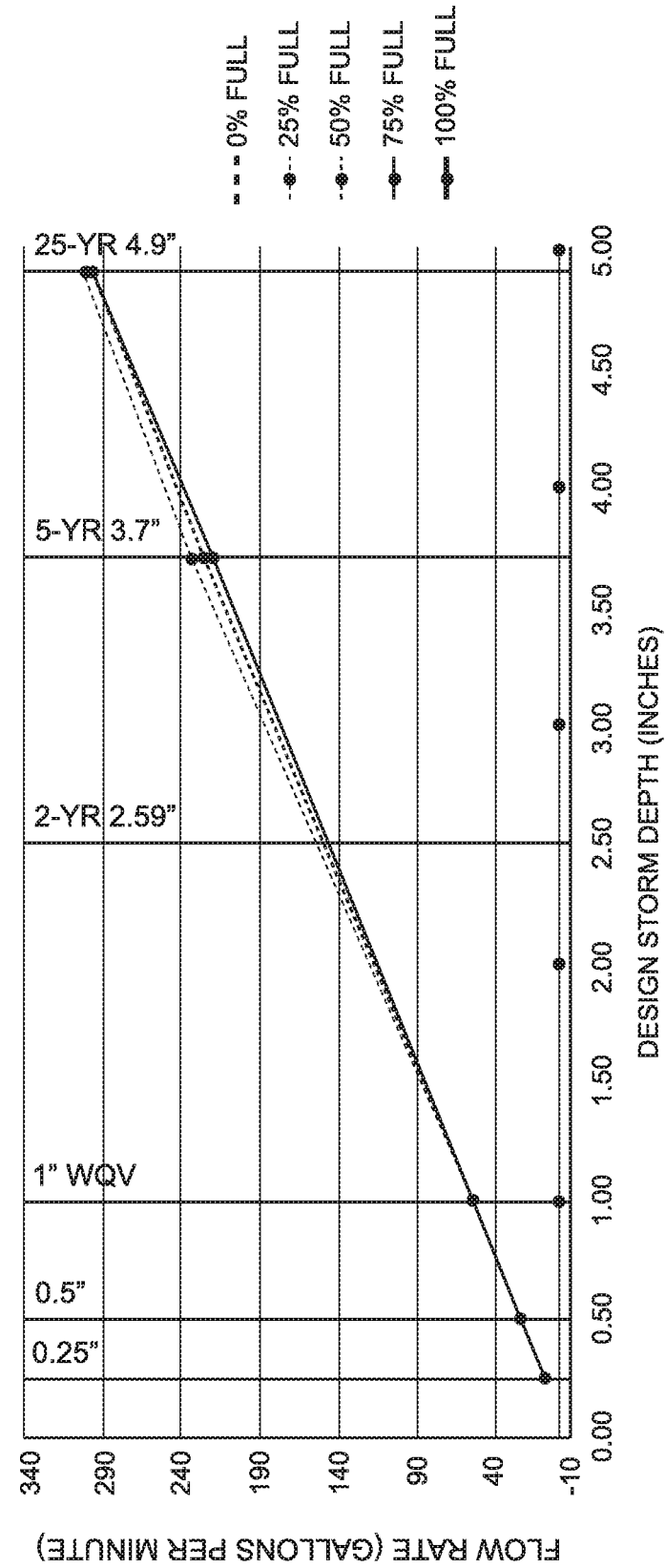
Figure 14B:
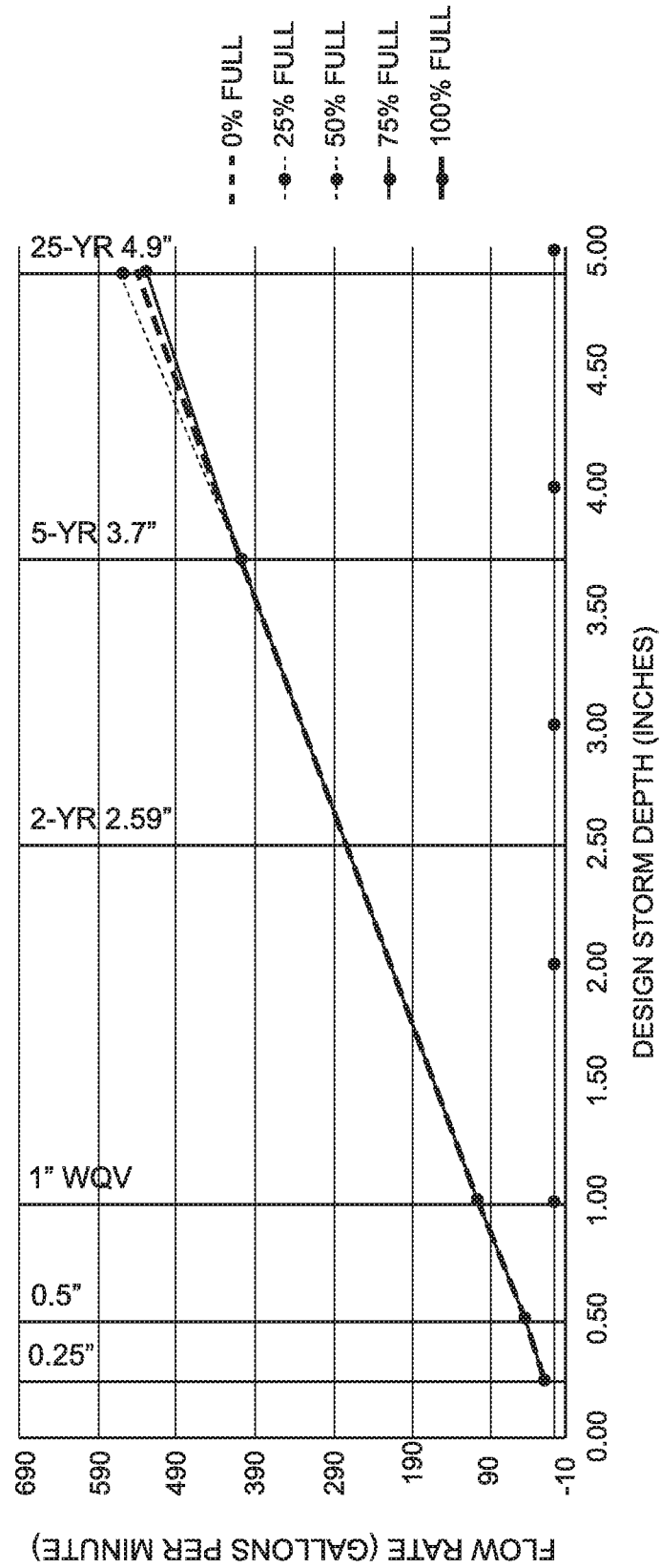
Figure 14C:
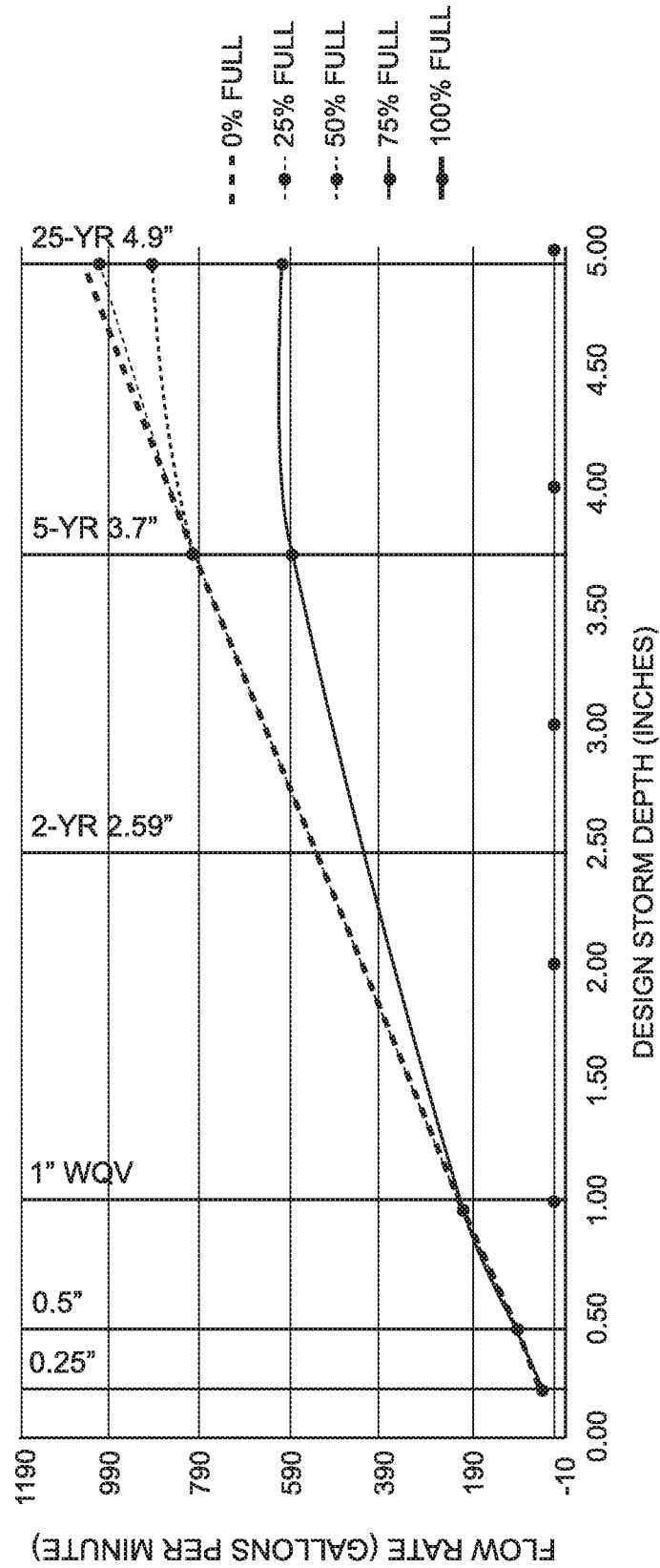
Figure 14D:
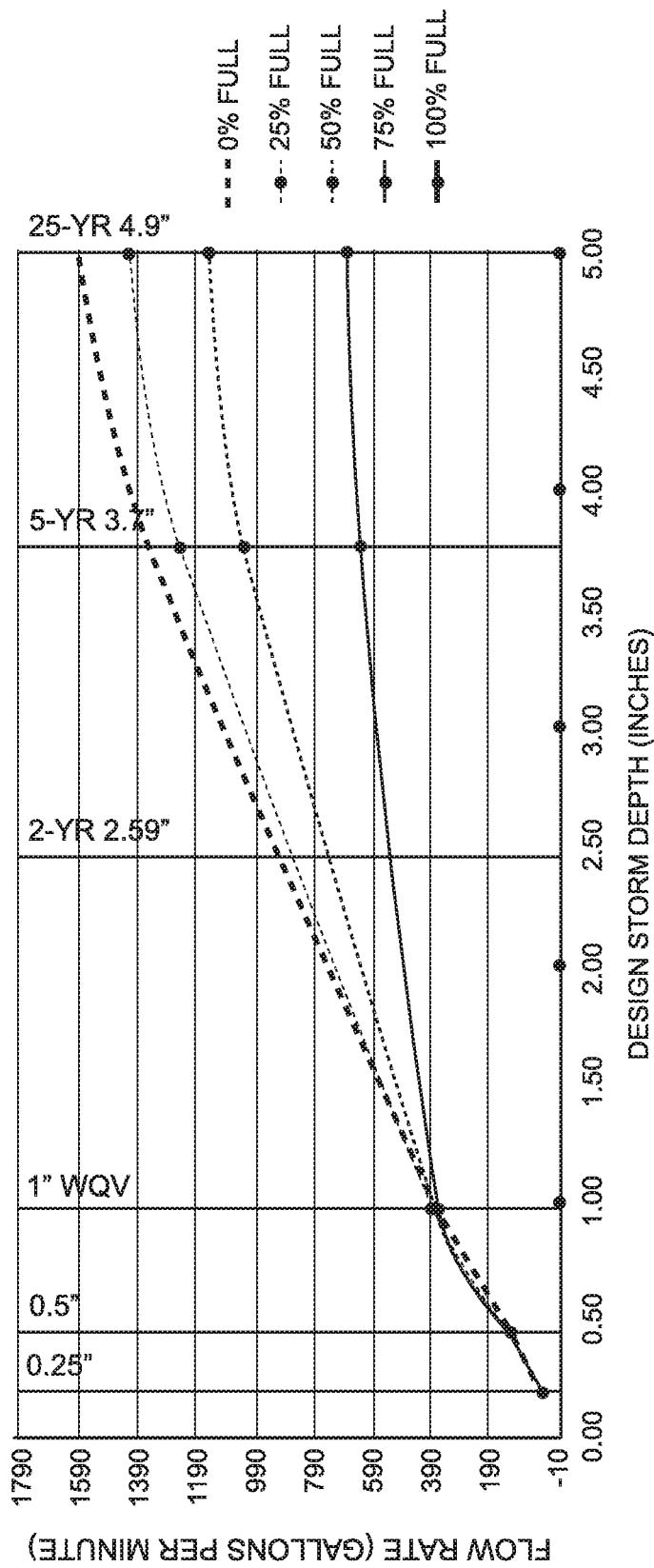
Figure 15D:
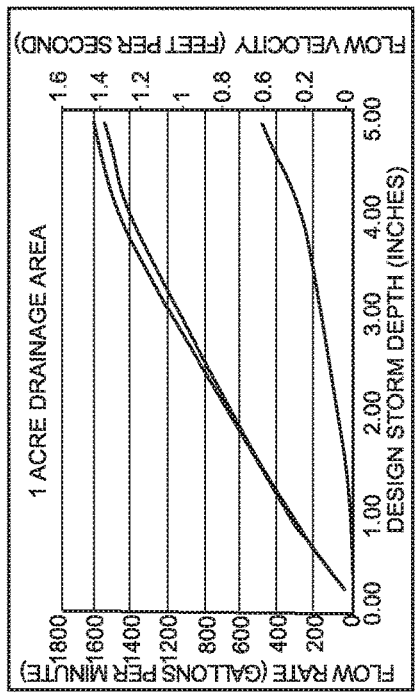
Figure 15E:
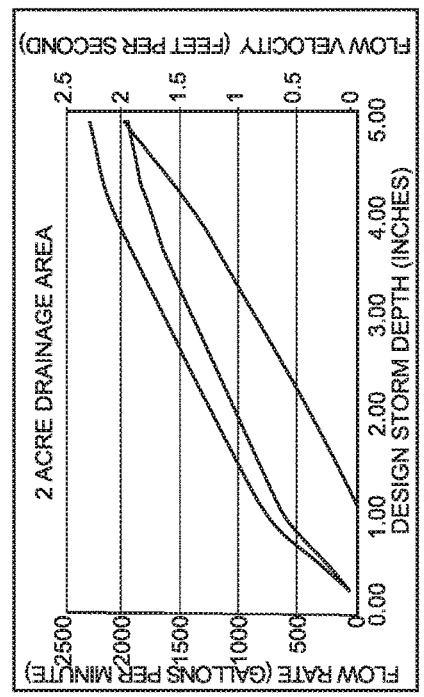
Figure 16B:
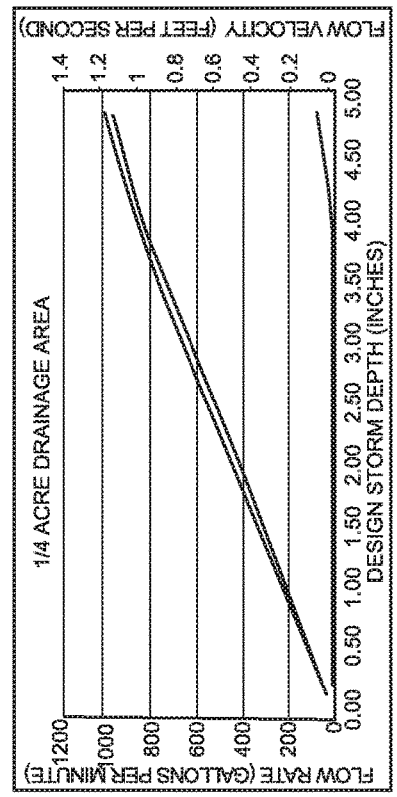
Figure 16A:
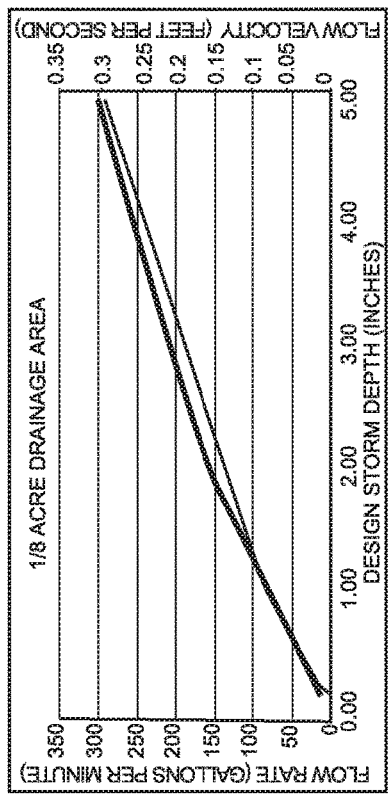
Figure 16C:
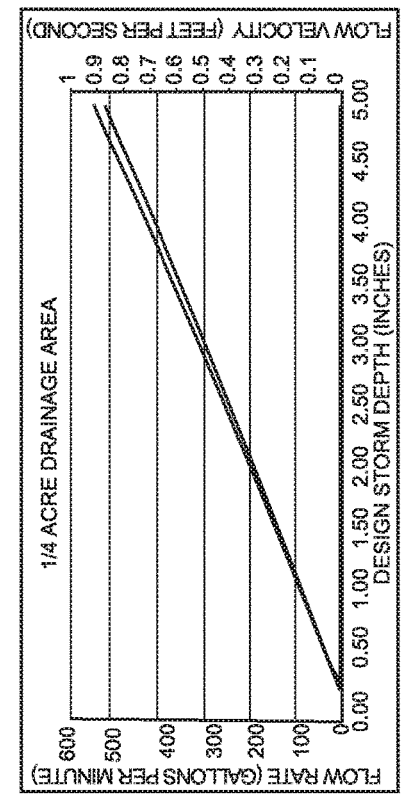
Figure 16D:
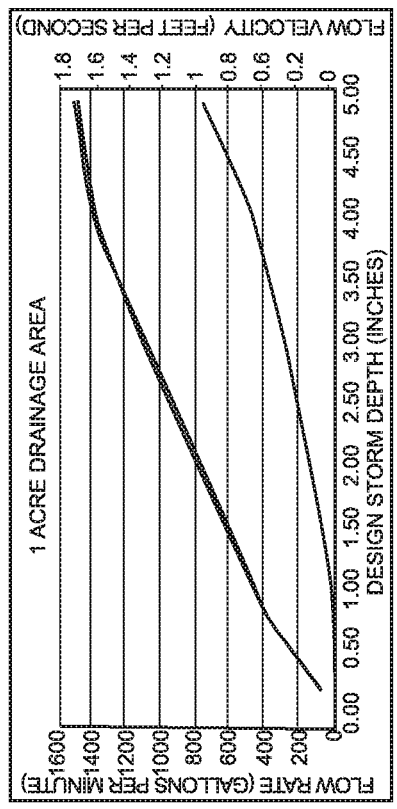
Figure 16E:
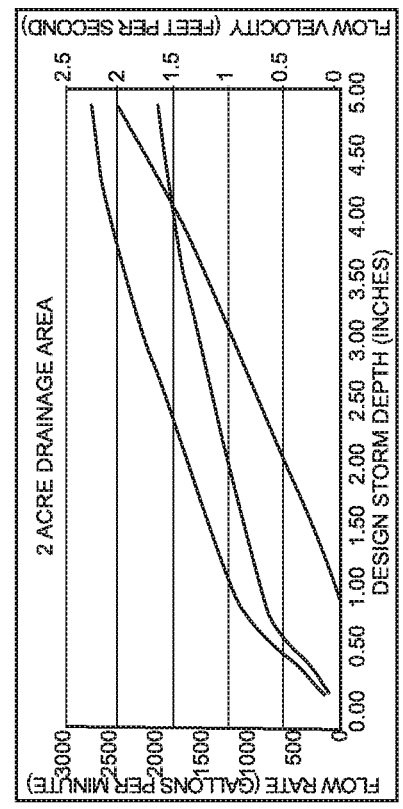
Figure 17B:
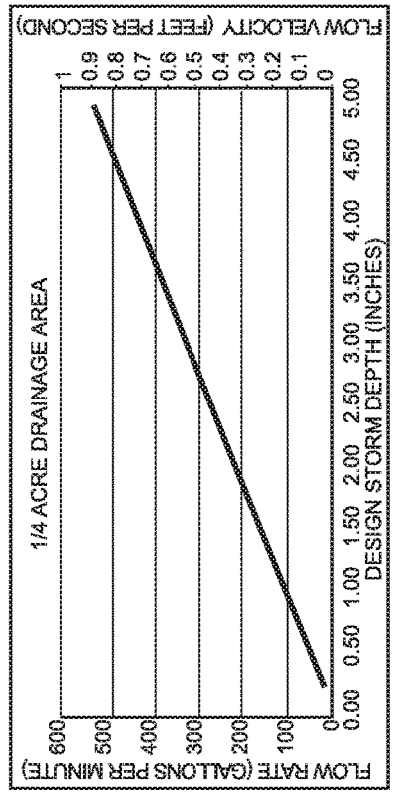
Figure 17A:
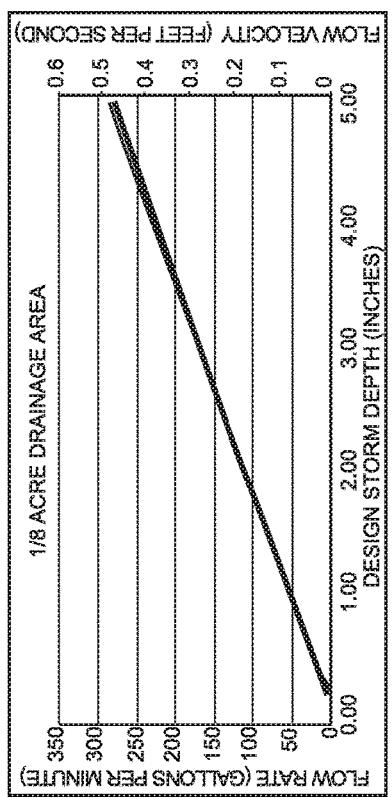
Figure 17C:
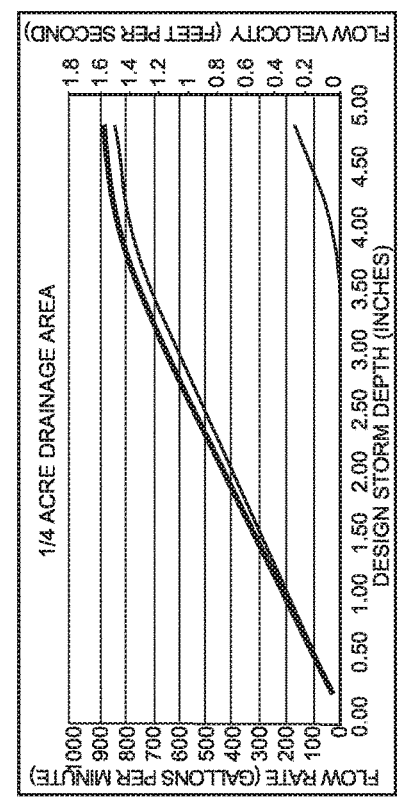
Figure 17D:
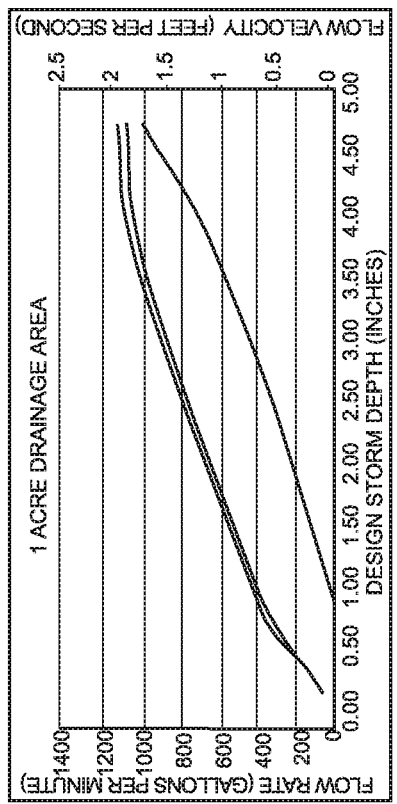
Figure 17E:
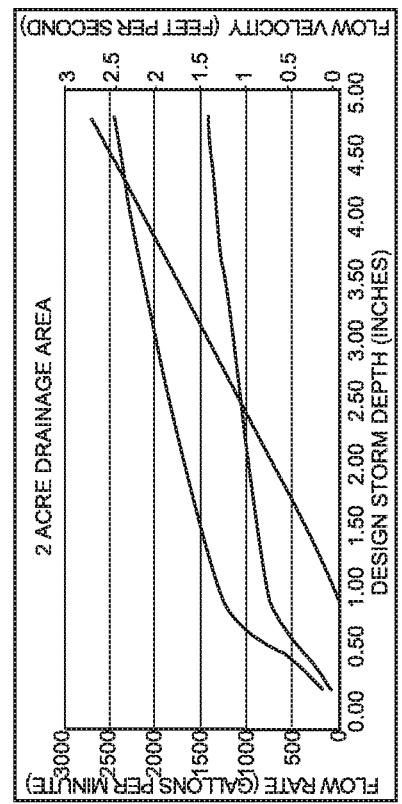
Figure 18B:
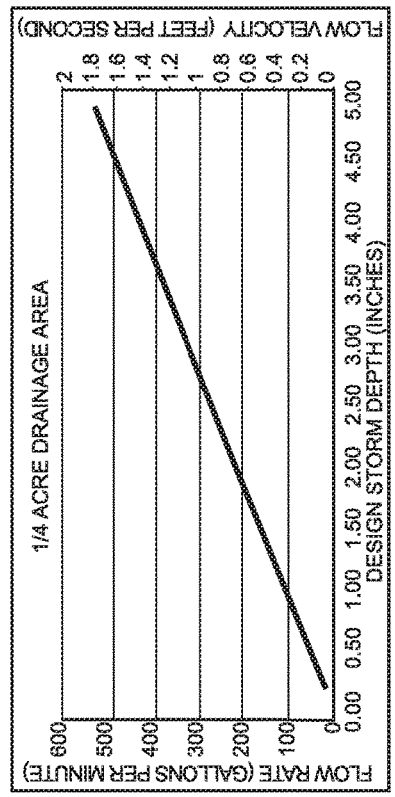
Figure 18A:
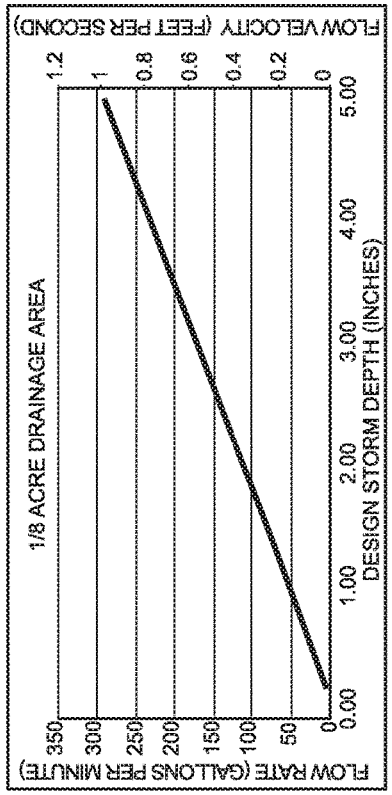
Figure 18C:
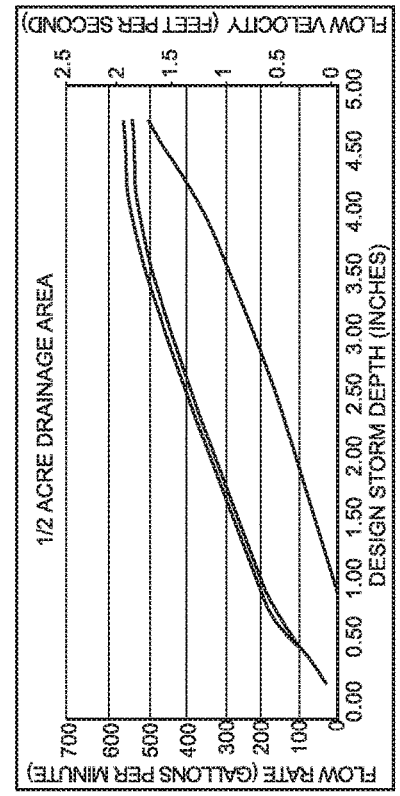
Figure 19B:
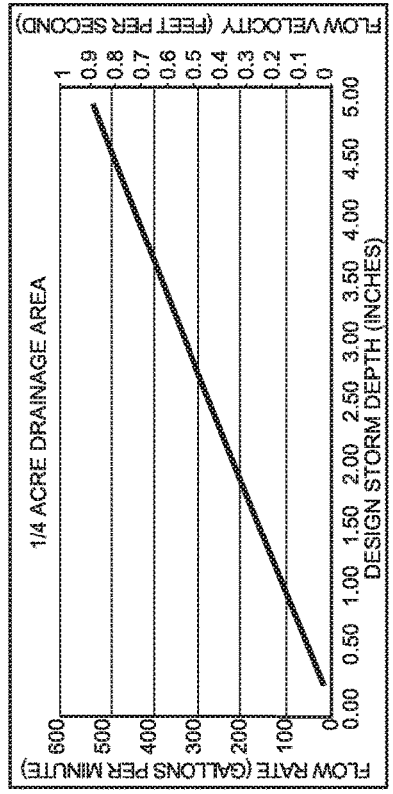
Figure 19A:
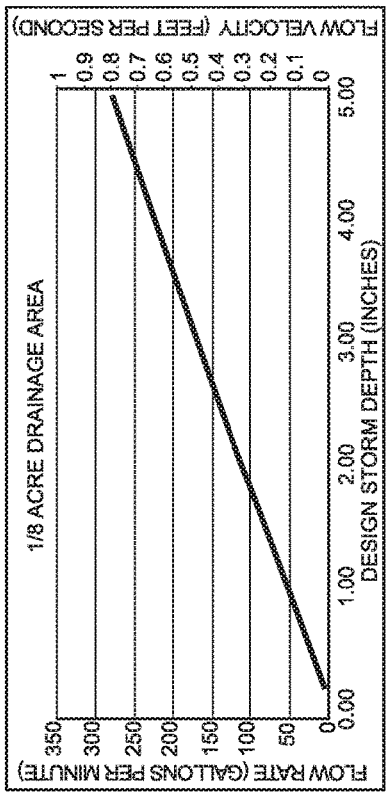
Figure 19C:
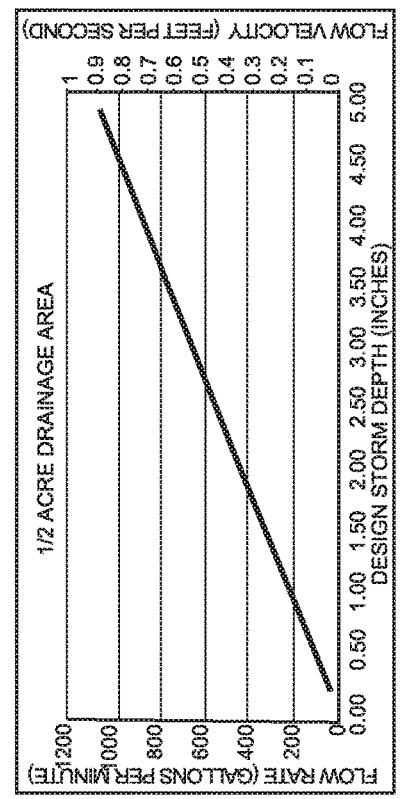
Figure 19D:
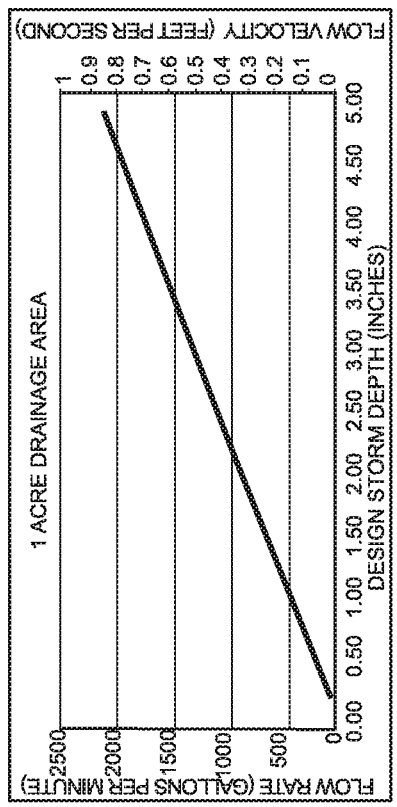
Figure 19E:
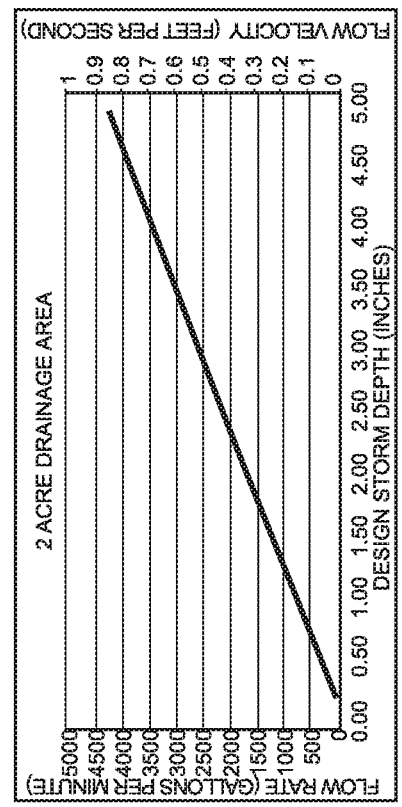

the primary sump region with the 3D stormwater storage volume formed between the first end portion, the bottom wall portion, and the first and second side wall portions, (vi) at least one top inflow port formed in the top wall portion of the system and allowing stormwater with debris to flow through a grate structure and into the 3D stormwater storage volume, (vii) at least one side inflow port formed in the side wall portion of the system and allowing stormwater with debris to flow through a grate structure and into the 3D stormwater storage volume, (viii) the baffle wall suspended substantially perpendicularly to the bottom wall surface and between the first and second side wall portions, at second end of the primary sump region, (ix) the weir wall mounted on the bottom wall surface of the system and parallel to the baffle wall along the boundary of the primary sump region, (x) the filter-screen wall provided with a filter screen supported perpendicularly from the bottom wall surface and beyond the weir wall and forming (xi) the secondary sump region between the weir wall and the filter-screen wall, and (xii) the tertiary sump region provided beyond the filter-screen wall and supporting at least one outflow port allowing pretreated stormwater to flow through the tertiary sump region into the earth ground into which the system has been installed;

FIG. 9D is an elevated side cross-sectional view of the fourth illustrative embodiment of the stormwater collection and pretreatment filtering system of the present invention illustrated in FIGS. 9A, 9B, 9C shown with design parameters ({a}, {b}, {c}, {d}) defined adjacent corresponding structures and elements employed within the system;

FIG. 10A is an elevated side cross-sectional view of the fourth illustrative embodiment of the stormwater collection and pretreatment filtering system of the present invention illustrated in FIGS. 9A, 9B and 9C, shown during a first phase of operation, where no stormwater is flowing through the top surface storm grate into the primary sump region with the 3D stormwater storage volume of the system;

FIG. 10B is an elevated side cross-sectional view of the fourth illustrative embodiment of the stormwater collection and pretreatment filtering system of the present invention illustrated in FIGS. 9A, 9B and 9C, shown during a second phase of operation, where stormwater is starting to flow through the top surface storm grate and into the primary sump region of the system, but not sufficiently filling the primary sump region to flow over the weir wall, as shown;

FIG. 10C is an elevated side cross-sectional view of the fourth illustrative embodiment of the stormwater collection and pretreatment filtering system of the present invention illustrated in FIGS. 9A, 9B and 9C, shown during a third phase of operation, wherein stormwater flowing through the storm grate has sufficiently filled the primary sump region and is flowing over the weir wall, and into the secondary sump region, and then flowing through the filter-screen wall portion from the secondary sump region into the tertiary sump region and out the outflow port for dispersion through the earth ground;

FIG. 10D is an elevated side cross-sectional view of the fourth illustrative embodiment of the stormwater collection and pretreatment filtering system of the present invention illustrated in FIGS. 9A, 9B and 9C, shown during a fourth phase of operation, wherein stormwater flowing through the storm grate has sufficiently filled the primary sump region, debris is building up beneath the baffle wall along the underflow passageway, and is flowing over the weir wall and into the secondary sump region, and then flowing from the secondary sump region through the filter-screen wall portion into the tertiary sump region and out the outflow port for dispersion through the earth ground;

FIG. 10E is an elevated side cross-sectional view of the fourth illustrative embodiment of the stormwater collection and pretreatment filtering system of the present invention illustrated in FIGS. 9A, 9B and 9C, shown during a fifth phase of operation, designated as a first by-pass mode of operation, wherein stormwater flowing through the storm grate has sufficiently filled the primary sump region, debris beneath the baffle wall is completely blocking the underflow passageway, and stormwater in the primary sump region has risen to the top of the baffle wall and is flowing over the baffle wall and then flowing over the weir wall, and through the filter-screen wall portion into the tertiary sump region and out the outflow port for dispersion through the earth ground;

FIG. 10F is an elevated side cross-sectional view of the fourth illustrative embodiment of the stormwater collection and pretreatment filtering system of the present invention illustrated in FIGS. 9A, 9B and 9C, shown during a sixth phase of operation, designated as a second by-pass mode of operation, wherein stormwater flowing through the storm grate has sufficiently filled the primary sump region, debris beneath the baffle wall is completely blocking the underflow passageway, and debris buildup on the filter-screen wall portion is completely blocking stormwater flow therethrough, causing the stormwater to rise up and flow over the filter-screen wall portion and into the tertiary sump region, and then out the outflow port for dispersion through the earth ground;

FIG. 11A is a perspective view of the fifth illustrative embodiment of the precast-concrete curb-side stormwater collecting and pretreatment filtering system of the present invention being lifting into position during installation within the earth ground on a construction site, showing the use of chains to support and suspend the precast-concrete block system into location on the construction site;

FIG. 11B is an elevated perspective view of the fifth illustrative embodiment of the precast-concrete stormwater collection and pretreatment filtering system of the present invention shown in FIG. 11A, illustrating the filter-screen wall portion visible through the outflow port of the system, directing pretreated stormwater into the tertiary sump region, and dispersed over the earth ground;

FIG. 11C is top perspective view of the fifth illustrative embodiment of the precast-concrete stormwater collection and pretreatment filtering system of the present invention shown in FIG. 11A, with its top panel removed for purposes of illustrating the installation of the solid baffle wall portion, the weir wall portion, and the filter-screen wall portion, each realized as panels mounted in grooves formed in the interior surface of the side wall portions of the precast-concrete block system of the present invention, wherein the filter-screen wall portion is shown constructed from a perforated plastic panel, and sheet of plastic-coated wire screening material of sufficient stiffness and extending between the matched grooves formed in the side wall portions (i.e. panels) of the system, realizing the outflow port of the system, for directing pretreated stormwater into the tertiary sump region, and dispersion over the earth ground;

FIG. 11D is a cross-sectional view of the fifth illustrative embodiment of the stormwater collection and pretreatment filtering system of the present invention illustrated in FIGS. 11A, 11B and 11C, shown with design parameters ({a}, {b}, {c}, {d}) defined adjacent corresponding structures and elements employed within the system;

FIG. 12A is an elevated side cross-sectional view of the fifth illustrative embodiment of the curbside stormwater collection and pretreatment filtering system of the present invention illustrated in FIGS. 11A, 11B, 1C and 11D, shown during a first phase of operation, where no stormwater is flowing through the top surface storm grate into the primary sump region with the 3D stormwater storage volume of the system;

FIG. 12B is an elevated side cross-sectional view of the fifth illustrative embodiment of the curbside stormwater collection and pretreatment filtering system of the present invention illustrated in FIGS. 11A, 11B, 11C and 11D, shown during a second phase of operation, where stormwater is starting to flow through the top surface storm grate and into the primary sump region of the system, but not sufficiently filling the primary sump region to flow over the weir wall, as shown;

FIG. 12C is an elevated side cross-sectional view of the fifth illustrative embodiment of the curbside stormwater collection and pretreatment filtering system of the present invention illustrated in FIGS. 11A, 11B, 11C and 11D, shown during a third phase of operation, wherein stormwater flowing through the storm grate has sufficiently filled the primary sump region and is flowing over the weir wall, and into the secondary sump region, and then flowing through the filter-screen wall portion from the secondary sump region into the tertiary sump region and through the outflow port for dispersion through the earth ground;

FIG. 12D is an elevated side cross-sectional view of the fifth illustrative embodiment of the curbside stormwater collection and pretreatment filtering system of the present invention illustrated in FIGS. 11A, 11B, 11C and 11D, shown during a fourth phase of operation, wherein stormwater flowing through the storm grate has sufficiently filled the primary sump region, debris is building up beneath the baffle wall along the underflow passageway, and is flowing over the weir wall and into the secondary sump region, and then flowing from the secondary sump region through the filter-screen wall portion into the tertiary sump region and through the outflow port for dispersion through the earth ground;

FIG. 12E is an elevated side cross-sectional view of the fifth illustrative embodiment of the curbside stormwater collection and pretreatment filtering system of the present invention illustrated in FIGS. 11A, 11B, 11C and 11D, shown during a fifth phase of operation, designated as a first by-pass mode of operation, wherein stormwater flowing through the storm grate has sufficiently filled the primary sump region, debris beneath the baffle wall is completely blocking the underflow passageway, and stormwater in the primary sump region has risen to the top of the baffle wall and is flowing over the baffle wall and then flowing over the weir wall, and through the filter-screen wall portion into the tertiary sump region and through the outflow port for dispersion through the earth ground;

FIG. 12F is an elevated side cross-sectional view of the fifth illustrative embodiment of the curbside stormwater collection and pretreatment filtering system of the present invention illustrated in FIGS. 11A, 11B, 11C and 11D, shown during a sixth phase of operation, designated as a second by-pass mode of operation, wherein stormwater flowing through the storm grate has sufficiently filled the primary sump region, debris beneath the baffle wall is completely blocking the underflow passageway, and debris buildup on the filter-screen wall portion is completely blocking stormwater flow therethrough, causing the stormwater to rise up and flow over the filter-screen wall portion and into the tertiary sump region, and then through the outflow port for dispersion through the earth ground;

FIG. 13 is a flow chart describing the primary steps of the design methodology of the present invention employing any one of the stormwater pre-treatment systems of the present invention, involving (a) determining the drainage area and design storm requirements based on your project needs and local jurisdiction, (b) calculating the maximum treatment flow rate (MTFR) for the given conditions of drainage area and design storm, (c) using design curves shown in FIGS. 14A-14E to identify the MTFR for the system for the desired drainage area and design storm at 0% full, (d) verifying the MTFR at 50% full can pass the required design storm, and if not, then proceeding to the next smaller drainage area, and (e) using the performance curves shown in FIGS. 15A-19E to verify the sum of treated flow and the bypass flow that can pass the 25-year design storm at 0% and 50% full, and if not, the proceeding to the next smaller drainage area;

FIGS. 14A through 14E show a set of Design Sizing Curves providing Maximum Treatment Flow Rates (MTFR) in gallons per minute (GPM) required to handle specific Design Storm Depths (inches) when the Stormwater System has reached a specific Degree of Sump Fullness (i.e. 0. 25, 50, 75 and 100% Full) and been sized for ⅛ AC Treatment Area, ¼ AC Treatment Area, ½ AC Treatment Area, 1 AC Treatment Area, and 2 AC Treatment Area respectively;

FIGS. 15A through 15E show a set of Performance Curves providing Maximum Treatment Flow (GPM), By-Pass Flow (GPM), and Treated Flow Velocity (feet per second, FPS) at 0% Degree of Sump Fullness, for ⅛ AC Treatment Area, ¼ AC Treatment Area, ½ AC Treatment Area, 1 AC Treatment Area, and 2 AC Treatment Area;

FIGS. 16A through 16E show a set of Performance Curves providing Maximum Treatment Flow (GPM), By-Pass Flow (GPM), and Treated Flow Velocity (feet per second, FPS) at 25% Degree of Sump Fullness, for ⅛ AC Treatment Area, ¼ AC Treatment Area, ½ AC Treatment Area, 1 Treatment Area, and 2 AC Area Treatment Area;

FIGS. 17A through 17E show a set of Performance Curves providing Maximum Treatment Flow (GPM), By-Pass Flow (GPM), and Treated Flow Velocity (feet per second, FPS) at 50% Degree of Sump Fullness, for ⅛ Treatment Area, ¼ AC Treatment Area, ½ AC Treatment Area, 1 AC Treatment Area, and 2 AC Treatment Area;

FIGS. 18A through 18E show a set of Performance Curves providing Maximum Treatment Flow (GPM), By-Pass Flow (GPM), and Treated Flow Velocity (feet per second, FPS) at 75% Degree of Sump Fullness, for ⅛ AC Treatment Area, ¼ AC Treatment Area, ½ AC Treatment Area, 1 AC Treatment Area, and 2 AC Treatment Area; and FIGS. 19A through 19E show a set of Performance Curves providing Maximum Treatment Flow (GPM), By-Pass Flow (GPM), and Treated Flow Velocity (feet per second, FPS) at 100% Degree of Sump Fullness, for ⅛ AC Treatment (FPS), ¼ AC Treatment Area, ½ AC Treatment Area, 1 AC Treatment Area, and 2 AC Treatment Area.

DETAILED DESCRIPTION OF THE ILLUSTRATIVE EMBODIMENT

Figure 1:
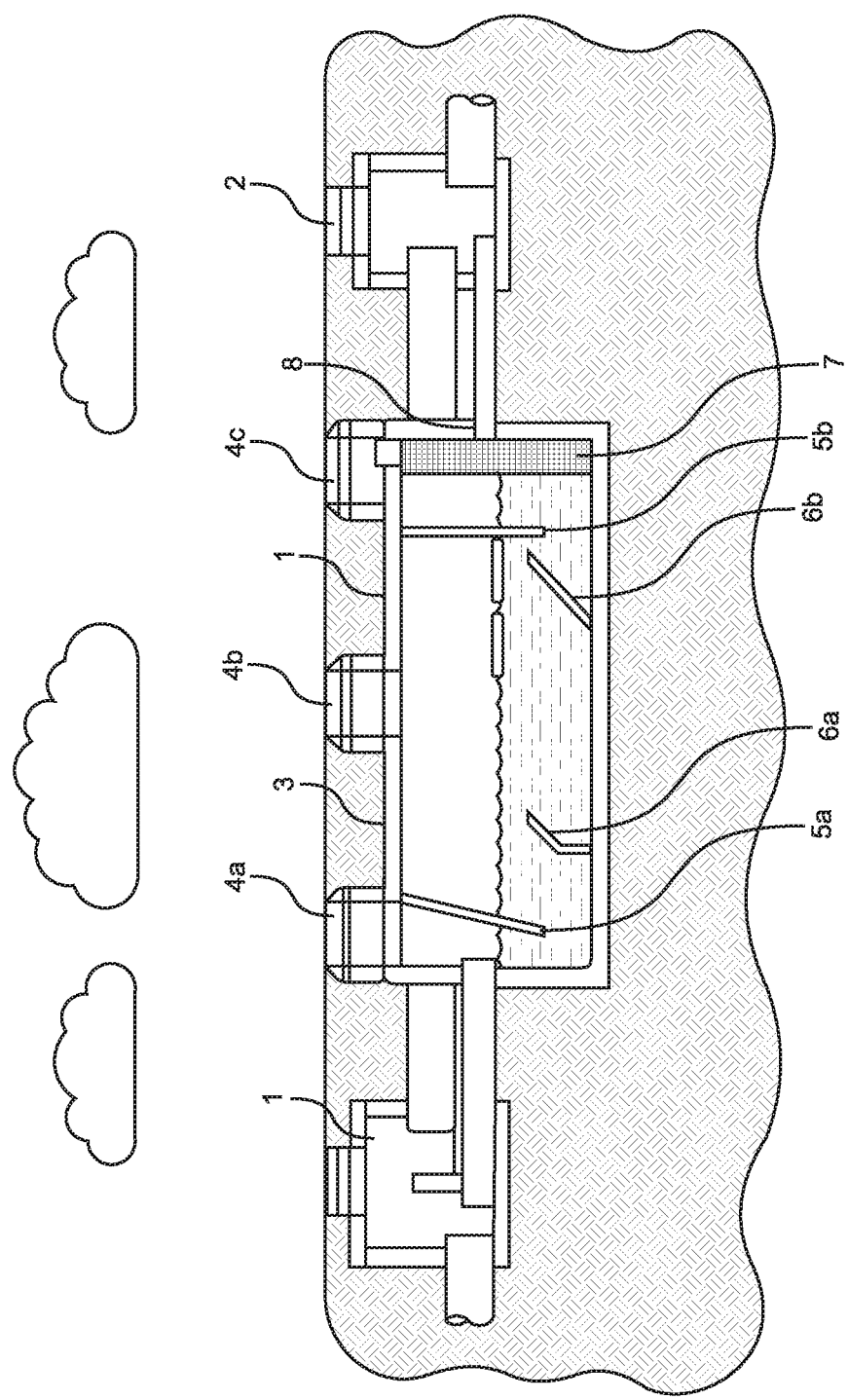
FIG. 1 is an elevated cross-sectional side view of a first prior art stormwater pretreatment system designed disclosed in U.S. Pat. No. 7,001,527, shown installed in the ground with various baffles, weirs and filter screens installed in a precast concrete structure for the purpose of pretreating and filtering debris from stormwater collected from above and beneath the Earth's surface.
Figure 2A:
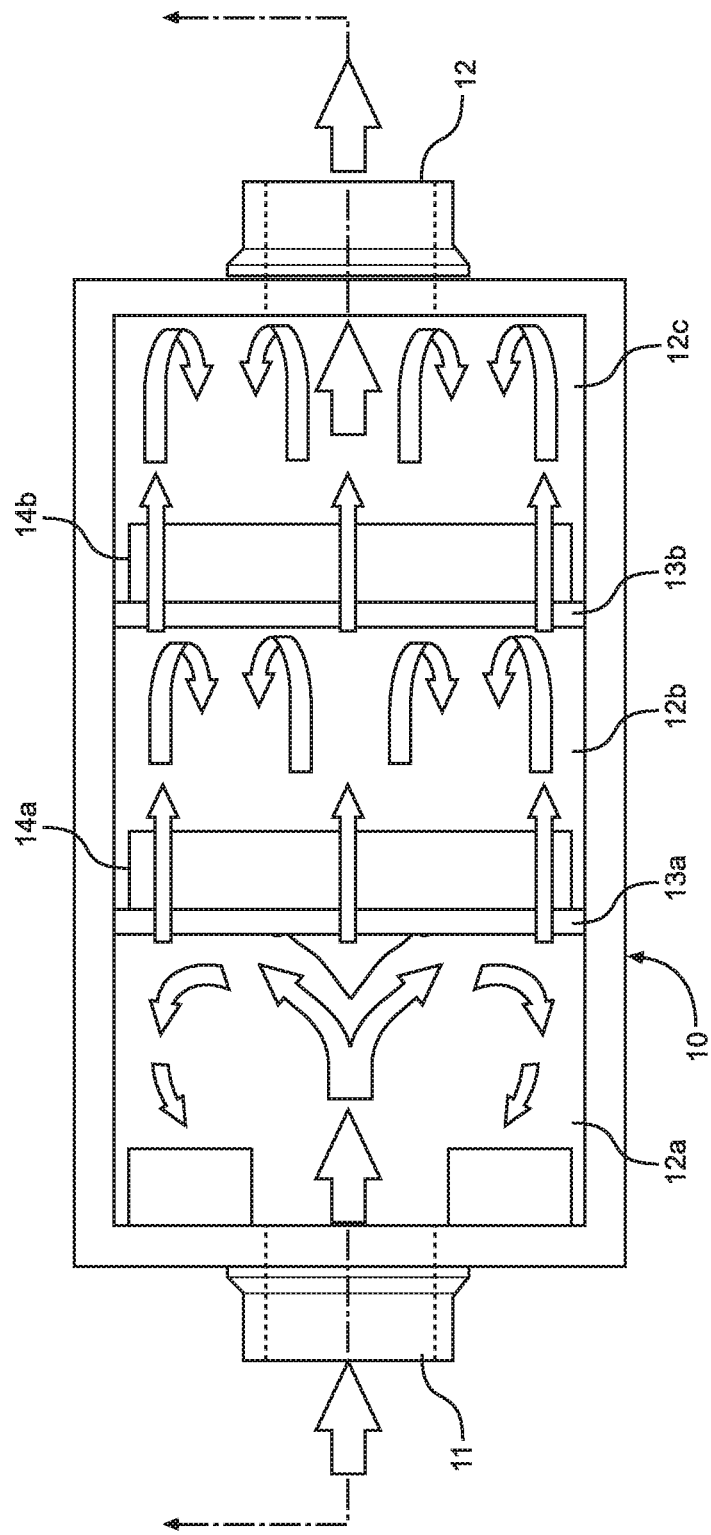
FIG. 2A is a plan view of a second prior art stormwater pretreatment system designed disclosed in U.S. Pat. No. 7,001,527, shown installed in the ground using various stages of weirs installed in a precast concrete structure for the purpose of pretreating and filtering debris from stormwater collected from above and beneath the Earth's surface.
Figure 2B:
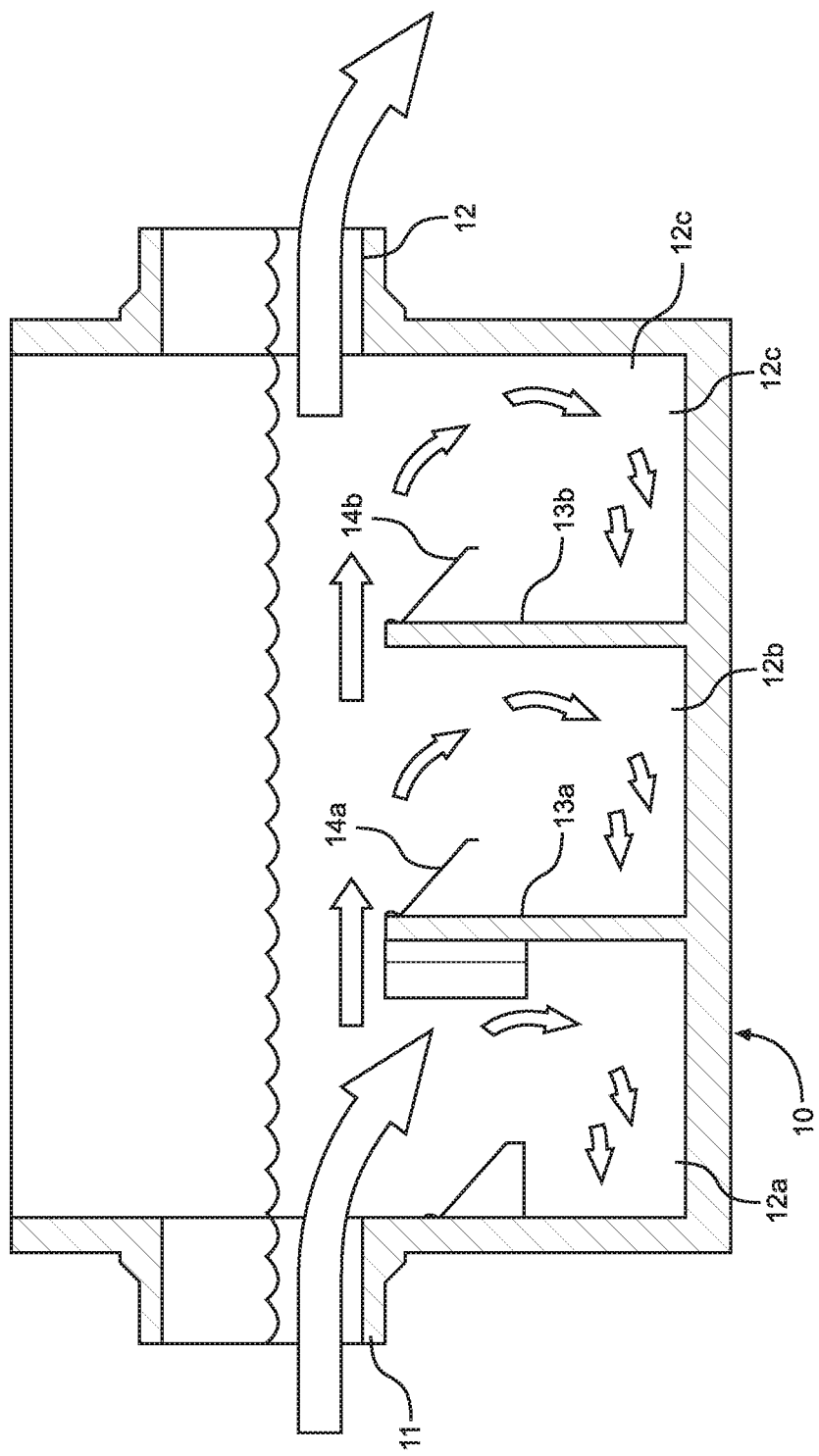
FIG. 2B is an elevated cross-sectional side view of the prior art stormwater pretreatment system disclosed in FIG. 2A.
Figure 3A:
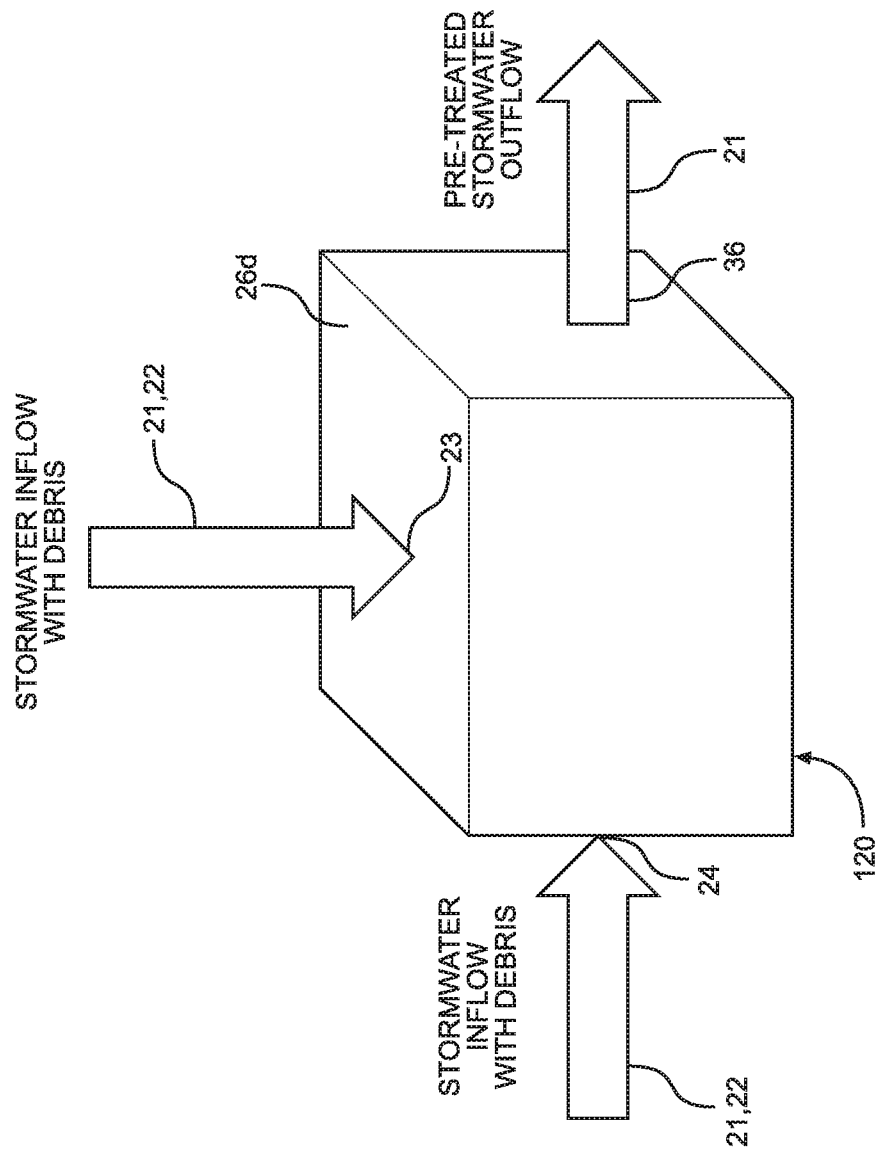
FIG. 3A is a schematic representation of a first illustrative embodiment of the stormwater collection and pretreatment filtering system of the present invention, wherein stormwater with debris flows through a top opening inflow port covered with a grating structure, and a side inflow port into the interior volume of the system.
Figure 3C:
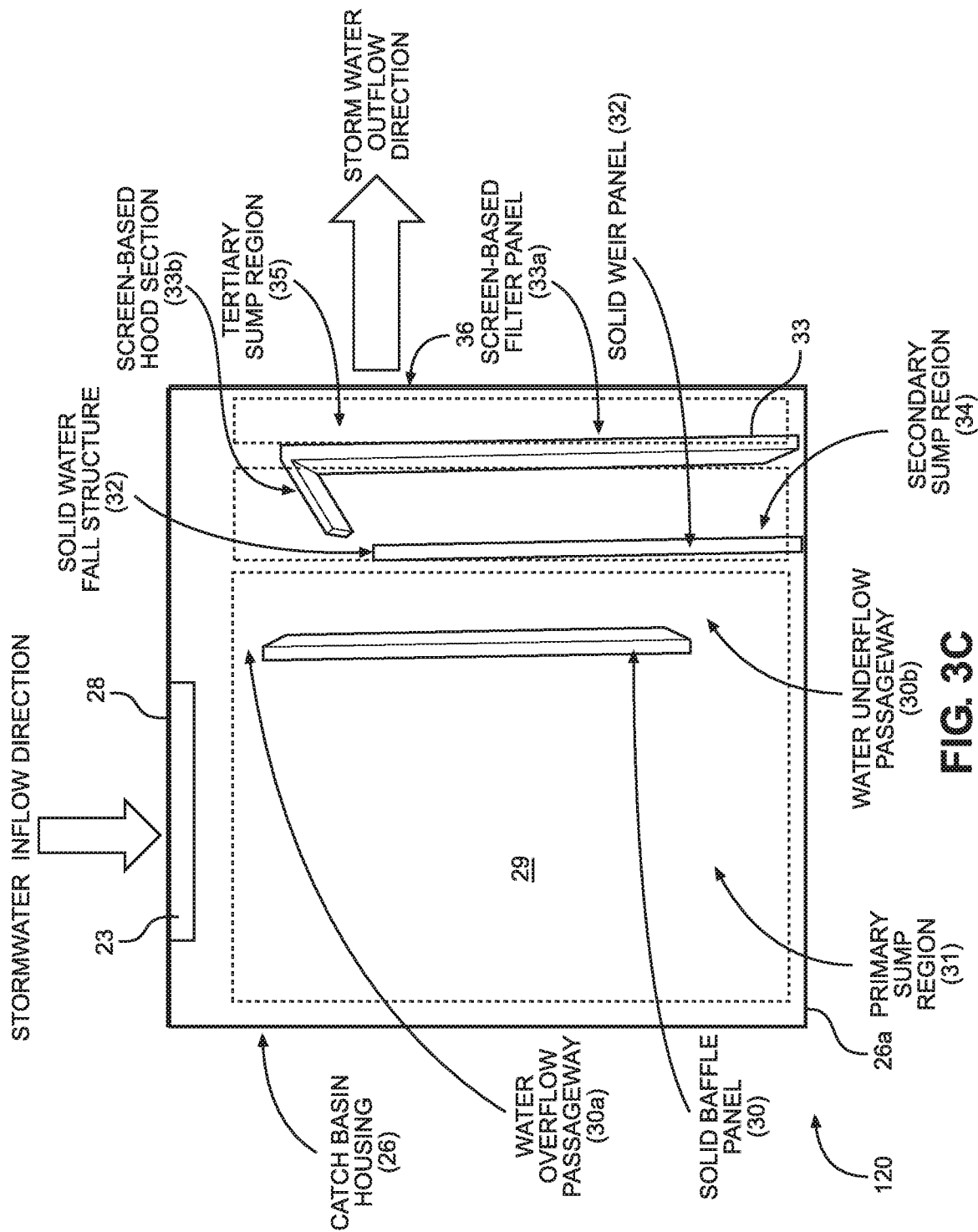
FIG. 3C is an elevated side cross-sectional view of the first illustrative embodiment of the stormwater collection and pretreatment filtering system of the present invention illustrated in FIGS. 3A and 3B, showing the concrete block-like unit comprising (i) the bottom wall portion, (ii) the first end wall portion extending from the bottom wall portion, (iii) the pair of first and second side wall portions ending from the bottom wall portion and disposed parallel to each other, and (iv) the top wall portion connected to the first end wall portion the first and second side wall portions, (v) the primary sump region with the 3D stormwater storage volume formed between the first end portion, the bottom wall portion, and the first and second side wall portions, (vi) at least one top inflow port formed in the top wall portion of the system and allowing stormwater with debris to flow through a grate structure and into the 3D stormwater storage volume, (vii) at least one side inflow port formed in the side wall portion of the system and allowing stormwater with debris to flow through a grate structure and into the 3D stormwater storage volume, (ii) the baffle wall suspended substantially perpendicularly to the bottom wall surface and between the first and second side wall portions, at second end of the primary sump region, (iii) the weir wall mounted on the bottom wall surface of the system and parallel to the baffle wall along the boundary of the primary sump region, (iv) the filter-screen wall portion provided with a filter screen supported perpendicularly from the bottom wall surface and beyond the weir wall and forming (v) the secondary sump region between the weir wall portion and the filter-screen wall portion, and (vi) the tertiary sump region provided beyond the filter-screen wall portion and supporting at least one outflow port allowing pretreated stormwater to flow through the tertiary sump region into the earth ground into which the system has been installed.

Referring to the accompanying Drawings, like structures and elements shown throughout the figures thereof shall be indicated with like reference numerals, across the various illustrative embodiments of the stormwater collection and pretreatment filtering systems of the present invention.
Specification of the In-Ground Stormwater Collection and Pretreatment Filtering System of the First Illustrative Embodiment of the Present Invention Provided with Ground-Surface-Level Collecting Inflow Port Covered with Drain Grate FIGS. 3A, 3B and 3C describe a first illustrative embodiment of the stormwater collection and pretreatment filtering system 120 of the present invention, wherein stormwater 21 with debris 22 flows through a top opening inflow port 23 and a side inflow port 24 into the interior volume of the system.

As shown in FIGS. 3B and 3B, the stormwater collection and pretreatment filtering system 120 is constructed in the form of a concrete block-like unit 25 comprising: (i) a bottom wall portion 26; (ii) a first end wall portion 26B extending from the bottom wall portion 26A; (iii) a pair of first and second side wall portions 26C1 and 26C2 ending from the bottom wall portion 26A and disposed parallel to each other; and (iv) a top wall portion 26D connected to the first end wall portion 26A and the first and second side wall portions 26C1 and 26C2; (v) a primary sump region 27A with a 3D stormwater storage volume 27B formed between the first end portion 26A, the bottom wall portion 26A, and the first and second side wall portions 26C1 and 26C2; (vi) at least one top inflow port 23 formed in the top wall portion 26D of the system and allowing stormwater with debris to flow through a grate structure 28 covering top-surface inflow port 23, and into the 3D stormwater storage volume 29; (vii) at least one side inflow port 24 formed in the end wall portion 26A of the system and allowing stormwater with debris to flow through a grate structure and into the 3D stormwater storage volume 29; (ii) a baffle wall portion 30 suspended substantially perpendicularly to the bottom wall surface 26A and between the first and second side wall portions 26C1 and 26C2, at second end of the primary sump region 31; (iii) a weir wall portion 32 mounted on the bottom wall surface of the system and parallel to the baffle wall 30 along the boundary of the primary sump region 31; (iv) a filter-screen wall portion 33 provided with a filter screen 33A supported perpendicularly from the bottom wall surface 26A and beyond the weir wall portion 32 and having a hooded screen section 33B and forming (v) a secondary sump region 34 between the weir portion 32 and the filter-screen wall portion 33; and (vi) a tertiary sump region 35 provided beyond the filter-screen wall portion 33 and supporting at least one outflow port 36 allowing pretreated stormwater 31 to flow through the tertiary sump region 35 into the earth ground into which the system has been installed. The baffle wall portion 30 and weir wall portion 32 are each realized as a solid, non-perforated panel substantially impervious to water flow directing water around to facilitate hydrodynamic processes.

Preferably, the stormwater collection and pretreatment filtering system 120 is formed as a precast-concrete block structure using conventional concrete molding technologies well known in the art. Examples of concrete block molding systems and methods are disclosed in U.S. Pat. Nos. 8,888,481 and 9,644,334 incorporated herein by reference in their entirety. However, other construction methods and apparatus may be used, such as plastic, reinforced plastic and/or fiberglass molding techniques.

When installing one or more stormwater collection and pretreatment filtration systems of the present invention 120 beneath or along the surface of the earth ground, as illustrated in FIG. 11A, standard underground piping (i.e. tubes and fittings) will be used as well known in the underground piping arts as required and approved by the construction codes applicable in the jurisdiction where the system is being installed. As required, piping may be coupled to the stormwater inflow ports that may be formed in the front end wall 26B (or side walls 26C1, 26C2) of the system unit 120 to allow stormwater with debris to flow into the system for collection and pretreatment processing in accordance with the principles of the present invention. Piping may also be coupled to the stormwater outflow ports 36 that may be formed in the rear end wall 26E of the system unit 20 to allow stormwater with debris to flow into the system for collection and pretreatment processing in accordance with the principles of the present invention.

To appreciate how the stormwater collection and pretreatment system 120 operates, reference is made to the six-phase system operation flow shown in FIGS. 4A through 4F, wherein at each phase, a particular state of stormwater is defined along with its behavior within the system in particular states of operation. These phases of operation will be described in detail below.

FIG. 4A illustrates a first phase (empty) of operation of the stormwater collection and pretreatment filtering system 120, where no stormwater is flowing through the top surface storm grate 28 into the primary sump region 31 within the 3D stormwater storage volume 29 of the system.

FIG. 4B illustrates a secondary phase (filling) of operation of the stormwater collection and pretreatment filtering system 120, where stormwater 21 is starting to flow through the top-surface storm grate 28 and into the primary sump region 31 of the system, but not sufficiently filling the primary sump region 31 to flow over the weir wall portion 32, as shown.

Figure 4C:
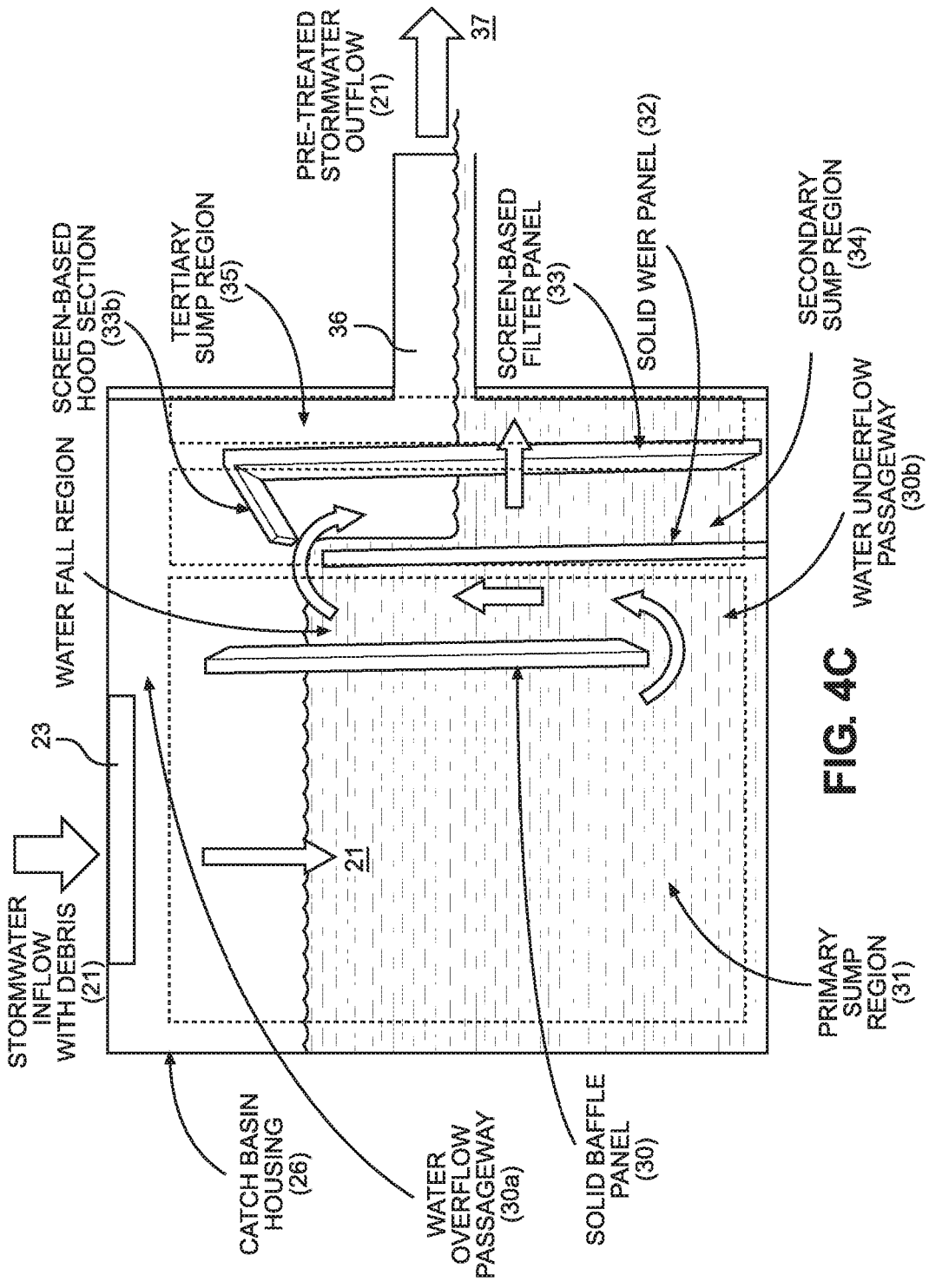
FIG. 4C is an elevated side cross-sectional view of the first illustrative embodiment of the stormwater collection and pretreatment filtering system of the present invention illustrated in FIGS. 3A, 3B and 3C, shown during a third phase of operation, wherein stormwater flowing through the storm grate over the too-surface inflow port has sufficiently filled the primary sump region and is flowing over the weir wall, and into the secondary sump region, and then flowing through the filter-screen wall portion from the secondary sump region into the tertiary sump region and out the outflow port for dispersion through the earth ground.

FIG. 4C illustrates a third phase (primary pretreatment) of operation of the stormwater collection and pretreatment filtering system 120, wherein stormwater 21 flowing through the storm grate 28 has sufficiently filled the primary sump region 31 and is flowing over the weir wall portion 32, and into the secondary sump region 34, and then flowing through the filter-screen wall portion 33 from the secondary sump region 34 into the tertiary sump region 35 and out the outflow port 36 for dispersion through the earth ground 37.

FIG. 4D illustrates a fourth phase (pretreatment and debris accumulation) of operation of the stormwater collection and pretreatment filtering system 120, wherein stormwater 21 flowing through the storm grate 28 has sufficiently filled the primary sump region 31, debris 22 is building up beneath the baffle wall 30 along the underflow passageway 30B, and is flowing over the weir wall portion 32 and into the secondary sump region 34, and then flowing from the secondary sump region 34 through the filter-screen wall portion 33 into the tertiary sump region 35 and out the outflow port 36 for dispersion through the earth ground 37.

Figure 4E:
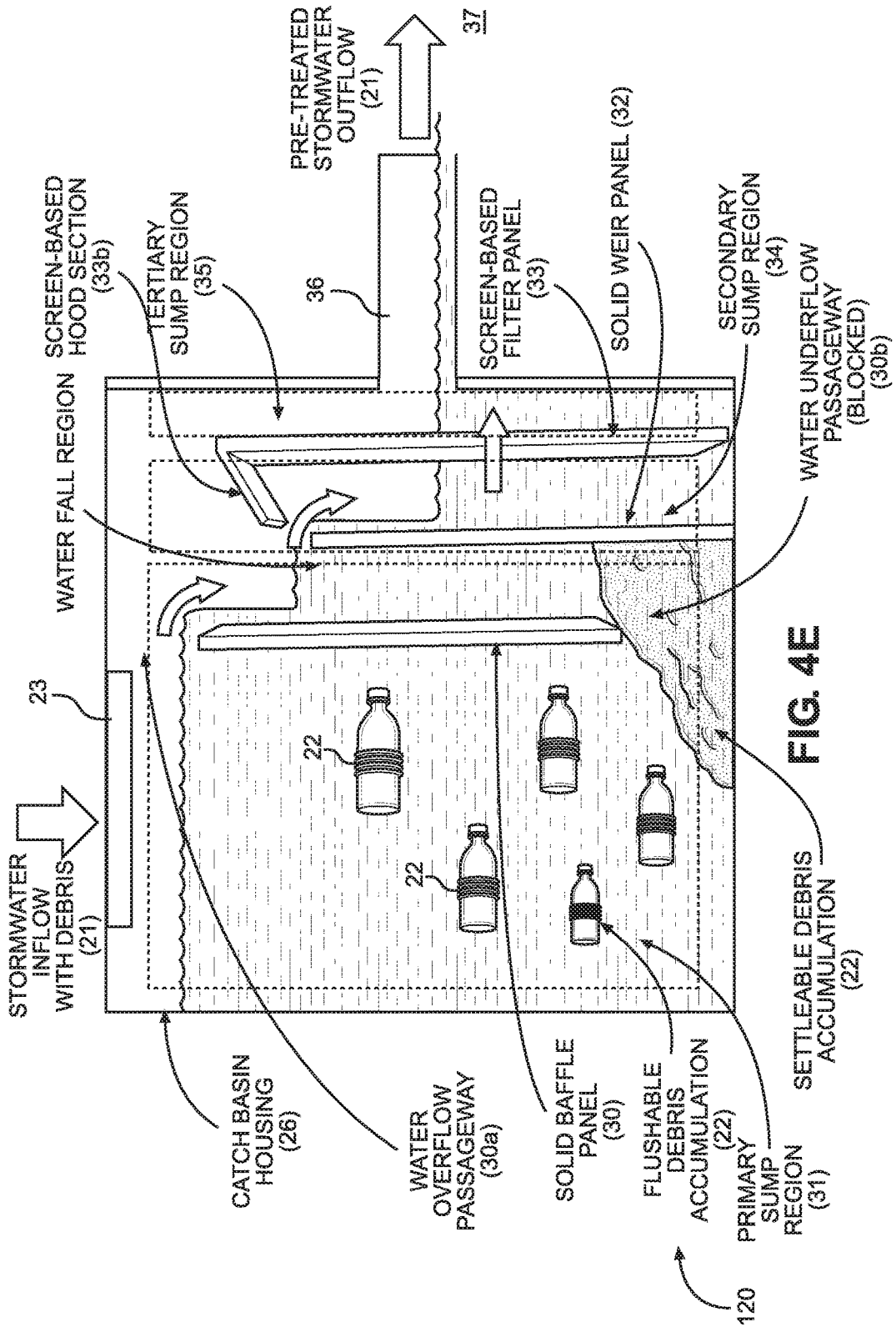
FIG. 4E is an elevated side cross-sectional view of the first illustrative embodiment of the stormwater collection and pretreatment filtering system of the present invention illustrated in FIGS. 3A, 3B and 3C, shown during a fifth phase of operation, designated as a first by-pass mode of operation, wherein stormwater flowing through the storm grate over the top-surface inflow port has sufficiently filled the primary sump region, debris beneath the baffle wall is completely blocking the underflow passageway, and stormwater in the primary sump region has risen to the top of the baffle wall portion and is flowing over the baffle wall portion and then flowing over the weir wall portion, and through the filter-screen wall portion into the tertiary sump region and out the outflow port for dispersion through the earth ground.

FIG. 4E illustrates a fifth phase (first bypass) of operation of the stormwater collection and pretreatment filtering system 120, wherein stormwater 21 flowing through the storm grate 28 has sufficiently filled the primary sump region 31, debris 22 beneath the baffle wall portion 30 is completely blocking the underflow passageway 30B, and stormwater 21 in the primary sump region 31 has risen to the top of the baffle wall portion 30 and is flowing over the baffle wall portion 30 and then flowing over the weir wall portion 32, and through the filter-screen wall portion 33 into the tertiary sump region 35 and out the outflow port 36 for dispersion through the earth ground 37.

FIG. 4F illustrates a sixth phase (second bypass) of operation of the stormwater collection and pretreatment filtering system 120, wherein the system is operating in its Second By-Pass Mode, with stormwater 21 flowing through the storm grate 28 has sufficiently filled the primary sump region 31, debris 22 beneath the baffle wall portion 30 is completely blocking the underflow passageway 30B, and debris buildup 22 on the filter-screen wall portion 33 is completely blocking stormwater flow therethrough 33, causing the stormwater to rise up and flow over the filter-screen wall portion 33 and into the tertiary sump region 35, and then out the outflow port 36 for dispersion through the earth ground 37.

When the system 120 becomes clogged with debris 22 and the system is forced into either the first or second overflow mode shown in FIGS. 4E and 4F, or during routine maintenance operations, the drain grate 28 installed over the top-surface inflow port 23 is removed to provide access to and hydraulic communication with the primary sump region 31, secondary sump region 34 and the tertiary sump region 35, for cleaning with pressurized water and vacuumed suctioned using a vacuum suction equipment (e.g. powered vacuum and pressurized water cleaning system including a long flexible hose terminated with a spray nozzle and vacuum suction nozzle). The necessary equipment is by use of conventional and commonly available equipment routinely employed in drainage infrastructure maintenance operations. This portable machinery system will be supported above ground during stormwater collection and pretreatment system maintenance operations. The width of the flexible tube used during vacuum and pressure washing operations will be sufficient in cross-sectional dimensions and length to fit through the typically circular top-surface mounted inflow port 23, and reach into the primary, secondary and tertiary sump regions 31, 34 and 35, respectively.

During vacuum operations, when debris 22 and water 21 collected within the sump regions, the vacuum pressure generated within the interior volume of the system will be sufficiently great to vacuum out and remove and remove substantially all debris and trash collected in the primary, secondary and tertiary sump regions of the system being maintained. During pressurized water power-washing operations, performed after an initial vacuuming operation, the interior wall surfaces of the primary, secondary and tertiary sump regions will be power-washed under hydraulic pressure, to remove debris and buildup. Thereafter, the water and debris collected in the primary, secondary and tertiary sump region will suctioned out of the system 120 through the flexible vacuum tube passed through the top-surface inflow port 23 of the system. The collected debris is then transported to a remote location for processing and handling in a responsible manner.

Figure 5A:
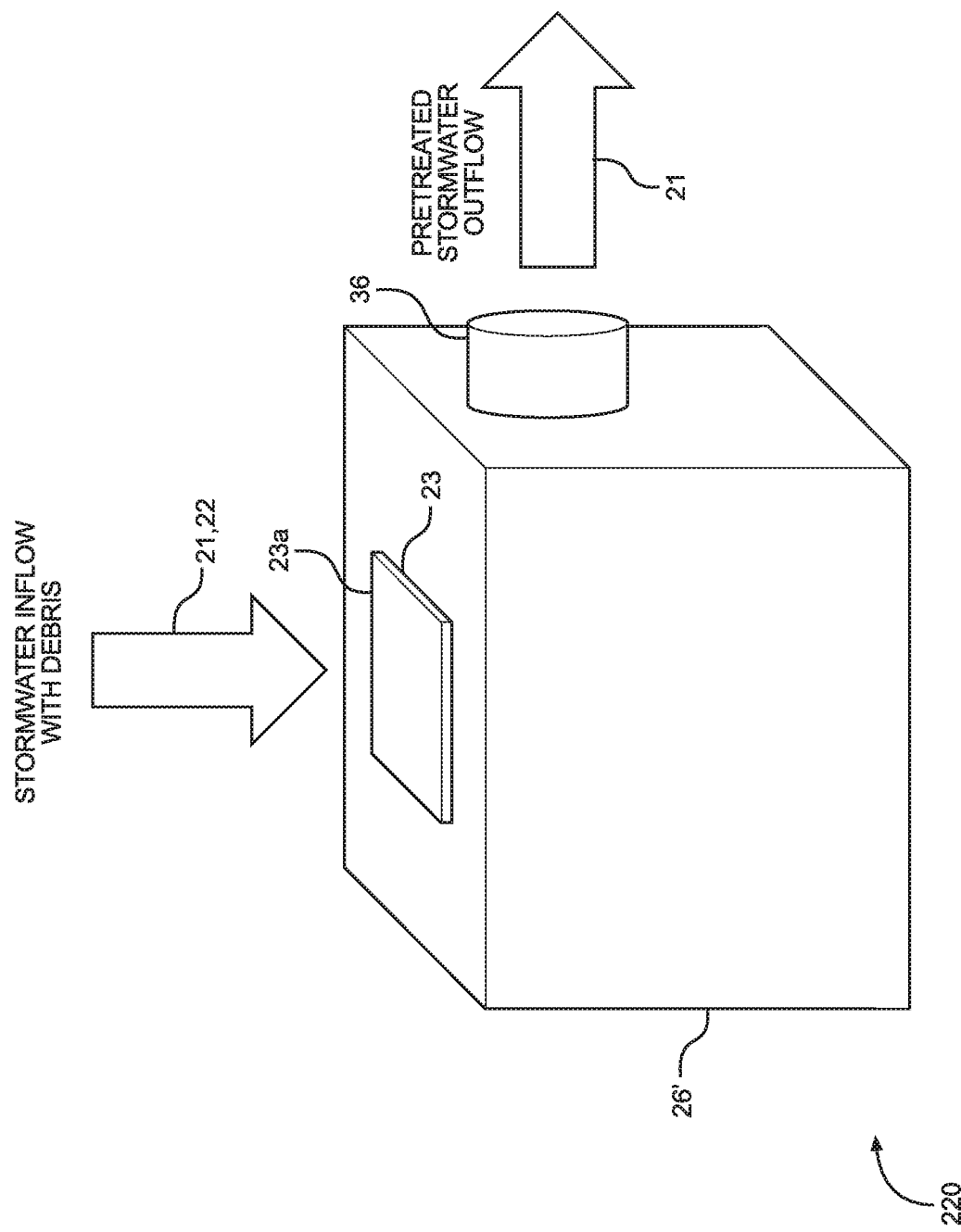
FIG. 5A is a schematic representation of a second illustrative embodiment of the stormwater collection and pretreatment filtering system of the present invention, wherein stormwater with debris flows through a top opening inflow port and a side inflow port into the 3D stormwater storage volume of the system.
Figure 5B:
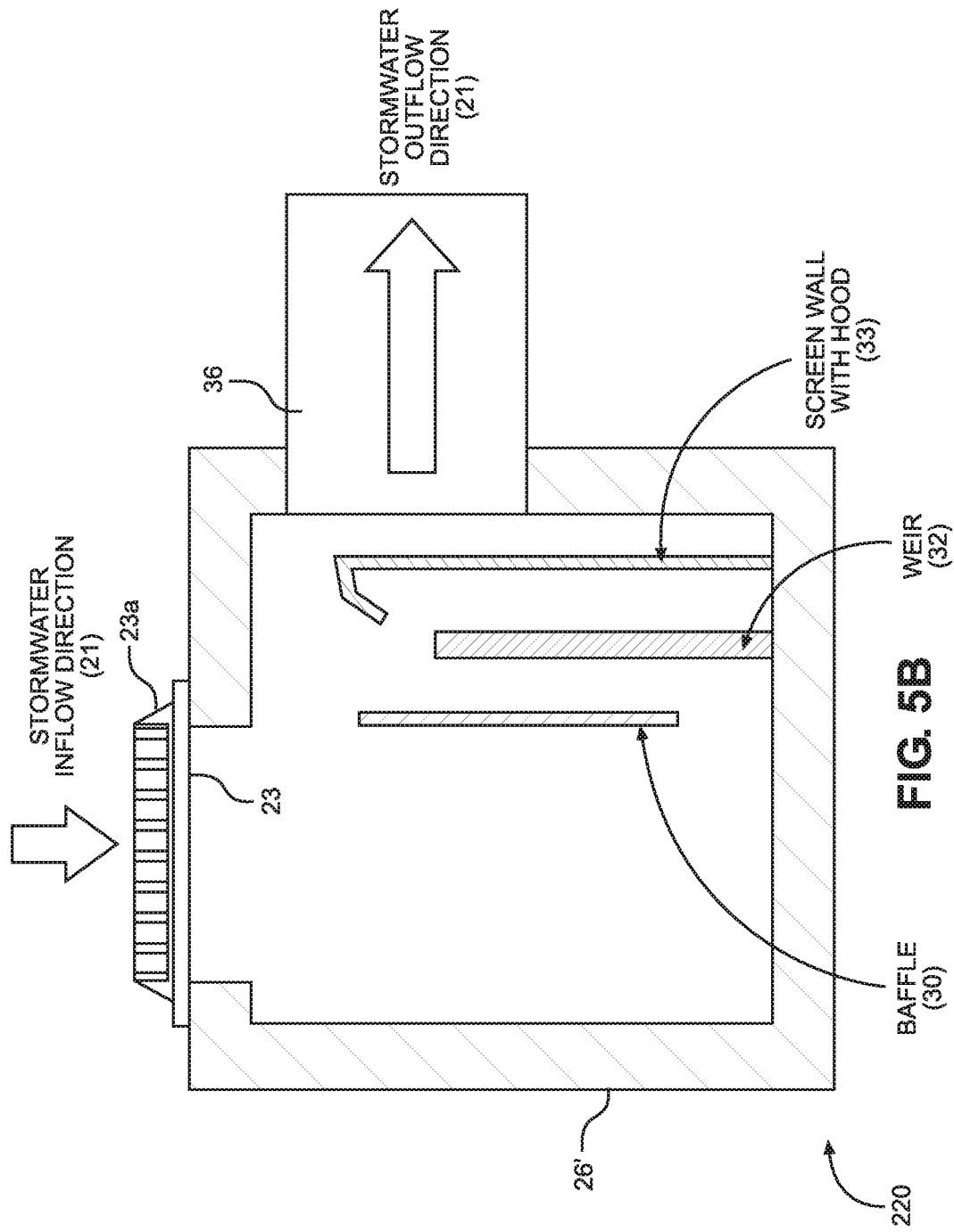
FIG. 5B is a cross-sectional view of the second illustrative embodiment of the stormwater collection and pretreatment filtering system of the present invention illustrated in FIG. 5A, constructed in the form of a concrete block-like unit comprising (i) a bottom wall portion, (ii) a first end wall portion extending from the bottom wall portion, (iii) a pair of first and second side wall portions ending from the bottom wall portion and disposed parallel to each other, and (iv) a top wall portion connected to the first end wall portion the first and second side wall portions, (v) a primary sump region with a 3D stormwater storage volume formed between the first end portion, the bottom wall portion, and the first and second side wall portions, (vi) at least one top inflow port formed in the top wall portion of the system and allowing stormwater with debris to flow through a grate structure and into the 3D stormwater storage volume, (vii) at least one side inflow port formed in the side wall portion of the system and allowing stormwater with debris to flow through a grate structure and into the 3D stormwater storage volume, (viii) a baffle wall portion suspended substantially perpendicularly to the bottom wall surface and between the first and second side wall portions, at second end of the primary sump region, (ix) a weir wall portion mounted on the bottom wall surface of the system and parallel to the baffle wall along the boundary of the primary sump region and providing an underflow passageway for stormwater, (x) a filter-screen wall portion provided with a filter screen supported perpendicularly from the bottom wall surface and beyond the weir wall and forming (xi) a secondary sump region between the weir wall portion and the filter-screen wall portion, and (xii) a tertiary sump region provided beyond the filter-screen wall portion and supporting at least one outflow port allowing pretreated stormwater to flow through the tertiary sump region into the earth ground, into which the system has been installed.

Specification of the In-Ground Stormwater Collection and Pretreatment System of the Second Illustrative Embodiment of the Present Invention Provided with Ground-Surface-Level Collecting Inflow Port Covered with Drain Grate, and Underground Side Wall Inflow Port Connected to Underground Stormwater Piping FIGS. 5A and 5B describe a second illustrative embodiment of the stormwater collection and pretreatment filtering system 220, wherein stormwater 21 with debris 22 flows through a top-side opening inflow port 23 and a side-wall inflow port 23' into the interior volume of the system.

As shown in FIGS. 5B and 5C, the second illustrative embodiment of the stormwater collection and pretreatment filtering system 220 illustrated in FIG. 5A, constructed in the form of a concrete block-like unit comprises: (i) a bottom wall portion 26A; (ii) a first end wall 26B portion extending from the bottom wall portion, 26A; (iii) a pair of first and second side wall portions 26C1 and 26C2 ending from the bottom wall portion and disposed parallel to each other, and (iv) a top wall portion 26D connected to the first end wall portion 26B the first and second side wall portions 26C1 and 26C2; (v) a primary sump region 31 with a 3D stormwater storage volume 29 formed between the first end portion, the bottom wall portion, and the first and second side wall portions; (vi) at least one top inflow port 23 formed in the top wall portion of the system and allowing stormwater 21 with debris 22 to flow through a grate structure 23A and into the 3D stormwater storage volume 29; (vii) at least one side inflow port 23' formed in the front wall portion 23B or side wall portion(s) 26C1 and 26C2 of the system and allowing stormwater with debris to flow through a grate structure and into the 3D stormwater storage volume; (ii) a baffle wall portion 30 suspended (between the side wall portions 26C1 and 26C2) substantially perpendicularly to the bottom wall surface 26A and between the first and second side wall portions 26C1, 26C2, towards second end of the primary sump region 31; (iii) a weir wall portion 32 mounted on the bottom wall surface 26A of the system and parallel to the baffle wall 30 along the boundary of the primary sump region 31, as shown; (iv) a filter-screen wall portion 33 provided with a filter screen 33A supported perpendicularly from the bottom wall surface 26A and beyond the weir wall portion 32 and forming (v) a secondary sump region 34 between the weir wall portion 32 and the filter-screen wall portion 33; and (vi) a tertiary sump region 35 provided beyond the filter-screen wall portion 33 and supporting at least one outflow port 36 allowing pretreated stormwater 21 to flow through the tertiary sump region 35 and disperse into the earth ground 37 into which the system 220 has been installed, with gravel and soil and other materials provided about the installed system 220. The baffle wall portion 30 and weir wall portion 32 are each realized as a solid, non-perforated panel substantially impervious to water flow.

Preferably, the stormwater collection and pretreatment system 220 is formed as a precast-concrete block structure using conventional concrete molding technologies. Examples of concrete block molding systems and methods are disclosed in U.S. Pat. Nos. 8,888,481 and 9,644,334 incorporated herein by reference in their entirety. However, other construction methods may be used, such as reinforced plastic, or fiberglass molding techniques.

When installing one or more stormwater collection and pretreatment filtration systems of the present invention 220 beneath or along the surface of the earth ground, as illustrated in FIG. 11A, standard underground piping (i.e. tubes and couplings) will be used as well known in the underground piping arts as required and approved by the construction codes applicable in the jurisdiction where the system is being installed. As required, piping may be coupled to the stormwater inflow ports that may be formed in the front end wall 26B (or side walls 26C1, 26C2) of the system unit 220 to allow stormwater 21 with debris 22 (e.g. bottles, trash, twigs, branches, leaves, pinecones, seeds, and sediment including soil, pebbles, minerals, and organic and inorganic debris) to flow into the system for collection and pretreatment processing in accordance with the principles of the present invention. Piping may also be coupled to the stormwater outflow ports 36 that may be formed in the rear end wall 26E of the system unit 20 to allow stormwater with debris to flow into the system 220 for collection and pretreatment processing in accordance with the principles of the present invention.

To appreciate how the stormwater collection and pretreatment system 220 operates, reference is made to the six-phase system operation flow shown in FIGS. 6A through 6F, wherein at each phase, a particular state of stormwater is defined along with its behavior within the system in particular states of operation. These phases of operation will be described in detail below.

FIG. 6A illustrates the first phase (empty) of operation of the second illustrative embodiment of the stormwater collection and pretreatment filtering system 220 illustrated in FIGS. 5A, 5B and 5C, where no stormwater is flowing through the top surface storm grate into the primary sump region with the 3D stormwater storage volume of the system.

Figure 6B:
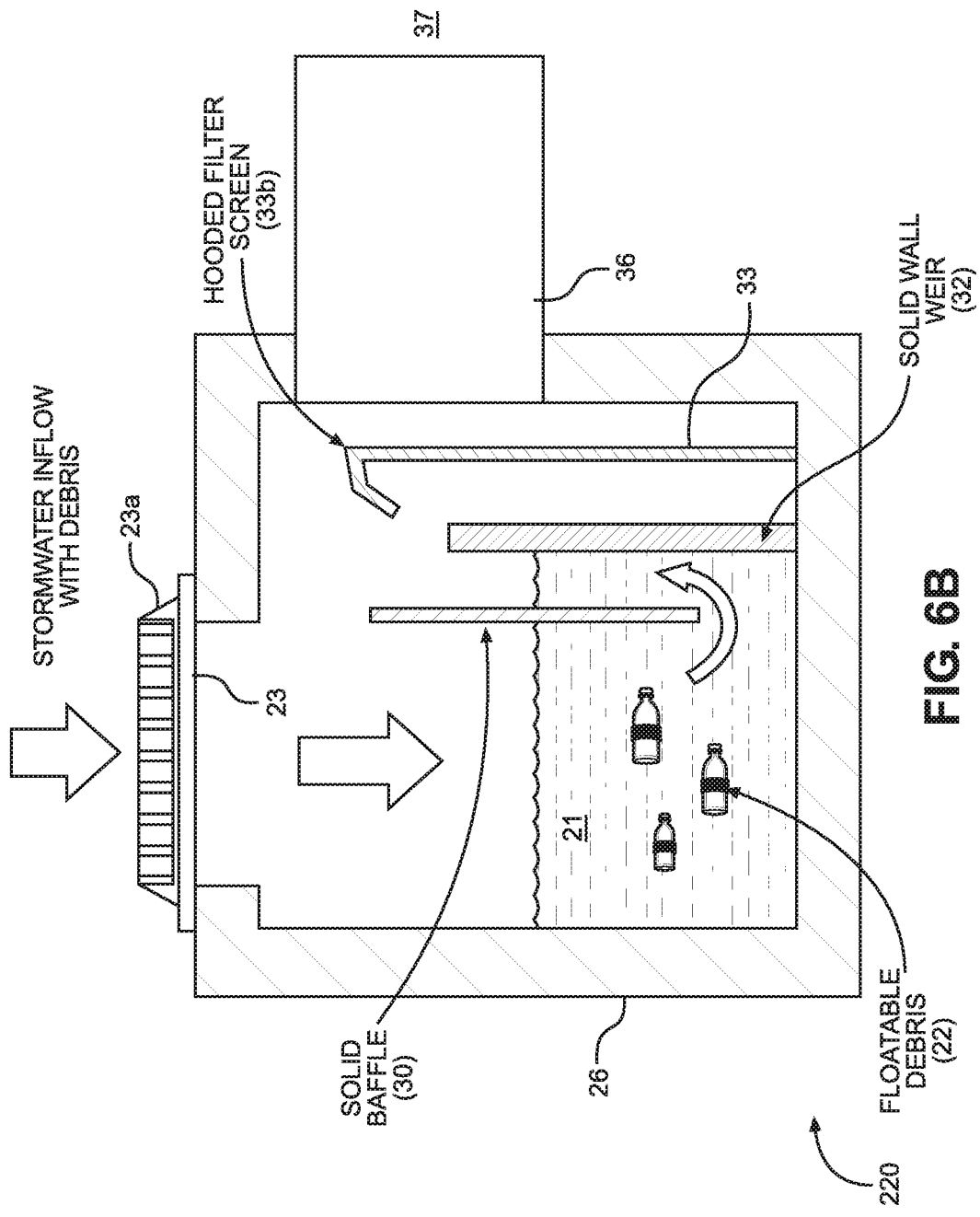
FIG. 6B is an elevated side cross-sectional view of the second illustrative embodiment of the stormwater collection and pretreatment filtering system of the present invention illustrated in FIGS. 6A, 6B and 6C, shown during a second phase of operation, where stormwater is starting to flow through the top surface storm grate and into the primary sump region of the system, but not sufficiently filling the primary sump region to flow over the weir wall, as shown.

FIG. 6B illustrates the second phase (filling) of the operation of the second illustrative embodiment of the stormwater collection and pretreatment filtering system 220, where stormwater is starting to flow through the top surface storm grate and into the primary sump region of the system, but not sufficiently filling the primary sump region to flow over the weir wall, as shown.

FIG. 6C illustrates the third phase (primary pretreatment) of operation of the second illustrative embodiment of the stormwater collection and pretreatment filtering system 220, wherein stormwater flowing through the storm grate has sufficiently filled the primary sump region and is flowing over the weir wall, and into the secondary sump region, and then flowing through the filter-screen wall portion from the secondary sump region into the tertiary sump region and out the outflow port for dispersion through the earth ground.

Figure 6D:
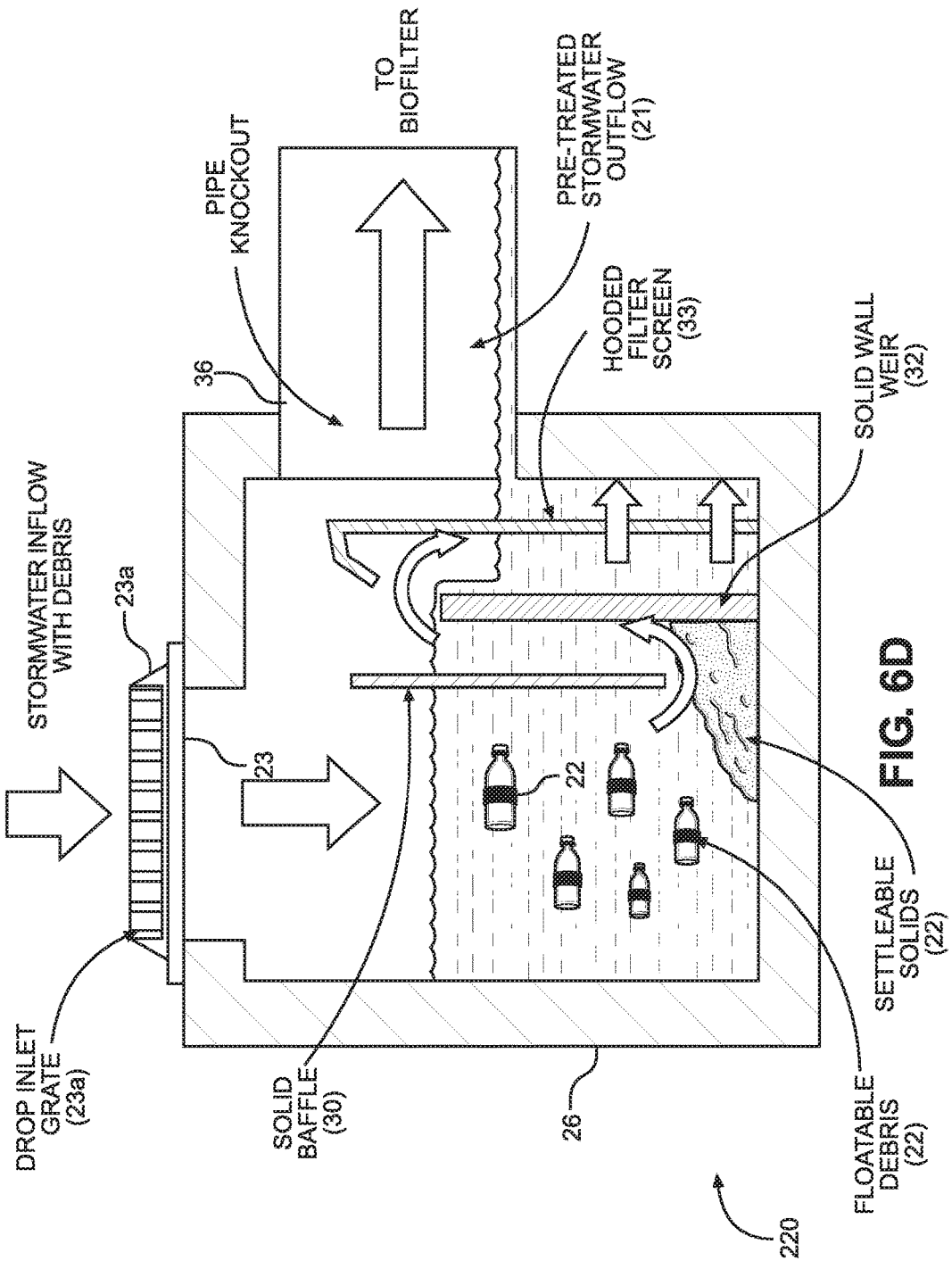
FIG. 6D is an elevated side cross-sectional view of the second illustrative embodiment of the stormwater collection and pretreatment filtering system of the present invention illustrated in FIGS. 6A, 6B and 6C, shown during a fourth phase of operation, wherein stormwater flowing through the storm grate has sufficiently filled the primary sump region, debris is building up beneath the baffle wall portion along the underflow passageway, and is flowing over the weir wall portion and into the secondary sump region, and then flowing from the secondary sump region through the filter-screen wall portion into the tertiary sump region and out the outflow port for dispersion through the earth ground.
Figure 6E:
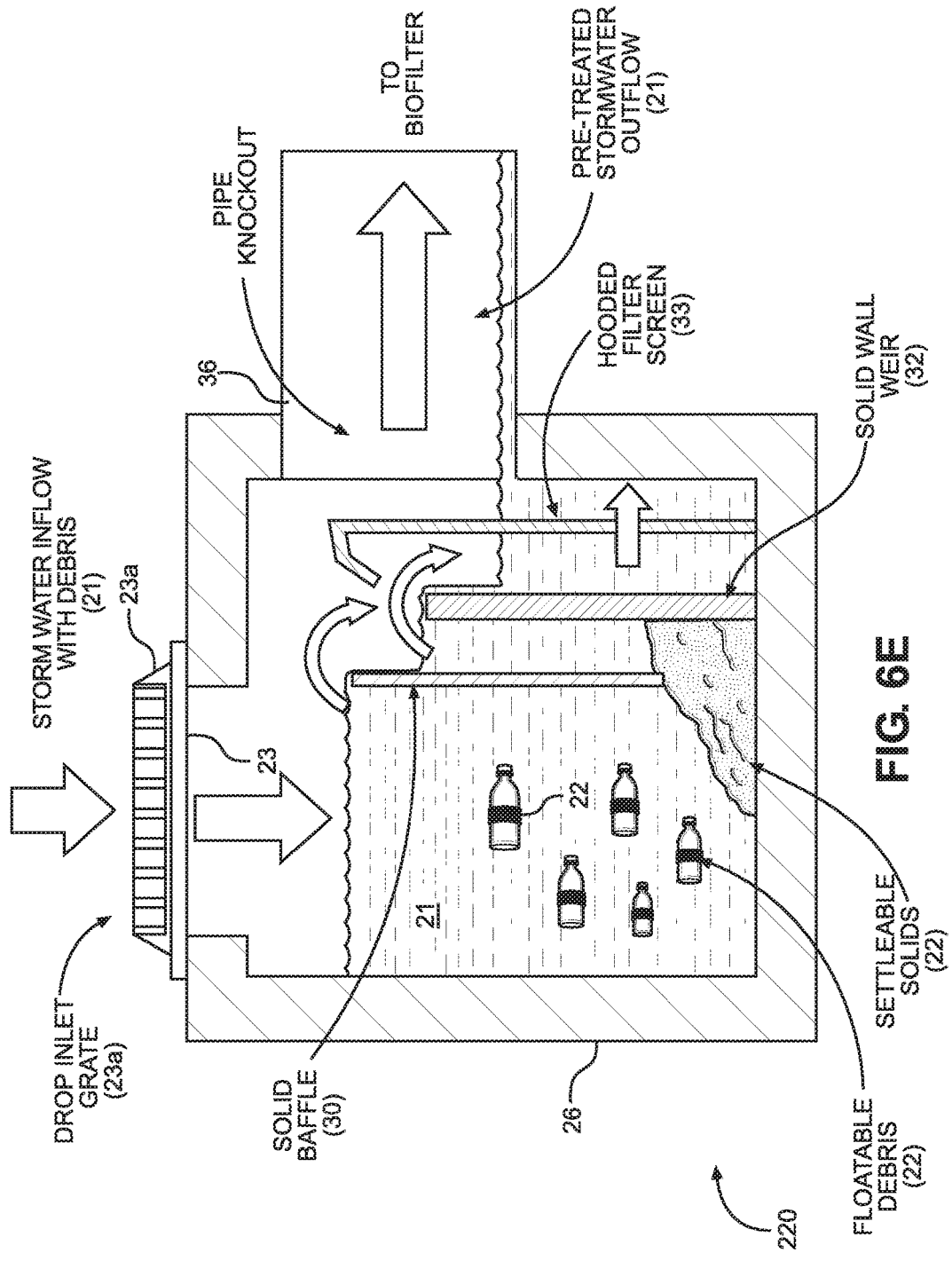
FIG. 6E is an elevated side cross-sectional view of the second illustrative embodiment of the stormwater collection and pretreatment filtering system of the present invention illustrated in FIGS. 6A, 6B and 6C, shown during a fifth phase of operation, designated as a first by-pass mode of operation, wherein stormwater flowing through the storm grate has sufficiently filled the primary sump region, debris beneath the baffle wall is completely blocking the underflow passageway, and stormwater in the primary sump region has risen to the top of the baffle wall and is flowing over the baffle wall portion and then flowing over the weir wall portion, and through the filter-screen wall portion into the tertiary sump region and out the outflow port for dispersion through the earth ground.

FIG. 6D illustrates the fourth phase (pretreatment and debris accumulation) of operation of the second illustrative embodiment of the stormwater collection and pretreatment filtering system 220, wherein stormwater flowing through the storm grate has sufficiently filled the primary sump region, debris is building up beneath the baffle wall along the underflow passageway, and is flowing over the weir wall and into the secondary sump region, and then flowing from the secondary sump region through the filter-screen wall portion into the tertiary sump region and out the outflow port for dispersion through the earth ground;

FIG. 6E illustrates the fifth phase (first bypass) of operation of the second illustrative embodiment of the stormwater collection and pretreatment filtering system 220, wherein the system is operating in its first by-pass mode, wherein stormwater flowing through the storm grate has sufficiently filled the primary sump region, debris beneath the baffle wall is completely blocking the underflow passageway, and stormwater in the primary sump region has risen to the top of the baffle wall and is flowing over the baffle wall and then flowing over the weir wall, and through the filter-screen wall portion into the tertiary sump region and out the outflow port for dispersion through the earth ground.

Figure 6F:
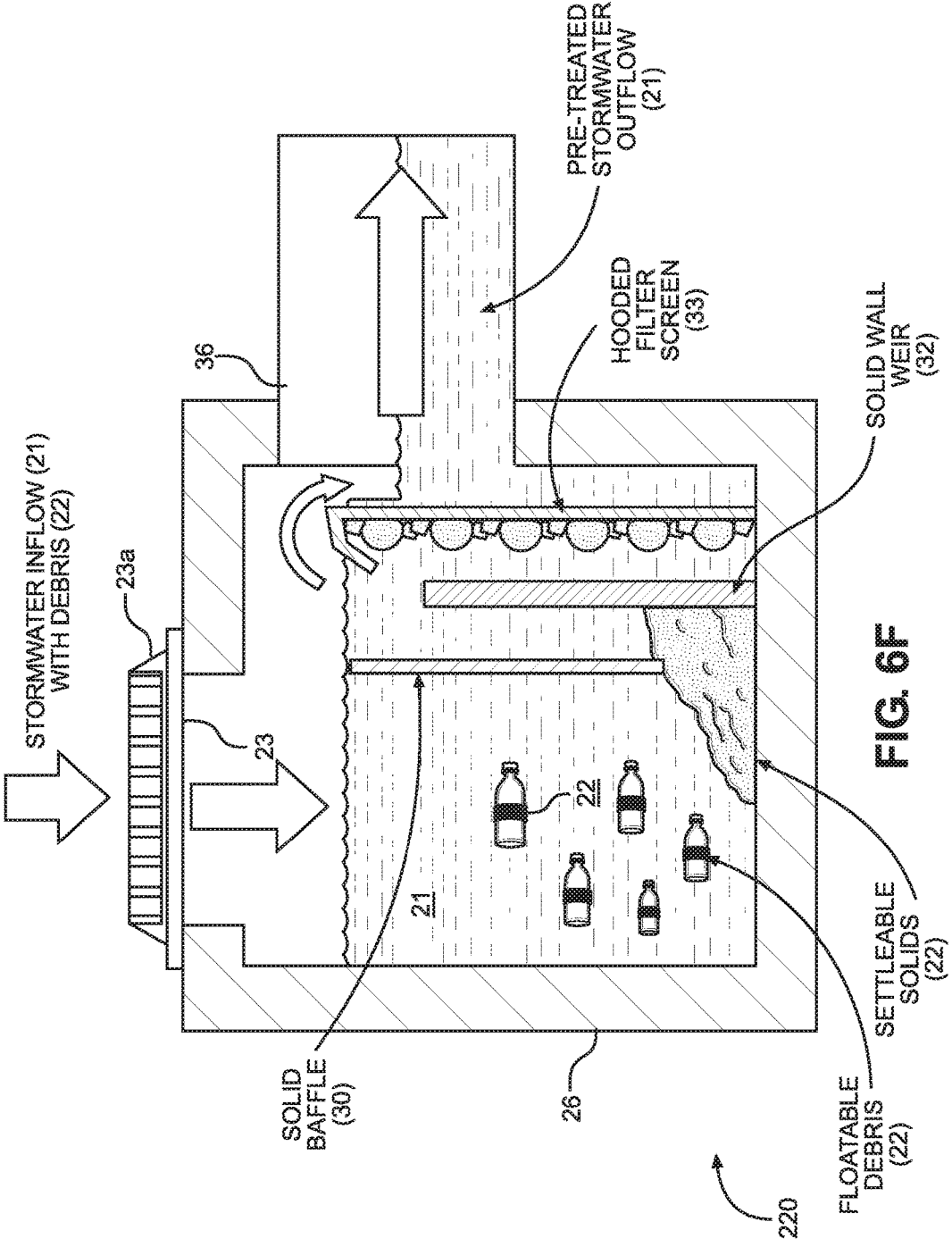
FIG. 6F is an elevated side cross-sectional view of the second illustrative embodiment of the stormwater collection and pretreatment filtering system of the present invention illustrated in FIGS. 6A, 6B and 6C, shown during a sixth phase of operation, designated as a second by-pass mode of operation, wherein stormwater flowing through the storm grate has sufficiently filled the primary sump region, debris beneath the baffle wall is completely blocking the underflow passageway, and debris buildup on the filter-screen wall portion is completely blocking stormwater flow therethrough, causing the stormwater to rise up and flow over the filter-screen wall portion and into the tertiary sump region, and then out the outflow port for dispersion through the earth ground.

FIG. 6F illustrates the sixth phase (second bypass) of operation of the stormwater pretreatment filtering 40, wherein the system is operating in its second by-pass mode of operation, with stormwater flowing through the storm grate has sufficiently filled the primary sump region, debris beneath the baffle wall is completely blocking the underflow passageway, and debris buildup on the filter-screen wall portion is completely blocking stormwater flow therethrough, causing the stormwater to rise up and flow over the filter-screen wall portion and into the tertiary sump region, and then out the outflow port for dispersion through the earth ground.

When the system 220 becomes clogged with debris and the system is forced into either the first or second over-ride mode shown in FIGS. 6E and 6F, or during routine maintenance operations, the drain grate 23A installed over the top-surface inflow port 23 is removed to provide access to and hydraulic communication with the primary sump region 31, secondary sump region 34 and the tertiary sump region 35, for cleaning with pressurized water and vacuumed suctioned using a vacuum suction equipment (e.g. powered vacuum and pressurized water cleaning system including a long flexible hose terminated with a spray nozzle and vacuum suction nozzle). The necessary equipment is by use of conventional and commonly available equipment routinely employed in drainage infrastructure maintenance operations. This portable machinery system will be supported above ground during stormwater collection and pretreatment system maintenance operations. The width of the flexible tube used during vacuum and pressure washing operations will be sufficient in cross-sectional dimensions and length to fit through the typically circular top-surface mounted inflow port 23, and reach into the primary, secondary and tertiary sump regions. During vacuum operations, when debris and water collected within the sump regions, the vacuum pressure generated within the interior volume of the system will be sufficiently great to vacuum out and remove all debris and trash collected in the primary, secondary and tertiary sump regions of the system being maintained. During pressurized water power-washing operations, performed after an initial vacuuming operation, the interior wall surfaces of the primary, secondary and tertiary sump regions will be power-washed under hydraulic pressure, to remove debris and buildup. Thereafter, the water and debris collected in the primary, secondary and tertiary sump region will suctioned out of the system through the flexible vacuum tube passed through the top-surface inflow port of the system. The collected debris is then transported to a remote location for processing and handling in a responsible manner.

Figure 7B:
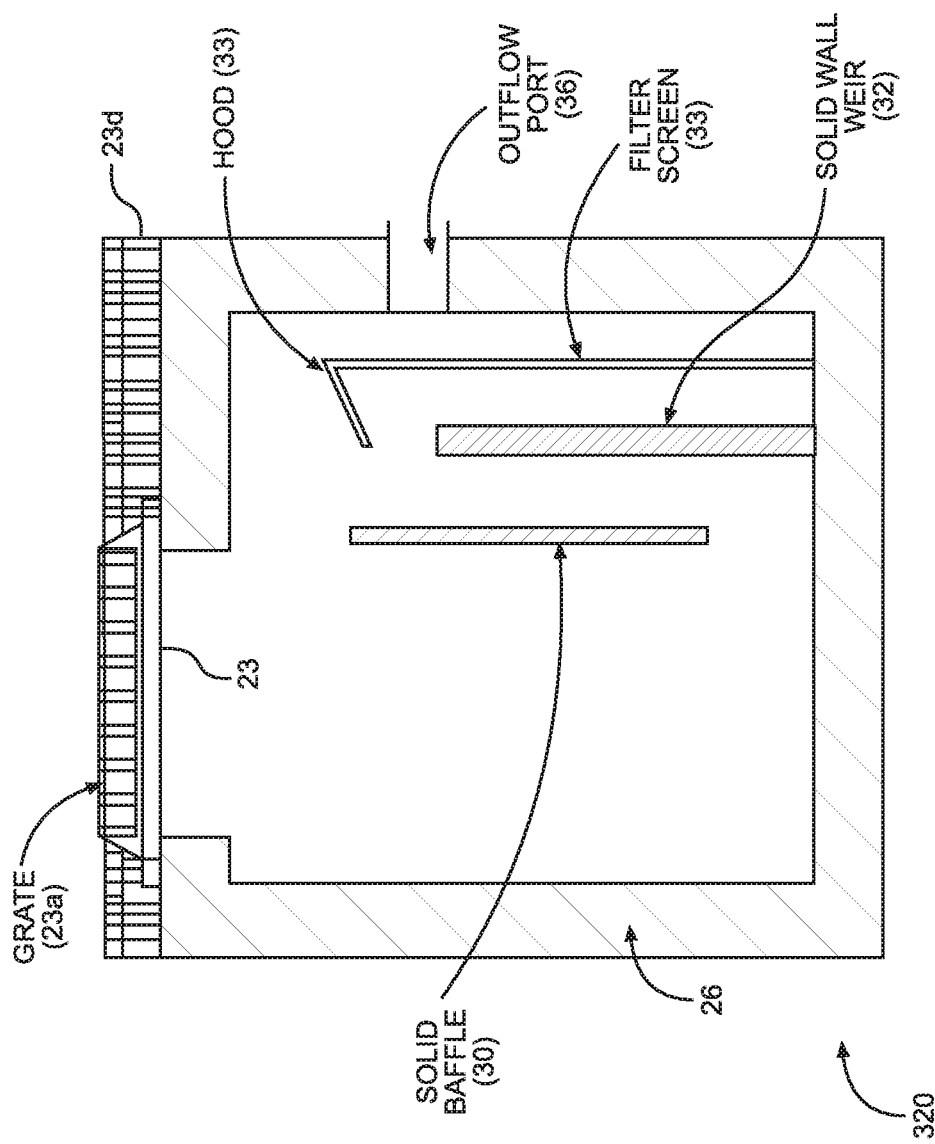
FIG. 7B is a cross-sectional view of the third illustrative embodiment of the stormwater collection and pretreatment filtering system of the present invention illustrated in FIG. 7A, constructed in the form of a concrete block-like unit comprising (i) a bottom wall portion, (ii) a first end wall portion extending from the bottom wall portion, (iii) a pair of first and second side wall portions ending from the bottom wall portion and disposed parallel to each other, and (iv) a top wall portion connected to the first end wall portion the first and second side wall portions, (v) a primary sump region with a 3D stormwater storage volume formed between the first end portion, the bottom wall portion, and the first and second side wall portions, (vi) at least one top inflow port formed in the top wall portion of the system and allowing stormwater with debris to flow through a grate structure and into the 3D stormwater storage volume, (vii) at least one side inflow port formed in the side wall portion of the system and allowing stormwater with debris to flow through a grate structure and into the 3D stormwater storage volume, (viii) a baffle wall portion suspended substantially perpendicularly to the bottom wall surface and between the first and second side wall portions, at second end of the primary sump region providing an underflow pass way, (ix) a weir wall portion mounted on the bottom wall surface of the system and parallel to the baffle wall along the boundary of the primary sump region, (x) a filter-screen wall portion provided with a filter screen supported perpendicularly from the bottom wall surface and beyond the weir wall portion and forming (xi) a secondary sump region between the weir wall portion and the filter-screen wall, and (xii) a tertiary sump region provided beyond the filter-screen wall and supporting at least one outflow port allowing pretreated stormwater to flow through the tertiary sump region into the earth ground into which the system has been installed.

Specification of the In-Ground Stormwater Pretreatment System of the Third Illustrative Embodiment of the Present Invention Provided with Ground-Surface-Level Collecting Inflow Port Covered with Drain Grate FIGS. 7A, 7B and 7C describe a third illustrative embodiment of the stormwater collection and pretreatment filtering system of the present invention, wherein stormwater with debris flows through a top opening inflow port and a side inflow port into the interior volume of the system.

As shown in FIG. 7B, the third illustrative embodiment of the stormwater collection and pretreatment filtering system of the present invention illustrated in FIG. 7A, constructed in the form of a concrete block-like unit comprising: (i) a bottom wall portion 26A; (ii) a first end wall portion 26A extending from the bottom wall portion 26A; (iii) a pair of first and second side wall portions 26C1 and 26C2 ending from the bottom wall portion 26A and disposed parallel to each other; and (iv) a top wall portion 26D connected to the first end wall portion 26B and the first and second side wall portions 26C1 and 26C2; (v) a primary sump region with a 3D stormwater storage volume 29 formed between the first end portion 26B, the bottom wall portion 26A, and the first and second side wall portions 26C1 and 26C2; (vi) at least one top inflow port 23 formed in the top wall portion of the system and allowing stormwater with debris to flow through a grate structure 23A and into the 3D stormwater storage volume 29; (vii) at least one side inflow port 23' formed in the side wall portion 26B (26C1, 26C2) of the system and allowing stormwater 21 with debris 22 to flow through a grate structure 23A and into the 3D stormwater storage volume 29; (ii) a baffle wall portion 30 suspended substantially perpendicularly to the bottom wall surface 26A and between the first and second side wall portions 26C1 and 26C2, located towards the second end of the primary sump region 31, (iii) a weir wall portion 32 mounted on the bottom wall surface of the system and parallel to the baffle wall portion 32 along the boundary of the primary sump region; (iv) a filter-screen wall portion 33 provided with a filter screen 33A supported perpendicularly from the bottom wall surface and beyond the weir wall portion 32 and forming (v) a secondary sump region between the weir wall and the filter-screen wall; and (vi) a tertiary sump region 35 provided beyond the filter-screen wall portion 33 and supporting at least one outflow port 36 allowing pretreated stormwater to flow through the tertiary sump region 35 into the earth ground into which the system has been installed. The baffle wall portion 30 and weir wall portion 32 are each realized as a solid, non-perforated panel substantially impervious to water flow.

Preferably, the stormwater collection and pretreatment system 120 is formed as a precast-concrete block structure using conventional concrete molding technologies. Examples of concrete block molding systems and methods are disclosed in U.S. Pat. Nos. 8,888,481 and 9,644,334 incorporated herein by reference in their entirety. However, other construction methods may be used, such as reinforced plastic, or fiberglass molding techniques.

When installing one or more stormwater collection and pretreatment filtration systems 320 beneath or along the surface of the earth ground, as illustrated in FIG. 11A, standard underground piping (i.e. tubes and couplings) will be used as well known in the underground piping arts as required and approved by the construction codes applicable in the jurisdiction where the system is being installed. As required, piping may be coupled to the stormwater inflow ports that may be formed in the front end wall 26B (or side walls 26C1, 26C2) of the system unit 320 to allow stormwater with debris to flow into the system for collection and pretreatment processing in accordance with the principles of the present invention. Piping may also be coupled to the stormwater outflow ports 36 that may be formed in the rear end wall 26E of the system unit 320 to allow stormwater with debris to flow into the system for collection and pretreatment processing in accordance with the principles of the present invention.

To appreciate how the stormwater collection and pretreatment system 320 operates, reference is made to the six-phase system operation flow shown in FIGS. 8A through 8F, wherein at each phase, a particular state of stormwater is defined along with its behavior within the system in particular states of operation. These phases of operation will be described in detail below.

Figure 8A:
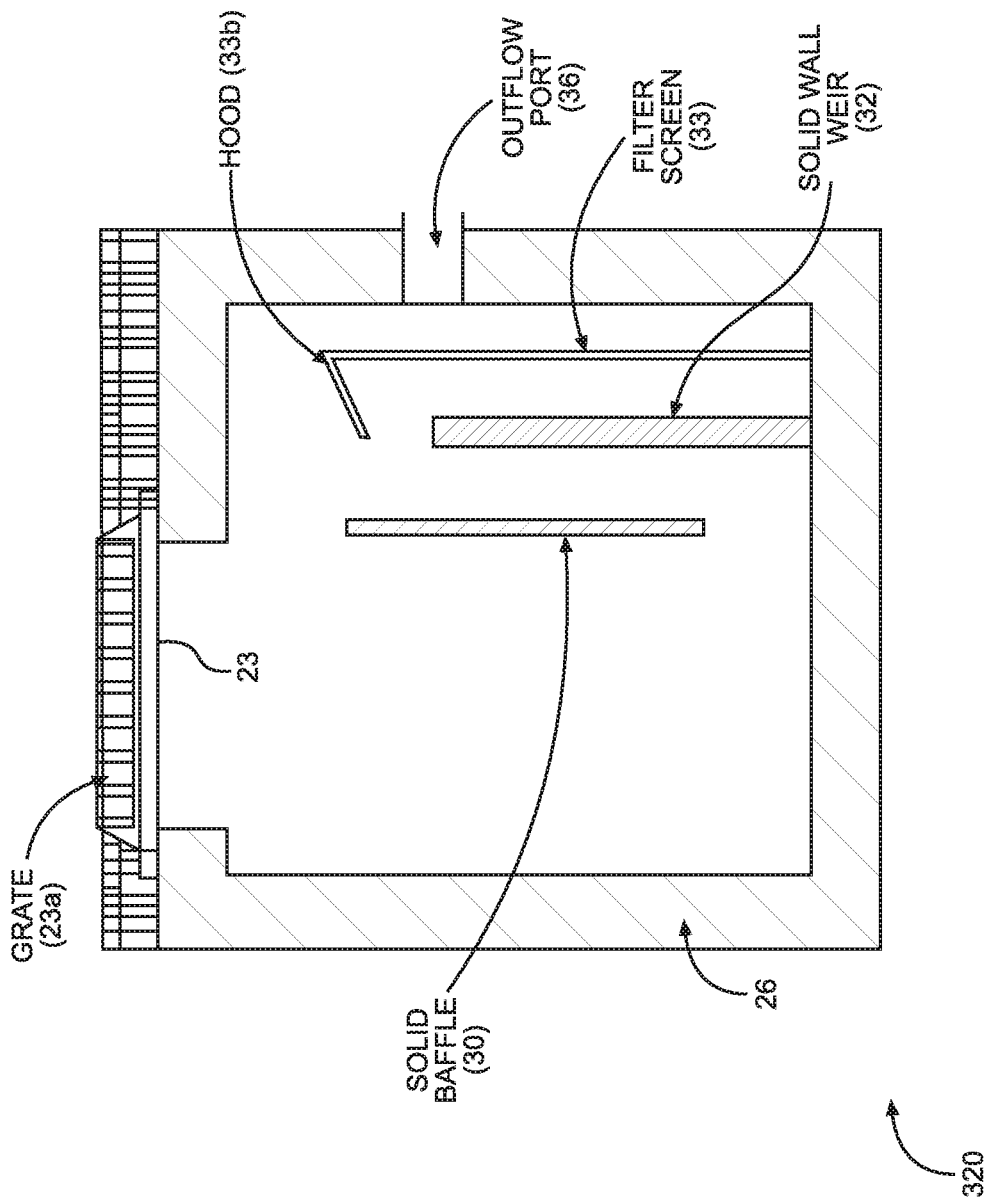
FIG. 8A is an elevated side cross-sectional view of the third illustrative embodiment of the stormwater collection and pretreatment filtering system of the present invention illustrated in FIGS. 8A, 8B and 8C, shown during a first phase of operation, where no stormwater is flowing through the top surface storm grate into the primary sump region with the 3D stormwater storage volume of the system.

FIG. 8A illustrates a first phase (empty) of operation of the third illustrative embodiment of the stormwater collection and pretreatment filtering system 320, where no stormwater is flowing through the top surface storm grate into the primary sump region with the 3D stormwater storage volume of the system.

Figure 8B:
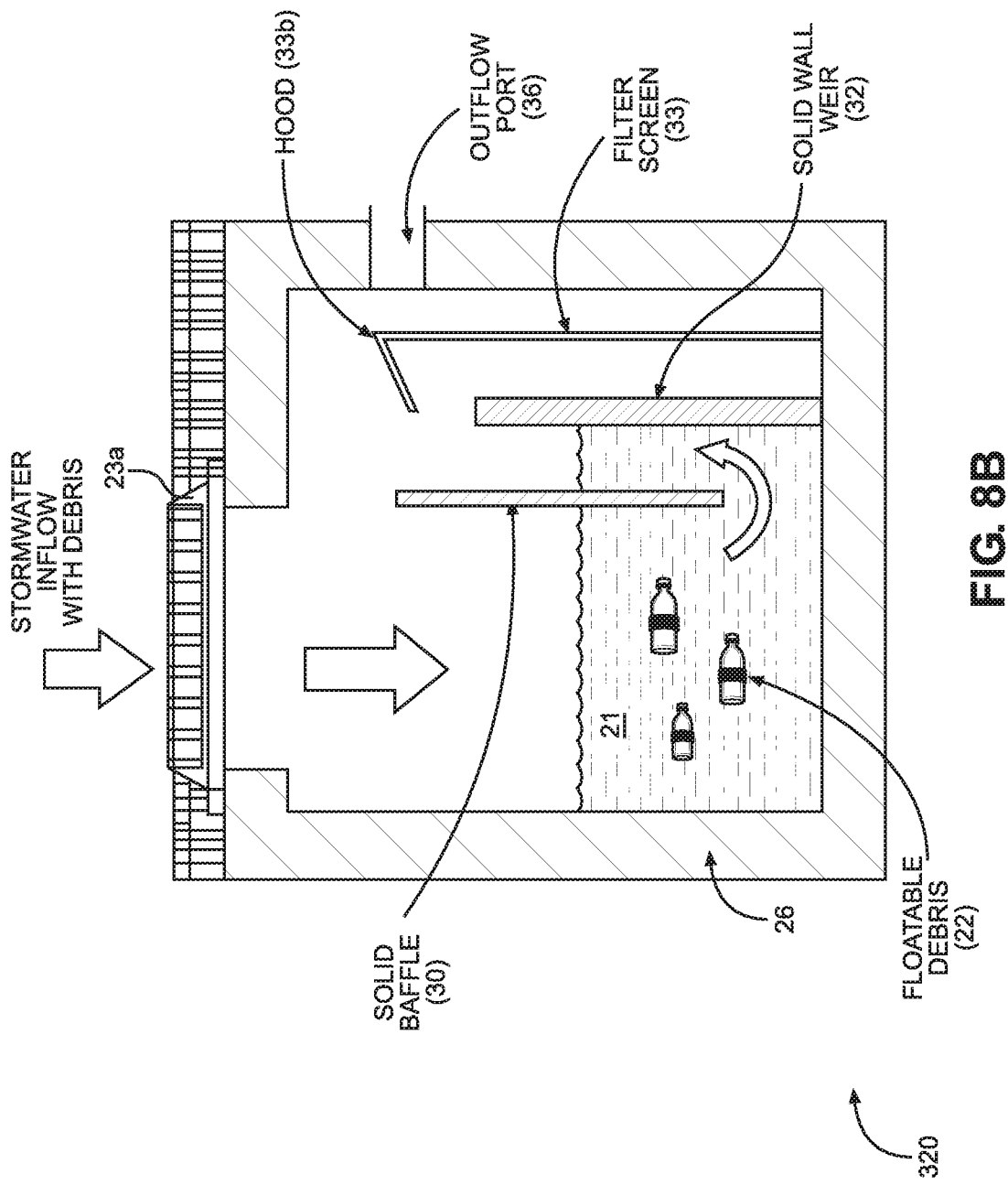
FIG. 8B is an elevated side cross-sectional view of the third illustrative embodiment of the stormwater collection and pretreatment filtering system of the present invention illustrated in FIGS. 8A, 8B and 8C, shown during a second phase of operation, where stormwater is starting to flow through the top surface storm grate and into the primary sump region of the system, but not sufficiently filling the primary sump region to flow over the weir wall, as shown.

FIG. 8B illustrates a second phase (filling) of operation of the third illustrative embodiment of the stormwater collection and pretreatment filtering system 320, where stormwater is starting to flow through the top surface storm grate 23 and into the primary sump region 31 of the system, but not sufficiently filling the primary sump region to flow over the weir wall, as shown.

Figure 8C:
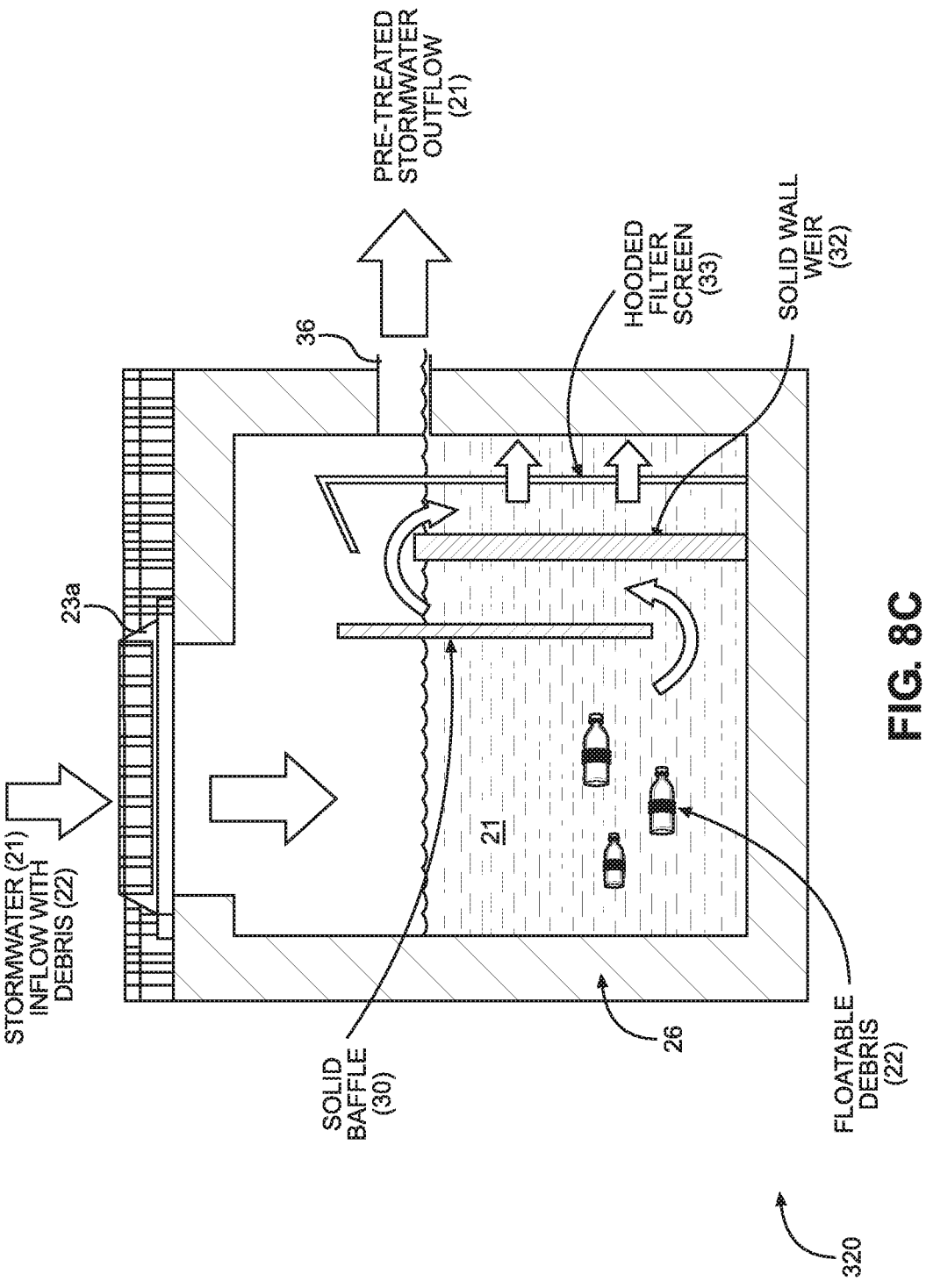
FIG. 8C is an elevated side cross-sectional view of the third illustrative embodiment of the stormwater collection and pretreatment filtering system of the present invention illustrated in FIGS. 8A, 8B and 8C, shown during a third phase of operation, wherein stormwater flowing through the storm grate has sufficiently filled the primary sump region and is flowing over the weir wall, and into the secondary sump region, and then flowing through the filter-screen wall portion from the secondary sump region into the tertiary sump region and out the outflow port for dispersion through the earth ground.

FIG. 8C illustrates a third phase (primary pretreatment) of operation of the third illustrative embodiment of the stormwater collection and pretreatment filtering system 320, wherein stormwater flowing through the storm grate 23 has sufficiently filled the primary sump region 31 and is flowing over the weir wall 32, and into the secondary sump region 34, and then flowing through the filter-screen wall portion 33 from the secondary sump region 34 into the tertiary sump region 35 and out the outflow port 36 for dispersion through the earth ground 37 (e.g. biofilter or bio filtration field).

Figure 8D:
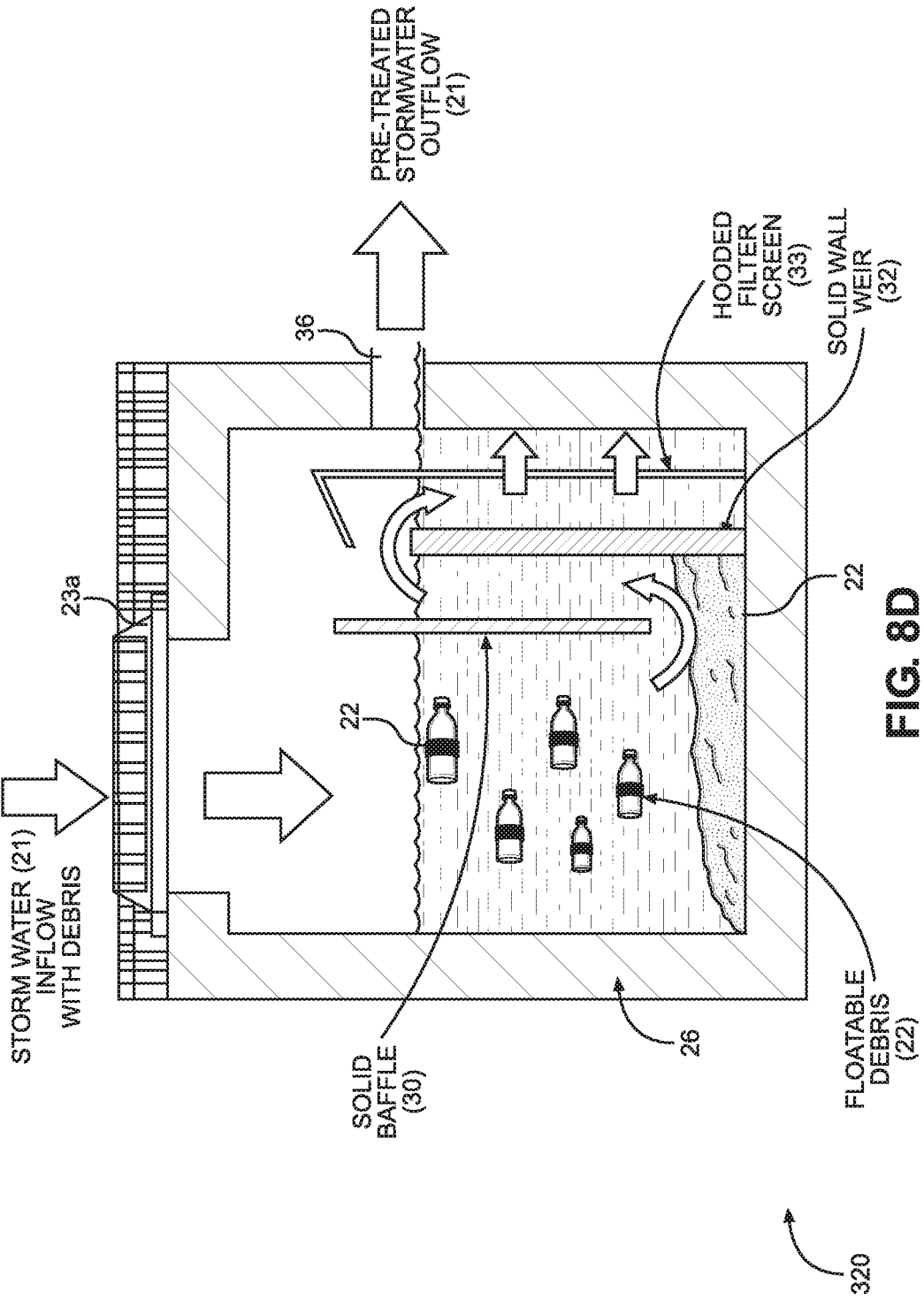
FIG. 8D is an elevated side cross-sectional view of the third illustrative embodiment of the stormwater collection and pretreatment filtering system of the present invention illustrated in FIGS. 8A, 8B and 8C, shown during a fourth phase of operation, wherein stormwater flowing through the storm grate has sufficiently filled the primary sump region, debris is building up beneath the baffle wall along the underflow passageway, and is flowing over the weir wall and into the secondary sump region, and then flowing from the secondary sump region through the filter-screen wall portion into the tertiary sump region and out the outflow port for dispersion through the earth ground.

FIG. 8D illustrates a fourth phase (pretreatment and debris accumulation) of operation of the third illustrative embodiment of the stormwater collection and pretreatment filtering system 320, wherein stormwater flowing through the storm grate 23 has sufficiently filled the primary sump region, debris is building up beneath the baffle wall along the underflow passageway, and is flowing over the weir wall and into the secondary sump region, and then flowing from the secondary sump region through the filter-screen wall portion into the tertiary sump region and out the outflow port for dispersion through the earth ground.

Figure 8E:
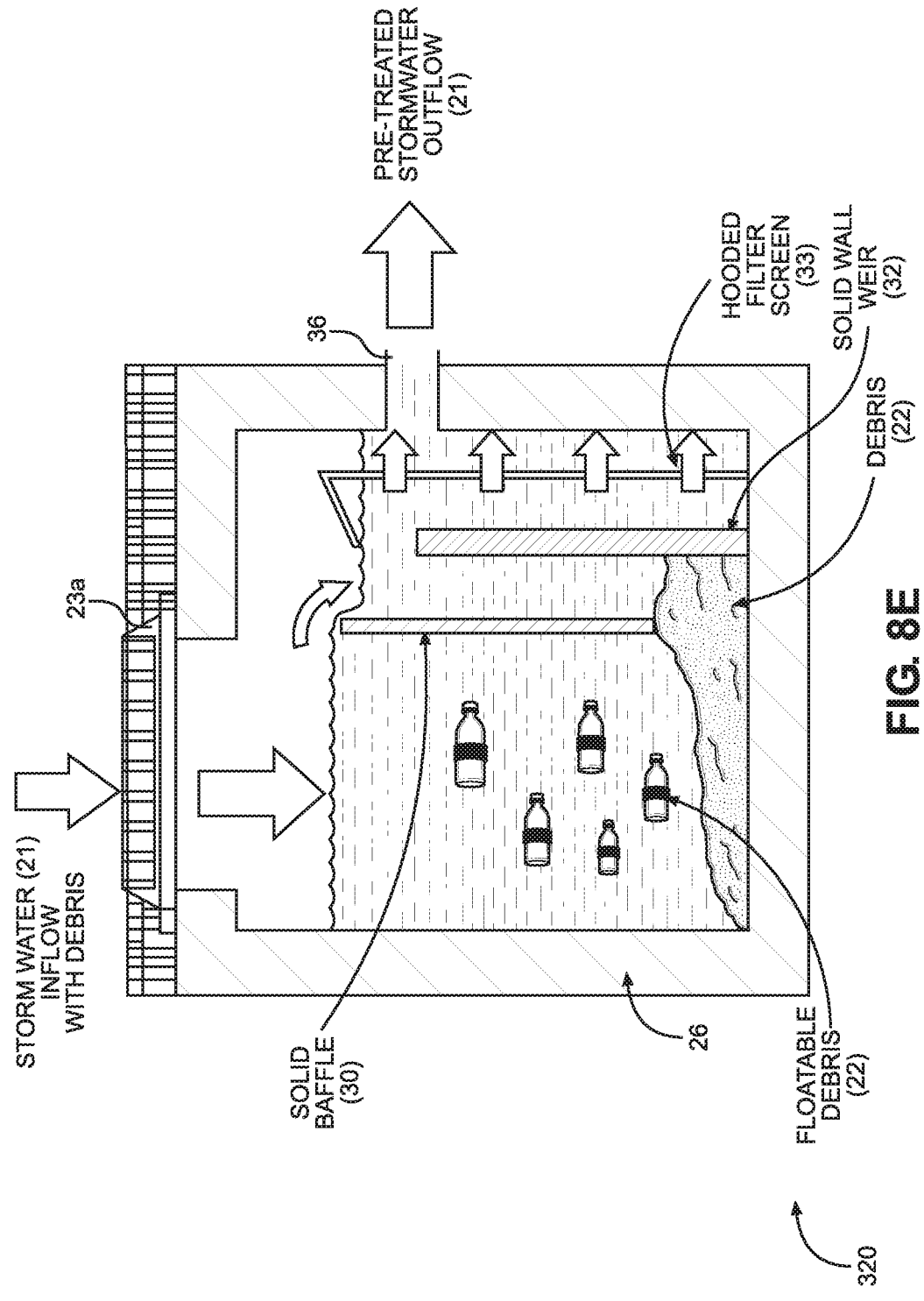
FIG. 8E is an elevated side cross-sectional view of the third illustrative embodiment of the stormwater collection and pretreatment filtering system of the present invention illustrated in FIGS. 8A, 8B and 8C, shown during a fifth phase of operation, designated as a first by-pass mode of operation, wherein stormwater flowing through the storm grate has sufficiently filled the primary sump region, debris beneath the baffle wall is completely blocking the underflow passageway, and stormwater in the primary sump region has risen to the top of the baffle wall and is flowing over the baffle wall and then flowing over the weir wall, and through the filter-screen wall portion into the tertiary sump region and out the outflow port for dispersion through the earth ground.

FIG. 8E illustrates a fifth phase (first bypass) of operation of the third illustrative embodiment of the stormwater collection and pretreatment filtering system 320, wherein in first by-pass mode, with stormwater flowing through the storm grate 23 has sufficiently filled the primary sump region 31, debris beneath the baffle wall 30 is completely blocking the underflow passageway 30B, and stormwater in the primary sump region 31 has risen to the top of the baffle wall 30 and is flowing over the baffle wall 30 and then flowing over the weir wall 32, and through the filter-screen wall portion 33 into the tertiary sump region 35 and out the outflow port 36 for dispersion through the earth ground 37.

Figure 8F:
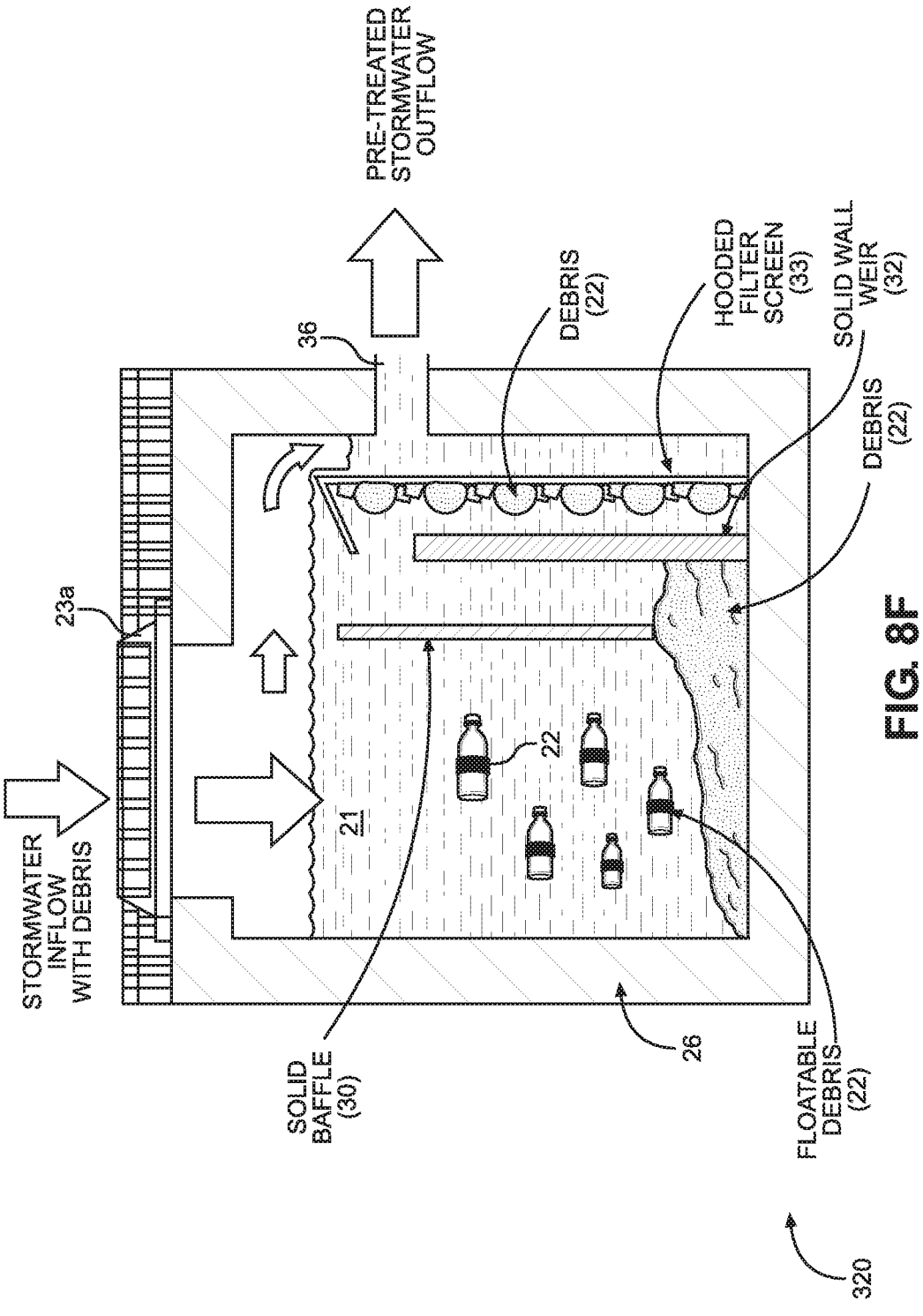
FIG. 8F is an elevated side cross-sectional view of the third illustrative embodiment of the stormwater collection and pretreatment filtering system of the present invention illustrated in FIGS. 8A, 8B and 8C, shown during a sixth phase of operation, designated as a second by-pass mode of operation, wherein stormwater flowing through the storm grate has sufficiently filled the primary sump region, debris beneath the baffle wall is completely blocking the underflow passageway, and debris buildup on the filter-screen wall portion is completely blocking stormwater flow therethrough, causing the stormwater to rise up and flow over the filter-screen wall portion and into the tertiary sump region, and then out the outflow port for dispersion through the earth ground.

FIG. 8F illustrates a sixth phase (second bypass) of operation of the third illustrative embodiment of the stormwater collection and pretreatment filtering system 320, wherein in a second by-pass mode of operation, stormwater 21 flowing through the storm grate 23 has sufficiently filled the primary sump region 31, debris 22 beneath the baffle wall 30 is completely blocking the underflow passageway 30B, and debris buildup 22 on the filter-screen wall portion 33 is completely blocking stormwater flow therethrough, causing the stormwater 21 to rise up and flow over the filter-screen wall portion 33 and into the tertiary sump region 35, and then out the outflow port 36 for dispersion through the earth ground 37.

When the system 320 becomes clogged with debris and the system is forced into either the first or second over-ride mode shown in FIGS. 8E and 8F, or during routine maintenance operations, the drain grate 23A installed over the top-surface inflow port 23 is removed to provide access to and hydraulic communication with the primary sump region 31, secondary sump region 34 and the tertiary sump region 35, for cleaning with pressurized water and vacuumed suctioned using a vacuum suction equipment (e.g. powered vacuum and pressurized water cleaning system including a long flexible hose terminated with a spray nozzle and vacuum suction nozzle). The necessary equipment is by use of conventional and commonly available equipment routinely employed in drainage infrastructure maintenance operations. This portable machinery system will be supported above ground during stormwater collection and pretreatment system maintenance operations. The width of the flexible tube used during vacuum and pressure washing operations will be sufficient in cross-sectional dimensions and length to fit through the typically circular top-surface mounted inflow port 23, and reach into the primary, secondary and tertiary sump regions. During vacuum operations, when debris and water collected within the sump regions, the vacuum pressure generated within the interior volume of the system will be sufficiently great to vacuum out and remove all debris and trash collected in the primary, secondary and tertiary sump regions of the system being maintained. During pressurized water power-washing operations, performed after an initial vacuuming operation, the interior wall surfaces of the primary, secondary and tertiary sump regions will be power-washed under hydraulic pressure, to remove debris and buildup. Thereafter, the water and debris collected in the primary, secondary and tertiary sump region will suctioned out of the system through the flexible vacuum tube passed through the top-surface inflow port of the system. The collected debris is then transported to a remote location for processing and handling in a responsible manner.

Specification of the In-Ground Stormwater Pretreatment System of the Fourth Illustrative Embodiment of the Present Invention Provided with Ground-Surface-Level Collecting Inflow Port Covered with Drain Grate, and Underground Side Wall Inflow Port Connected to Underground Stormwater Piping FIGS. 9A, 9B, 9C and 9D describe a fourth illustrative embodiment of the stormwater collection and pretreatment filtering system of the present invention 420, wherein stormwater with debris flows through a top opening inflow port and a side inflow port into the interior volume of the system.

As shown in FIGS. 9B and 9C, the fourth illustrative embodiment of the stormwater collection and pretreatment filtering system of the present invention 420 illustrated in FIG. 9A, constructed in the form of a concrete block-like unit comprises: (i) a bottom wall portion 26A; (ii) a first end wall portion 26B extending from the bottom wall portion 26A; (iii) a pair of first and second side wall portions 26C1 and 26C2 ending from the bottom wall portion and disposed parallel to each other; and (iv) a top wall portion 26D connected to the first end wall portion 26B, the first and second side wall portions 26C1 and 26C2; (v) a primary sump region 31 with a 3D stormwater storage volume 29 formed between the first end portion 26B, the bottom wall portion 26A, and the first and second side wall portions 26C1 and 26C2; (vi) at least one top inflow port 23 formed in the top wall portion 26D of the system and allowing stormwater 21 with debris 22 to flow through a grate structure 23A and into the 3D stormwater storage volume 29; (vii) at least one side inflow port 23 formed in the side wall portion 26B or side wall portions 26C1 or 26C3, and allowing stormwater 21 with debris 22 to flow into the 3D stormwater storage volume; (ii) a baffle wall portion 30 suspended substantially perpendicularly to the bottom wall surface 26A and between the first and second side wall portions 26C1 and 26C2, towards the second end of the primary sump region 31; (iii) a weir wall portion 32 mounted on the bottom wall surface 26A of the system and parallel to the baffle wall 32 along the boundary of the primary sump region 31; (iv) a filter-screen wall 33 provided with a filter screen 33A supported perpendicularly from the bottom wall surface 26A and beyond the weir wall portion 32 and forming (v) a secondary sump region 34 between the weir wall 32 and the filter-screen wall 33; and (vi) a tertiary sump region 35 provided beyond the filter-screen wall portion 33 and supporting at least one outflow port 23 allowing pretreated stormwater to flow through the tertiary sump region 35 into the earth ground 37 into which the system 420 has been installed. The baffle wall portion 30 and weir wall portion 32 are each realized as a solid, non-perforated panel substantially impervious to water flow.

The top-surface collecting type of stormwater collection and pretreatment filtering system of the present invention illustrated in the first, second, third and fourth illustrative embodiments described above, is fully scalable in size to collect, handle and pretreat both small and large capacities of stormwater, in accordance with the principles of the present invention. This design class of system is parameterized in FIG. 9D, with various design parameters defined on the concrete block-like system of the fourth illustrative embodiment 420 for purposes of illustrations. Alternatively, the other systems of the first, second and third embodiments 120, 220 and 320 could have been used for such purposes. As shown in FIG. 9D, the system 420 comprises: (i) the bottom wall portion 26A ($a_2$); (ii) the first end wall portion 26B extending from the bottom wall portion ($a_1$); (iii) the pair of first and second side wall portions 26C1, 26C2 ending from the bottom wall portion and disposed parallel to each other; and (iv) the top wall portion 26D connected to the first end wall portion the first and second side wall portions ($a_3$); (v) the primary sump region 31 with the 3D stormwater storage volume formed between the first end portion, the bottom wall portion, and the first and second side wall portions; (vi) at least one top inflow port 23 formed in the top wall portion of the system and allowing stormwater with debris to flow through a grate structure and into the 3D stormwater storage volume, $a_{3c}>=b_5+$rear wall thickness commonly 6"; (vii) optionally at least one side inflow port 23' formed in the side wall portion of the system and allowing stormwater with debris to flow through a grate structure and into the 3D stormwater storage volume; (viii) the baffle wall 30 suspended substantially level and perpendicularly to the bottom wall surface and between the first and second side wall portions, at second end of the primary sump region 31, $b_1+b_7>=b_2+$at least 2 inches, $b_7$ and $b_6>=8$ inches; (ix) the weir wall 32 mounted on the bottom wall surface of the system and parallel to the baffle wall along the boundary of the primary sump region, $b_2<b_4$ and $b_4$ approximately=$b_2+$at least 2 inches; (x) the filter-screen wall 33 provided with a filter screen supported perpendicularly from the bottom wall surface and beyond the weir wall 32 and forming (xi) the secondary sump region 34 between the weir wall and the filter-screen wall, $b_4>d_2$; and (xii) the tertiary sump region 35 provided beyond the filter-screen wall and supporting at least one outflow port 36 allowing pretreated stormwater 21 to flow through the tertiary sump region 35 into the earth ground into which the system.

As a design example for the top-surface groundwater collection system design, where the capacity of the system requires that the size of parameters a1=48" and a2=60"; then, for this size system design, parameter will be: parameter $b_5>=8$ inches, and parameters $c_1=8$ inches, $c_2=6$ inches, and $c_3=4$ inches, while the above-described parameter relationships are maintained for this system design.

Preferably, the stormwater collection and pretreatment system 420 is formed as a precast-concrete block structure using conventional concrete molding technologies. Examples of concrete block molding systems and methods are disclosed in U.S. Pat. Nos. 8,888,481 and 9,644,334 incorporated herein by reference in their entirety. However, other construction methods may be used, such as reinforced plastic, or fiberglass molding techniques.

When installing one or more stormwater collection and pretreatment filtration systems 420 beneath or along the surface of the earth ground, as illustrated in FIG. 11A, standard underground piping (i.e. tubes and couplings) will be used as well known in the underground piping arts as required and approved by the construction codes applicable in the jurisdiction where the system is being installed. As required, piping may be coupled to the stormwater inflow ports that may be formed in the front end wall 26B (or side walls 26C1, 26C2) of the system unit 420 to allow stormwater with debris to flow into the system for collection and pretreatment processing in accordance with the principles of the present invention. Piping may also be coupled to the stormwater outflow ports 36 that may be formed in the rear end wall 26E of the system unit 20 to allow stormwater with debris to flow into the system for collection and pretreatment processing in accordance with the principles of the present invention.

To appreciate how the stormwater collection and pretreatment system 420 operates, reference is made to the six-phase system operation flow shown in FIGS. 10A through 10F, wherein at each phase, a particular state of stormwater is defined along with its behavior within the system in particular states of operation. These phases of operation will be described in detail below.

FIG. 10A illustrates the first phase (empty) of the fourth illustrative embodiment of the stormwater collection and pretreatment filtering system 420, where no stormwater is flowing through the top surface storm grate into the primary sump region with the 3D stormwater storage volume of the system.

FIG. 10B illustrates the second phase (filling) of the fourth illustrative embodiment of the stormwater collection and pretreatment filtering system 420, where stormwater 21 is starting to flow through the top surface storm grate 23 and into the primary sump region 31 of the system, but not sufficiently filling the primary sump region 31 to flow over the weir wall 32, as shown.

FIG. 10C illustrates the third phase (primary pretreatment) of the fourth illustrative embodiment of the stormwater collection and pretreatment filtering system 420, wherein stormwater 21 flowing through the storm grate 23 has sufficiently filled the primary sump region 31 and is flowing over the weir wall 30, and into the secondary sump region 34, and then flowing through the filter-screen wall portion 33 from the secondary sump region 34 into the tertiary sump region 35 and out the outflow port 36 for dispersion through the earth ground 37.

FIG. 10D illustrates the fourth phase (pretreatment and debris accumulation) of the fourth illustrative embodiment of the stormwater collection and pretreatment filtering system 420, wherein stormwater 21 flowing through the storm grate 23A has sufficiently filled the primary sump region 31, debris 22 is building up beneath the baffle wall 30 along the underflow passageway 30B, and is flowing over the weir wall 32 and into the secondary sump region 34, and then flowing from the secondary sump region 34 through the filter-screen wall portion 33 into the tertiary sump region 35 and out the outflow port 36 for dispersion through the earth ground 37.

FIG. 10E illustrates the fifth phase (first bypass) of the fourth illustrative embodiment of the stormwater collection and pretreatment filtering system 420, wherein in the first by-pass mode of operation, stormwater 21 flowing through the storm grate 23 has sufficiently filled the primary sump region 31, debris 22 beneath the baffle wall 30 is completely blocking the underflow passageway 30B, and stormwater 21 in the primary sump region 31 has risen to the top of the baffle wall 30 and is flowing over the baffle wall 30 and then flowing over the weir wall 32, and through the filter-screen wall portion 33 into the tertiary sump region 35 and out the outflow port 36 for dispersion through the earth ground 37.

FIG. 10F illustrates the sixth phase (second bypass) of the fourth illustrative embodiment of the stormwater collection and pretreatment filtering system 420, wherein during the second by-pass mode of operation, stormwater 21 flowing through the storm grate 23 has sufficiently filled the primary sump region 31, debris 22 beneath the baffle wall 30 is completely blocking the underflow passageway 30B, and debris 22 buildup on the filter-screen wall portion 33 is completely blocking stormwater flow therethrough, causing the stormwater 21 to rise up and flow over the filter-screen wall portion 33 and into the tertiary sump region 35, and then out the outflow port 36 for dispersion through the earth ground 37.

When the system 420 becomes clogged with debris and the system is forced into either the first or second over-ride mode shown in FIGS. 10E and 10F, or during routine maintenance operations, the drain grate 23A installed over the top-surface inflow port 23 is removed to provide access to and hydraulic communication with the primary sump region 31, secondary sump region 34 and the tertiary sump region 35, for cleaning with pressurized water and vacuumed suctioned using a vacuum suction equipment (e.g. powered vacuum and pressurized water cleaning system including a long flexible hose terminated with a spray nozzle and vacuum suction nozzle). The necessary equipment is by use of conventional and commonly available equipment routinely employed in drainage infrastructure maintenance operations. This portable machinery system will be supported above ground during stormwater collection and pretreatment system maintenance operations. The width of the flexible tube used during vacuum and pressure washing operations will be sufficient in cross-sectional dimensions and length to fit through the typically circular top-surface mounted inflow port 23, and reach into the primary, secondary and tertiary sump regions. During vacuum operations, when debris and water collected within the sump regions, the vacuum pressure generated within the interior volume of the system will be sufficiently great to vacuum out and remove all debris and trash collected in the primary, secondary and tertiary sump regions of the system being maintained. During pressurized water power-washing operations, performed after an initial vacuuming operation, the interior wall surfaces of the primary, secondary and tertiary sump regions will be power-washed under hydraulic pressure, to remove debris and buildup. Thereafter, the water and debris collected in the primary, secondary and tertiary sump region will suctioned out of the system through the flexible vacuum tube passed through the top-surface inflow port of the system. The collected debris is then transported to a remote location for processing and handling in a responsible manner.

Specification of the In-Ground Stormwater Pretreatment System of the Fifth Illustrative Embodiment of the Present Invention Provided with Curb-Side Collecting Inflow Port Covered with Drain Grate FIGS. 11A, 11B, 11C and 11D describe the fifth illustrative embodiment of the precast-concrete curb-side stormwater collecting and pretreatment filtering system of the present invention 520. As shown, the precast concrete block system 520 is shown being lifting into position during installation within the earth ground on a construction site. As shown, a set of chains or cables can be used to support and suspend the precast-concrete block system 520 and transport into location within a pre-excavated region of earth on the construction site. FIG. 11A provides some insight into the detail of the pavement tip-down or gradient during construction, and the required width, depth, and other dimensions for installation of the system 520 in this stormwater collection system application, typically adjacent a parking lot, driveway, street or wherever stormwater collection and pretreatment filtration is required.

As shown in FIG. 11B, the precast-concrete stormwater collection and pretreatment filtering system 520 employs a filter-screen wall portion 30 that is visible through the outflow port of the system, directing pretreated stormwater into the tertiary sump region, and dispersed over the earth ground. In FIG. 11C, the precast-concrete stormwater collection and pretreatment filtering system has its top panel removed for purposes of illustrating the installation of the solid baffle wall portion 30 the weir wall portion 32, and the filter-screen wall portion 33. As in each of the first through fourth illustrative embodiments described above, the baffle wall and weir wall structures are realized as solid panels mounted in grooves formed in the interior surface of the side wall portions 26C1 and 26C2 of the precast-concrete block system 520 of the present invention.

As shown in FIG. 11C, the filter-screen wall portion 33A' comprises (i) a solid perforated plastic panel 33A' supported in grooves in the side wall surfaces 26C1 and 26C2, and (ii) a sheet of plastic-coated wire screening material 33B' of sufficient stiffness and bolted to the perforated plastic panel 33A' and extending between the matched grooves 26F formed in the side wall portions (i.e. panels) of the system, realizing the outflow port 36 of the system, for directing pretreated stormwater 21 into the tertiary sump region 35, and dispersion over the earth ground 37. As shown, the outlet side of the system, formed in the rear end portion 26E is provided with the hooded screen 33B made of stainless steel for capturing fine debris and trash, and an HDPE screen allowing the system to drain into the filter media with dimensions, hole sizes, and backfill requirements. Bolts and nut fasteners can be used to mount the screen structure 33B' to the top of the perforated panel 33A', as shown.

As shown in FIGS. 11B, 11C and 11D, the fifth illustrative embodiment of the stormwater collection and pretreatment filtering system of the present invention illustrated in FIGS. 11A, 11B and 11C, constructed in the form of a concrete block-like unit comprising: (i) a bottom wall portion 26A; (ii) a first end wall portion 26B extending from the bottom wall portion 26A; (iii) a pair of first and second side wall portions 26C1 and 26C2 extending from the bottom wall portion 26A and disposed parallel to each other; and (iv) a top wall portion 26D connected to the first end wall portion 26B, the first and second side wall portions 26C1 and 26C2, and having a vacuum access port 23B with a removable cover 23B' of circular geometry; (v) a primary sump region 31 with a 3D stormwater storage volume 29 formed between the first end portion 26B, the bottom wall portion 26A, and the first and second side wall portions 26C1 and 26C2; (vi) a curbside inflow port 23' formed in the upper portion of the first end wall portion 26B of the system and covered with a grate or screen structure (e.g. screen or cast-metal grating) 23A' and allowing stormwater 21 with debris 22 to flow through the inflow port 23' and into the 3D stormwater storage volume 29; (vii) a baffle wall portion 30 suspended substantially perpendicularly to the bottom wall surface 26A and between the first and second side wall portions 26C1 and 26C2, toward the second end of the primary sump region 31; (viii) a weir wall portion 32 mounted on the bottom wall surface 26A of the system and parallel to the baffle wall 30 along the boundary of the primary sump region 31; (iv) a filter-screen wall portion provided with a hooded stainless-steel filter screen 33C' and HDPE perforated panel 33A' supported perpendicularly between the side wall portions 26C1 and 26C2, above the bottom wall surface 26A and beyond the weir wall portion 32, and forming (x) a secondary sump region 34 between the weir wall portion 32 and the filter-screen wall portion 33'; and (xi) a tertiary sump region 35 provided beyond the filter-screen wall portion 33' and supporting at least one outflow port 36 allowing pretreated stormwater 21 to flow through the filter-screen wall portion 33' into the tertiary sump region 35 for dispersion into the earth ground 37 (e.g. biofiltration field adjacent the system). The baffle wall portion 30 and weir wall portion 32 are each realized as a solid, non-perforated panel substantially impervious to water flow.

The curbside collecting type of stormwater collection and pretreatment filtering system of the present invention illustrated in the fifth illustrative embodiment 520 described above, is fully scalable in size to collect, handle and pretreat both small and large capacities of stormwater, in accordance with the principles of the present invention. This design class of system is parameterized in FIG. 11D, with various design parameters defined on the concrete block-like system of the fifth illustrative embodiment 520 for purposes of illustrations. As shown in FIG. 11D, the system 520 comprises: (i) a bottom wall portion 26A ($a_2$); (ii) a first end wall portion 26A extending from the bottom wall portion ($a_1$); (iii) a pair of first and second side wall portions 26C1, 26C2 ending from the bottom wall portion and disposed parallel to each other; and (iv) a top wall portion 26D connected to the first end wall portion the first and second side wall portions and provided with an access port or opening 23B covered by a removable cover 23B' to provide access into the interior of the unit during vacuum and power-washing operations ($a_3$), $a_7 \times 2 = a_3$; (v) a primary sump region 31 with a 3D stormwater storage volume formed between the first end portion, the bottom wall portion, and the first and second side wall portions; (vi) a curbside inflow port 23' formed in the upper portion of the end wall portion 26B of the system with the inlet elevation ($a_6$) approximately 1-2" below the edge of pavement causing stormwater with debris to flow through the curb inlet inflow port and into the 3D stormwater storage volume, and the topvert (a5) commonly level with the top of the curb; (vii) a baffle wall portion 30 suspended substantially perpendicularly to the bottom wall surface 26A and between the first and second side wall portions 26C1, 26C2, at second end of the primary sump region 31, $b_1+b_7>b_2+$at least 2 inches; (viii) a weir wall portion 32 mounted on the bottom wall surface 26A of the system and parallel to the baffle wall 30 along the boundary of the primary sump region 31, $b_2+4$ inches $<=b_4$; (iv) a filter-screen wall portion 33 provided with a hooded stainless-steel filter screen 33B' and HDPE perforated panel 33A' supported perpendicularly between the side wall portions, above the bottom wall surface 26A and beyond the weir wall portion 32, and forming (x) a secondary sump region 34 between the weir wall portion 32 and the filter-screen wall portion; and (xi) a tertiary sump region provided beyond the filter-screen wall portion and supporting at least one outflow port 36 allowing pretreated stormwater to flow through the filter-screen wall portion 33 into the tertiary sump region 35 for dispersion into the earth ground or biofiltration field adjacent the system.

As a design example for the curbside stormwater collection system, where the capacity of the system requires that the size of parameters $a_1+a_6=38"$ and $a_2=60"$, then, for this size system design, the following parameters would be: $b_5=a_6-1$ inch (pavement thickness), $b_5>=4$ inches, $b_7>=8$ inches, $b_6>=6$ inches; and $c_1=28$ inches, $c_2=8$ inches, $c_3=12$ inches, and $d_5$ (as measured from $a_6$ invert) is approximately=9 inches; while the above-described parameter relationships are maintained.

Preferably, the stormwater collection and pretreatment system 520 is formed as a precast-concrete block structure using conventional concrete molding technologies. Examples of concrete block molding systems and methods are disclosed in U.S. Pat. Nos. 8,888,481 and 9,644,334 incorporated herein by reference in their entirety. However, other construction methods may be used, such as reinforced plastic, or fiberglass molding techniques.

When installing one or more stormwater collection and pretreatment filtration systems of the present invention 520 beneath or along the surface of the earth ground, as illustrated in FIG. 11A, standard underground piping (i.e. tubes and fittings) will be used as well known in the underground piping arts as required and approved by the construction codes applicable in the jurisdiction where the system is being installed. As required, piping may be coupled to the stormwater inflow ports that may be formed in the front end wall 26B (or side walls 26C1, 26C2) of the system unit 520 to allow stormwater with debris to flow into the system for collection and pretreatment processing in accordance with the principles of the present invention. Piping may also be coupled to the stormwater outflow ports 36 that may be formed in the rear end wall 26E of the system unit 20 to allow stormwater with debris to flow into the system for collection and pretreatment processing in accordance with the principles of the present invention.

To appreciate how the stormwater collection and pretreatment system 520 operates, reference is made to the six-phase system operation flow shown in FIGS. 12A through 12F, wherein at each phase, a particular state of stormwater is defined along with its behavior within the system in particular states of operation. These phases of operation will be described in detail below.

FIG. 12A illustrates the first phase (empty) of the fifth illustrative embodiment of the curbside stormwater collection and pretreatment filtering system 520, where no stormwater 21 is flowing through the curbside storm grate 23A' into the primary sump region 31 within the 3D stormwater storage volume 29 of the system.

FIG. 12B illustrates the second phase (filling) of the fifth illustrative embodiment of the curbside stormwater collection and pretreatment filtering system 520, where stormwater 21 with debris 22 is starting to flow through the curbside storm grate 23A' and into the primary sump region 31 of the system, but not sufficiently filling the primary sump region 31 to flow over the weir wall 32, as shown.

FIG. 12C illustrates the third phase (primary pretreatment) of the fifth illustrative embodiment of the curbside stormwater collection and pretreatment filtering system 520, wherein stormwater 21 flowing through curbside storm grate 23A has sufficiently filled the primary sump region 31 and is flowing over the weir wall 32, and into the secondary sump region 34, and then flowing through the filter-screen wall portion 33 from the secondary sump region 34 into the tertiary sump region 35 and through the outflow port 36 for dispersion through the earth ground 37 (i.e. bio-filtration field).

FIG. 12D illustrates the fourth phase (pretreatment and debris accumulation) of the fifth illustrative embodiment of the curbside stormwater collection and pretreatment filtering system 520, wherein stormwater 21 flowing through the curbside storm grate 23A' has sufficiently filled the primary sump region 31, debris 22 is building up beneath the baffle wall 30 along the underflow passageway 30A, and is flowing over the weir wall 32 and into the secondary sump region 34, and then flowing from the secondary sump region 34 through the filter-screen wall portion 33 into the tertiary sump 35 region and through the outflow port 36 for dispersion through the earth ground 37 (i.e. bio-filtration field).

FIG. 12E illustrates the fifth phase (first bypass) of the fifth illustrative embodiment of the curbside stormwater collection and pretreatment filtering system 520, wherein during a first by-pass mode of operation, stormwater 21 flowing through the curbside storm grate 23A' has sufficiently filled the primary sump region 31, debris 22 beneath the baffle wall 30 is completely blocking the underflow passageway 30A, and stormwater 21 in the primary sump region 31 has risen to the top of the baffle wall 30 and is flowing over the baffle wall 30 and then flowing over the weir wall 32, and through the filter-screen wall portion 33 into the tertiary sump region 35 and through the outflow port 36 for dispersion through the earth ground 37 (i.e. bio-filtration field), FIG. 12F illustrates the sixth phase (second bypass) of the fifth illustrative embodiment of the curbside stormwater collection and pretreatment filtering system 520, wherein during a second by-pass mode of operation, stormwater 21 is flowing through the curbside storm grate 23A' has sufficiently filled the primary sump region 31, debris 22 beneath the baffle wall 30 is completely blocking the underflow passageway 30A, and debris 22 buildup on the filter-screen wall portion 33 is completely blocking stormwater flow therethrough, causing the stormwater 21 to rise up and flow over the hooded filter-screen wall portion 33 and into the tertiary sump region 35, and then through the outflow port 36 for dispersion through the earth ground 37 (i.e. bio-filtration field).

When the system 520 becomes clogged with debris and the system is forced into either the first or second over-ride mode shown in FIGS. 4E and 4F, or during routine maintenance operations, the access cover 23B' installed over the top-surface access port 23B is removed to provide access to and hydraulic communication with the primary sump region 31, secondary sump region 34 and the tertiary sump region 35, for cleaning with pressurized water and vacuumed suctioned using a vacuum suction equipment (e.g. powered vacuum and pressurized water cleaning system including a long flexible hose terminated with a spray nozzle and vacuum suction nozzle). The necessary equipment is by use of conventional and commonly available equipment routinely employed in drainage infrastructure maintenance operations. This portable machinery system will be supported above ground during stormwater collection and pretreatment system maintenance operations. The width of the flexible tube used during vacuum and pressure washing operations will be sufficient in cross-sectional dimensions and length to fit through the typically circular top-surface mounted access port 23B formed in panel 26D, and reach into the primary, secondary and tertiary sump regions 31, 34 and 35. During vacuum operations, when debris and water collected within the sump regions, the vacuum pressure generated within the interior volume of the system will be sufficiently great to vacuum out and remove all debris and trash collected in the primary, secondary and tertiary sump regions of the system being maintained. During pressurized water power-washing operations, performed after an initial vacuuming operation, the interior wall surfaces of the primary, secondary and tertiary sump regions will be power-washed under hydraulic pressure, to remove debris and buildup. Thereafter, the water and debris collected in the primary, secondary and tertiary sump region will suctioned out of the system through the flexible vacuum tube passed through the top-surface inflow port of the system. The collected debris is then transported to a remote location for processing and handling in a responsible manner.

Specification of System Design and Drainage Methodology

The top-surface and curbside stormwater collection and pretreatment filtration system of the present invention described in great detail above can be used in the design of almost any kind of storm water collection and management system designed to meet the collection and treatment needs of any application.

While various design methods based on standard applied hydrology science and engineering can be used, a preferred method outlined in FIG. 13 will be described below using (i) the Sizing Curves (i.e. characteristics) shown in FIGS. 14A through 14E for both the top-side (i.e. drop-type) stormwater collection system designs shown in FIGS. 3A through 10F, and the curbside stormwater collection system design shown in FIGS. 11A through 12F, and (ii) the Performance Curves shown in FIGS. 15A through 19E. These Sizing Curves where developed as follows: The storm water runoff analysis was conducted for system for a range of drainage area sizes and design storms to cover anticipated applications. This was accomplished using the Natural Resources Conversation Service (NRCS) TR-20 runoff procedure from which the Technical Release (TR)-55 method was developed, using the hydrologic and hydraulic design software HydroCAD (v 9.1). As described in the TR-55 manual it is a " . . . procedure to calculate storm runoff, peak rate of discharge, hydrographs and storage volumes required for floodwater reservoirs. The model begins with a rainfall amount uniformly imposed on the watershed over a specified time distribution. Mass rainfall is converted to mass runoff by using a runoff curve number (CN). CN is based on soils, plant cover, amount of impervious area, interception, and surface storage. Runoff is then transformed into a hydrograph (a graph showing the properties of runoff flow with respect to time) by using the unit hydrograph theory (a given one-day rainfall produces a unit depth of runoff over the given drainage area) and routing procedures that depend on runoff travel time through segments of the watershed (subcatchments). System hydrology (runoff flow and volume) and hydraulics (flow velocities, bypass, water depth) were modeled for impervious drainage areas ranging from 5,000 SF to 2 acres in size for the 2-year, 10-year, 25-year, and 50-year 24-hour design storm events. The Performance Curves where developed examining the system hydraulics to determine the respective degree of treatment and bypass as a function of both drainage area size and system capacity for capture and storage of debris. System hydraulics are examined to identify both: 1) the storm size as a function of sump fullness for which bypass will occur, and 2) treatment flow velocity to minimize scour velocities for sediment resuspension.

FIG. 13 describes the primary steps of the design methodology of the present invention employing any one of the stormwater pre-treatment systems of the present invention. As shown, the method comprises: (a) determining the drainage area and design storm requirements based on your project needs and local jurisdictional (b) calculating the maximum treatment flow rate (MTFR) for the given conditions of drainage area and design storm (c) using design curves shown in FIGS. 14A-14E to identify the MTFR for the system for the desired drainage area and design storm at 0% full; (d) verifying the MTFR at 50% full can pass the required design storm, and if not, then proceeding to the next smaller drainage area; and (e) using the performance curves shown in FIGS. 15A-19E to verify the sum of treated flow and bypass flow can pass the 25-year design storm at 0% and 50% full, and if not, the proceeding to the next smaller drainage area.

Each of these design steps will now be described in greater technical detail below.

Step 1. Determine the drainage area and design storm requirements based on your project needs and local jurisdiction. This involves understanding design and regulatory requirements combined with drainage infrastructure design.

Step 2. Calculate the maximum treatment flow rate (MTFR) for the given conditions of drainage area and design storm. Using the jurisdictionally approved sizing methodology determine the peak flow rate for the water quality design storm. For new developments this is commonly the peak flow associated with a 1" rainfall event, for redevelopment or retrofits smaller storms may be allowed. For example, using the rational method for 1 acre of pavement, the 10-MIN Peak intensity associated with 1-inch 24-HR MRCS type III design storm=0.84 in/hr and a resultant peak flow of 357 GPM.

Step 3. Using Design Curves (FIGS. 14A through 14E), identify the MTFR for the system for the desired drainage area and design storm at 0% full. Compare the MTFR from Step #2 with that from Step #3 and use the larger of the two (2). For example, select FIG. 14D for a 1-acre drainage area and find 1" WQV flow rate=380 GPM greater than calculated in Step #2. Step 4. Verify the MTFR at 50% full can pass the required design storm. If not, go to the next smaller drainage area. For example, at 50% full the MTFR is not affected and will suffice.

Step 5. Using the Performance Curves (FIGS. 15A through 19E), verify the sum of treated flow and bypass flow can pass the 25-year design storm at 0% and 50% full. If not, go to the next smaller drainage area. In this instance, the 25-YR design storm peak flow for a time of concentration of 10 minutes=2,043 GPM. From FIG. 15D (0% Full at 1-acre) you see that sum of the treated flow (1600 GPM) and bypass fl. w (565 GPM)=2160 GPM and FIG. 17D (50% Full for 1 Acre) you see that sum of the treated flow (1150 GPM) and bypass flow (1010 GPM)=2160 GPM. In both instances empty and at 50% capacity the system of the present invention can adequately pass the 25-YR storm.

Modifications to the Present Invention which Readily Come to Mind

The stormwater management inlet prefilter systems 120, 220, 320, 420 and 520 described above can be used in green infrastructure which typically includes either biofiltration (e.g. bioretention, tree planters, gravel wetlands) or infiltration (e.g. leech fields, dry wells, infiltration trenches and basins) that both provide recharge of stormwater runoff to groundwater aquifers and treated discharge to surface waters. The systems can be used as an edge of curb system, a drop inlet, or inline. The systems can be used both in retrofit or new installations and extends the operating life and reduces the maintenance burden of stormwater management systems by filtering out trash and debris at the inlet. The systems enable the simplified maintenance of stormwater management systems at the inlet in an accessible location with no special equipment required. Installation is simple and comparable to common catch basins and grates. Preferably, the systems are made of pre-cast concrete, HDPE, and stainless steel and are resistant to rust and rot from corrosive winter runoff. No special equipment necessary and maintenance is simple and utilizes standard vacuum trucks for catch basin cleaning by use of a pressure washer and vacuum equipment.

While concrete material is preferred for constructing the precast block units of the present invention, it is understood that other materials such as reinforced fiberglass, ceramic, plastic and/or metal materials can be used to construct and practice the systems of the present invention. These and other variations and modifications will come to mind in view of the present invention disclosure.

While several modifications to the illustrative embodiments have been described above, it is understood that various other modifications to the illustrative embodiment of the present invention will readily occur to persons with ordinary skill in the art. All such modifications and variations are deemed to be within the scope and spirit of the present invention as defined by the accompanying Claims to Invention.

What is claimed is:

1. A stormwater collection and pretreatment filtering system constructed in the form of a concrete block-like unit comprising:
   a bottom wall portion;
   a first end wall portion extending from the bottom wall portion;
   a pair of first and second side wall portions extending from the bottom wall portion and disposed parallel to each other;
   a top wall portion connected to the first end wall portion, and the first and second side wall portions;
   a primary sump region having a first end and a second end, and providing a 3D stormwater storage volume formed between the first end wall portion, the bottom wall portion, and the first and second side wall portions;
   at least one top-surface inflow port formed in the top wall portion of said stormwater collection and pretreatment filtering system and allowing stormwater with debris to flow through a storm grate structure mounted over said at least one top-surface inflow port and into the 3D stormwater storage volume;
   a baffle wall portion suspended substantially perpendicularly to the bottom wall surface and set at a level between the first and second side wall portions, and located at the second end of the primary sump region and providing an underflow passageway;
   a weir wall portion mounted at a level on said bottom wall surface and parallel to the baffle wall portion along the boundary of said primary sump region;
   a filter-screen wall portion provided with a filter screen supported perpendicularly from the bottom wall surface and beyond the weir wall portion and forming a secondary sump region between the weir wall portion and the filter-screen wall portion; and
   a tertiary sump region provided beyond the filter-screen wall portion and supporting at least one outflow port allowing pretreated stormwater to flow through the tertiary sump region into the earth ground into which said stormwater collection and pretreatment filtering system has been installed.

2. The stormwater collection and pretreatment filtering system of claim 1, which further comprises at least one side inflow port formed in said front end wall portion of said stormwater collection and pretreatment filtering system and allowing stormwater with debris to flow into said 3D stormwater storage volume.

3. A process of stormwater pretreatment in the stormwater collection and pretreatment filtering system of claim 2, comprising multiple phases of operation during a rain storm, including:
   (a) during a first phase of operation, where no stormwater is flowing through the storm grate structure or front end wall portion into the primary sump region of the 3D stormwater storage volume of said stormwater collection and pretreatment filtering system;
   (b) during a second phase of operation, where stormwater is starting to flow through the top surface storm grate or front end wall portion and into the primary sump region of said stormwater collection and pretreatment filtering system, but not sufficiently filling the primary sump region for collected stormwater to flow over the weir wall portion;
   (c) during a third phase of operation, wherein stormwater flowing through the storm grate structure over the top-surface inflow port has sufficiently filled the primary sump region and is flowing over the weir wall portion, and into the secondary sump region, and then flowing through the filter-screen wall portion from the secondary sump region into the tertiary sump region and out the at least one outflow port for dispersion through the earth ground;
   (d) during a fourth phase of operation, wherein stormwater flowing through the storm grate structure mounted over the top-surface inflow port has sufficiently filled the primary sump region, debris is building up beneath the baffle wall portion along the underflow passageway, and is flowing over the weir wall portion and into the secondary sump region, and then flowing from the secondary sump region through the filter-screen wall portion into the tertiary sump region and out the at least one outflow port for dispersion through the earth ground;
   (e) during a fifth phase of operation, wherein during a first by-pass mode of operation, stormwater flowing through the storm grate structure over the top-surface inflow port has sufficiently filled the primary sump region, debris beneath the baffle wall portion is completely blocking the underflow passageway, and stormwater in the primary sump region has risen to the top of the baffle wall portion and is flowing over the baffle wall portion and then flowing over the weir wall portion, and through the filter-screen wall portion into the tertiary sump region and out the at least one outflow port for dispersion through the earth ground; and
   (f) during a sixth phase of operation, wherein during a second by-pass mode of operation, stormwater flowing through the storm grate structure mounted over the top-surface inflow port has sufficiently filled the primary sump region, debris beneath the baffle wall portion is completely blocking the underflow passageway, and debris buildup on the filter-screen wall portion is completely blocking stormwater flow therethrough, causing the stormwater to rise up and flow over the filter-screen wall portion and into the tertiary sump region, and then out the at least one outflow port for dispersion through the earth ground.

4. A curbside stormwater collection and pretreatment filtering system constructed in the form of a concrete block-like unit comprising:
   a bottom wall portion;
   a first end wall portion extending from the bottom wall portion;
   a pair of first and second side wall portions extending from the bottom wall portion and disposed parallel to each other;
   a top wall portion connected to the first end wall portion, and the first and second side wall portions;
   a primary sump region having a first end and a second end, and providing a 3D stormwater storage volume formed between the first end wall portion, the bottom wall portion, and the first and second side wall portions;
   a curbside inflow port formed in the upper portion of the first end wall portion of the system and allowing stormwater with debris to flow into the 3D stormwater storage volume;

a baffle wall portion suspended substantially perpendicularly to the bottom wall surface and between the first and second side wall portions, and located at the second end of the primary sump region and providing an underflow passageway;

a weir wall portion mounted on the bottom wall surface of said curbside stormwater collection and pretreatment filtering system and parallel to the baffle wall portion along the boundary of said primary sump region;

a filter-screen wall portion provided with a filter screen supported perpendicularly from the bottom wall surface and beyond the weir wall portion and forming a secondary sump region between the weir wall portion and the filter-screen wall portion; and a tertiary sump region provided beyond the filter-screen wall portion and supporting at least one outflow port allowing pretreated stormwater to flow through the tertiary sump region into the earth ground into which said curbside stormwater collection and pretreatment filtering system has been installed.

5. The curbside stormwater collection and pretreatment filtering system of claim 4, which further comprises at least one side inflow port formed in the first end wall portion of said curbside stormwater collection and pretreatment filtering system and allowing stormwater with debris to flow into said 3D stormwater storage volume.

6. A process of stormwater pretreatment in the curbside stormwater collection and pretreatment filtering system of claim 4, comprising:
   (a) during a first phase of operation, where no stormwater during a rain storm is flowing through a curbside storm grate structure mounted over said curbside inflow port, and into the primary sump region within said 3D stormwater storage volume of said curbside stormwater collection and pretreatment filtering system;
   (b) during a second phase of operation, where stormwater during the rain storm is starting to flow through said curbside storm grate structure and into said primary sump region of said curbside stormwater collection and pretreatment filtering system, but not sufficiently filling the primary sump region to flow over said weir wall portion;
   (c) during a third phase of operation, wherein stormwater flowing through the curbside storm grate structure has sufficiently filled the primary sump region and is flowing over the weir wall portion, and into the secondary sump region, and then flowing through the filter-screen wall portion from the secondary sump region into the tertiary sump region and out the at least one outflow port for dispersion through the earth ground;
   (d) during a fourth phase of operation, wherein stormwater flowing through the curbside storm grate structure has sufficiently filled the primary sump region, debris is building up beneath the baffle wall portion along the underflow passageway, and is flowing over the weir wall portion and into the secondary sump region, and then flowing from the secondary sump region through the filter-screen wall portion into the tertiary sump region and out the at least one outflow port for dispersion through the earth ground;
   (e) during a fifth phase of operation, wherein stormwater flowing through the curbside storm grate structure has sufficiently filled the primary sump region, debris beneath the baffle wall portion is completely blocking the underflow passageway, and stormwater in the primary sump region has risen to the top of the baffle wall portion and is flowing over the baffle wall portion and then flowing over the weir wall portion, and through the filter-screen wall portion into the tertiary sump region and out the at least one outflow port for dispersion through the earth ground; and
   (f) during a sixth phase of operation, wherein stormwater flowing through the curbside storm grate structure has sufficiently filled the primary sump region, debris beneath the baffle wall portion is completely blocking the underflow passageway, and debris buildup on the filter-screen wall portion is completely blocking stormwater flow therethrough, causing the stormwater to rise up and flow over the filter-screen wall portion and into the tertiary sump region, and then out the at least one outflow port for dispersion through the earth ground.

* * * * *